(12) United States Patent
Funato et al.

(10) Patent No.: US 10,974,436 B2
(45) Date of Patent: Apr. 13, 2021

(54) FOAMED STRUCTURE, RESIN PANEL, METHOD OF MANUFACTURING RESIN PANEL, METHOD OF MANUFACTURING RESIN LAMINATED BODY AND FOAMED BODY

(71) Applicant: KYORAKU CO., LTD., Kyoto (JP)

(72) Inventors: Takafumi Funato, Kanagawa (JP); Sho Nakajima, Kanagawa (JP); Kazuhiko Saeki, Aichi (JP); Kenji Ishii, Aichi (JP); Ryuichi Ishida, Tokyo (JP); Ryosuke Oki, Aichi (JP); Tatsuya Fukuda, Kanagawa (JP); Yuki Harasawa, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 274 days.

(21) Appl. No.: 16/329,343

(22) PCT Filed: Aug. 28, 2017

(86) PCT No.: PCT/JP2017/030711
§ 371 (c)(1),
(2) Date: Feb. 28, 2019

(87) PCT Pub. No.: WO2018/043390
PCT Pub. Date: Mar. 8, 2018

(65) Prior Publication Data
US 2019/0248061 A1    Aug. 15, 2019

(30) Foreign Application Priority Data

Aug. 31, 2016  (JP) .............................. JP2016-168800
Sep. 28, 2016  (JP) .............................. JP2016-189203
(Continued)

(51) Int. Cl.
*B29C 49/04*    (2006.01)
*B29C 49/20*    (2006.01)
(Continued)

(52) U.S. Cl.
CPC .............. *B29C 49/04* (2013.01); *B29C 49/20* (2013.01); *B29C 51/02* (2013.01); *B29C 51/12* (2013.01);
(Continued)

(58) Field of Classification Search
CPC ......... B29C 49/04; B29C 65/56; B29C 49/20; B29C 51/02; B29C 51/12; B32B 5/32; B60R 13/02
(Continued)

(56) References Cited

U.S. PATENT DOCUMENTS 5,129,628 A     7/1992 Vesper
6,581,348 B2 *  6/2003 Hunter, Jr. .............. E04C 2/246
                                                           156/71
(Continued)

FOREIGN PATENT DOCUMENTS

EP    1844919 A1    10/2007
EP    2942184 A1    11/2015
(Continued)

OTHER PUBLICATIONS

Translation of International Search Report dated Nov. 21, 2017 of corresponding International Application No. PCT/JP2017/030711; 4 pages.
(Continued)

*Primary Examiner* — Philip C Tucker
*Assistant Examiner* — Vicki Wu
(74) *Attorney, Agent, or Firm* — Maier & Maier, PLLC

(57) ABSTRACT

The first aspect of the present invention provides a foamed structure, comprising: a first foamed body extending in a
(Continued)

FIRST ASPECT first direction; a second foamed body extending in the first direction and facing the first foamed body with a gap interposed therebetween; and a reinforcement disposed in the gap between the first foamed body and the second foamed body, the reinforcement having an elongated shape, wherein the first foamed body has a portion overlapping with the second foamed body in the first direction view.

5 Claims, 69 Drawing Sheets

(30) Foreign Application Priority Data

Sep. 30, 2016 (JP) .............................. JP2016-192919
Jun. 29, 2017 (JP) .............................. JP2017-127723

(51) Int. Cl.
*B29C 51/12* (2006.01)
*B29C 65/56* (2006.01)
*B32B 5/32* (2006.01)
*B60R 13/02* (2006.01)
*B29C 51/02* (2006.01)

(52) U.S. Cl.
CPC ................ *B29C 65/56* (2013.01); *B32B 5/32* (2013.01); *B60R 13/02* (2013.01)

(58) Field of Classification Search
USPC ......................................................... 264/514
See application file for complete search history.

(56) References Cited

U.S. PATENT DOCUMENTS

| | | |
|---|---|---|
| 2008/0261016 A1 | 10/2008 | Tamada et al. |
| 2011/0008565 A1 | 1/2011 | Kodama et al. |
| 2014/0205809 A1 | 7/2014 | Ishii et al. |
| 2015/0086759 A1* | 3/2015 | Sumi ...................... B29C 49/04 428/198 |
| 2015/0306844 A1* | 10/2015 | Fukuda ................. B29C 65/028 428/158 |
| 2016/0200032 A1 | 7/2016 | Nakajima et al. |
| 2016/0354991 A1 | 12/2016 | Sueoka |
| 2018/0079164 A1 | 3/2018 | Sumi et al. |
| 2018/0250911 A1 | 9/2018 | Fukuda et al. |

FOREIGN PATENT DOCUMENTS

| | | |
|---|---|---|
| JP | S48-15017 Y1 | 4/1973 |
| JP | S4815017 Y1 * | 4/1973 |
| JP | 2005-313582 A | 11/2005 |
| JP | 2009-160972 A | 7/2009 |
| JP | 2010-174577 A | 8/2010 |
| JP | 2013-067148 A | 4/2013 |
| JP | 2013-107588 A | 6/2013 |
| JP | 2014-061700 A | 4/2014 |
| JP | 2015-051582 A | 3/2015 |
| JP | 2015-164763 A | 9/2015 |
| JP | 5797888 B2 | 10/2015 |
| WO | 2013/047224 A1 | 4/2013 |

OTHER PUBLICATIONS

Partial supplementary European Search Report dated Jul. 11, 2019, in connection with European Patent Application No. 17846395.6; 12 pages.

* cited by examiner

FIRST ASPECT

Enlarged view of area G1

Enlarged view of area G2

A-A

B-B

C-C

D-D

E-E

F-F

G-G

H-H

L-L

M-M

SECOND ASPECT

THIRD ASPECT

Fig. 45A1
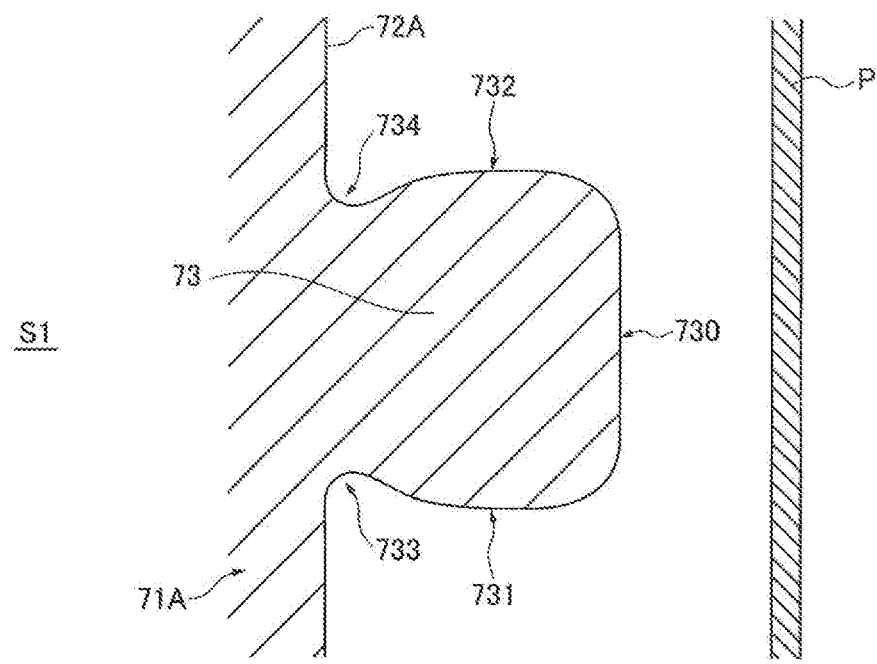
Fig. 45A2
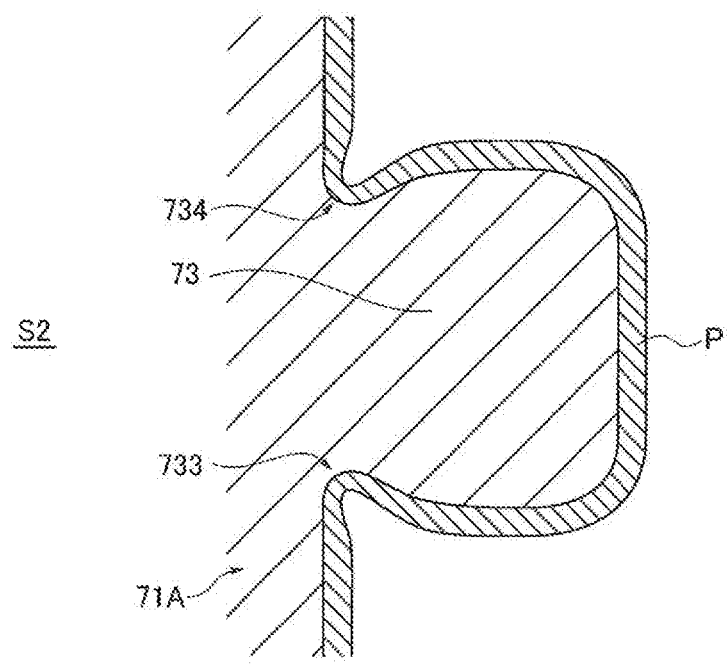

Fig. 45B1
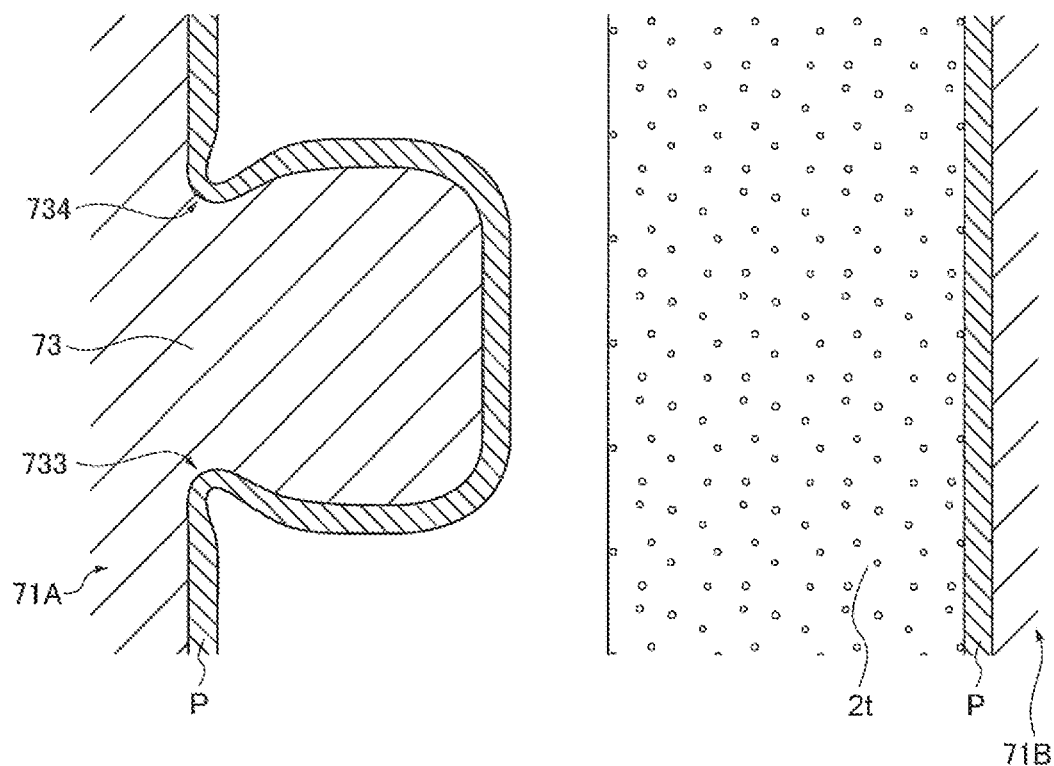

Fig. 45C1
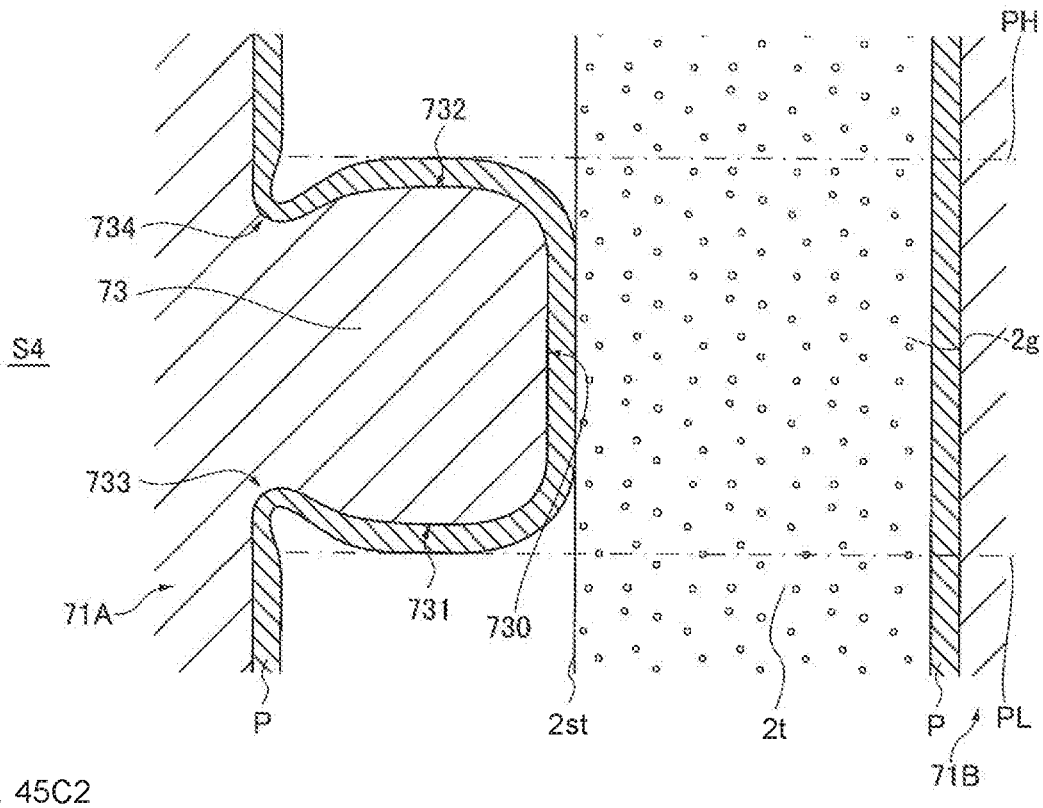
Fig. 45C2
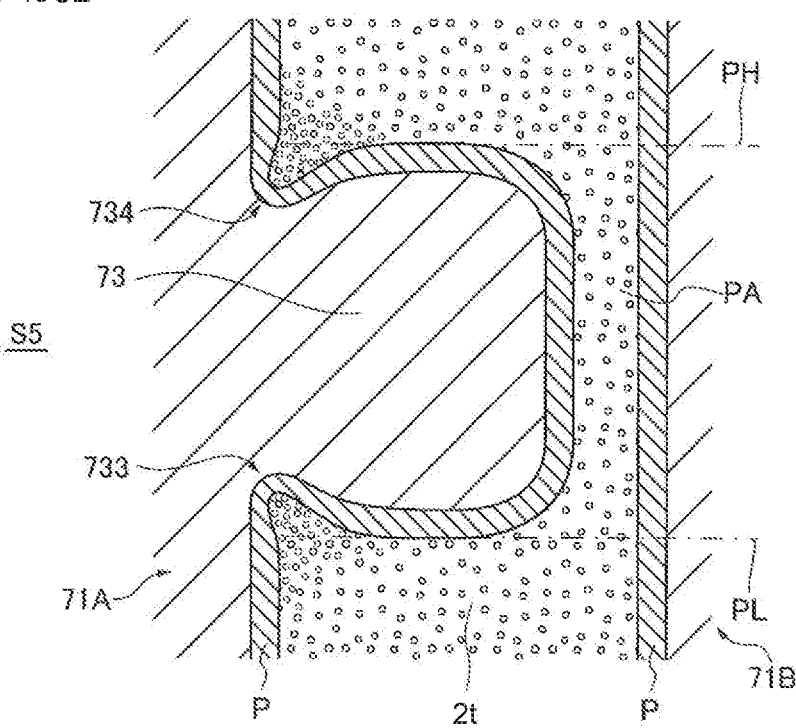

Fig. 54A
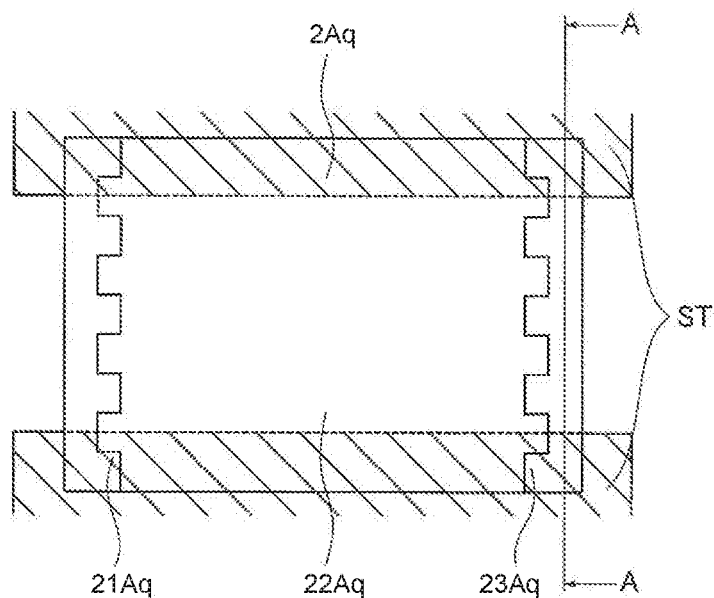
Fig. 54B   A-A
Fig. 54C   A-A

B-B

Fig. 60A
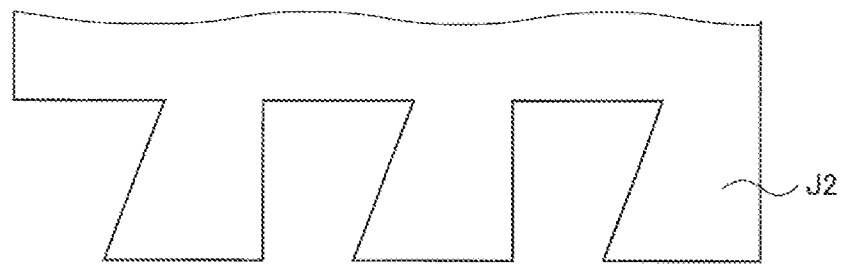
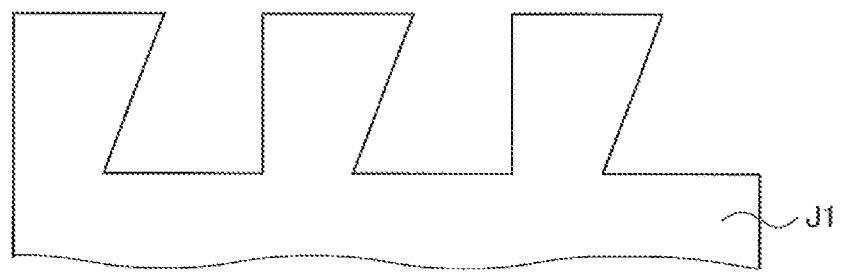
Fig. 60B
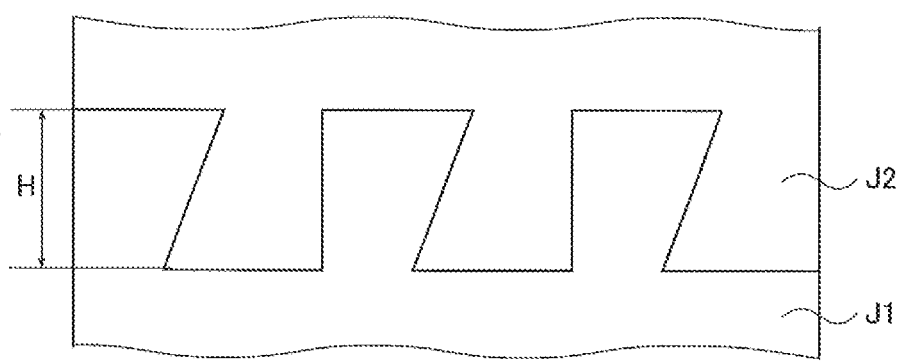

C-C

D-D

Example

Comparative example

FOAMED STRUCTURE, RESIN PANEL, METHOD OF MANUFACTURING RESIN PANEL, METHOD OF MANUFACTURING RESIN LAMINATED BODY AND FOAMED BODY

TECHNICAL FIELD

The present invention relates to foamed structure, resin panel, method of manufacturing resin panel, method of manufacturing resin laminated body and foamed body.

BACKGROUND ART

Resin panels have been used for various purposes such as for automobiles, building materials, for sports and leisure. Each of the resin panels is laminate body in which foamed structure containing one or more foaming bodies made of foamed resin is covered with cover material.

In addition, the resin panels, in which the foamed body as interior material is covered with cover material, are used for various purposes such as for automobiles, building materials, for sports and leisure.

Resin laminated bodies also has been used for various purposes such as for automobiles, building materials, for sports and leisure. The resin laminated bodies are constructed by covering the foamed structure including one or more foaming bodies made of foamed resin with cover material. Then, the resin laminated body with protrusion or recesse are known.

Patent Literature 1 discloses that a reinforcement is interposed between two foaming bodies in order to improve the rigidity and strength of the foamed structure. In addition, Patent Literature 1 discloses that the reinforcement is interposed between two foamed portions constituting the interior material in order to reinforce resin panel locally.

Patent Literature 2 discloses resin panel formed by interior material in hollow portion. In the interior material, a reinforcing member is fitted in a spacing member made of thermoplastic foamed body, and the spacing member and the reinforcing member are integrated. This integrated members is installed in the resin panel.

Patent Literature 3 discloses a deck board (example of resin laminated body) formed with a hook housing portion that houses and holds a hook. Patent Literature 3 discloses that the hook could be securely held in a fitting recess of the hook housing portion by making a width on inlet side in the depth direction smaller than a width on a depth side in the depth direction.

CITATION LIST

Patent Literature

[Patent Literature 1] Japanese Unexamined Patent Application Publication No. 2015-164763
[Patent Literature 2] Japanese Unexamined Patent Application Publication No. 2010-174577
[Patent Literature 3] Japanese Patent No. 5797888

SUMMARY OF INVENTION

Technical Problem

First Aspect
In Patent Literature 1, when the cover material is molded on the surface of the foamed structure in which reinforcement is interposed between two foaming bodies, moving of the reinforcement with respect to the foamed body in the molding step causes defect of molding the cover material or poor appearance of the cover material after molding.

The first aspect of the present invention has been made in view of such circumstances, and the first aspect of the present invention provides a foamed structure, which a reinforcement is interposed between two foaming bodies, configured to reliably prevent the reinforcement from moving relative to a foamed body.

Second Aspect
In Patent Literature 2, facing portion may be provided in the spacing member, and the facing portion may be arranged to face an end surface in the longitudinal direction of the reinforcing member. Thus, resin may rise in a vicinity of the boundary between the end surface and the facing portion of the reinforcing member, which causes poor appearance.

The second aspect of the present invention has been made in view of such circumstances and provides a resin panel capable of reducing resin rising near an interface between an end surface of a reinforcing member and a facing portion of a spacing member.

Third Aspect
In Patent Literature 3, a surface, of the foaming bodies of the resin laminated body, having uneven formed thereon tends to have large dimensional variations. As resin beads do not easily enter molds in molding. Thus, considering the dimensional variations of the surface having the uneven formed thereon, the cover material covering the foamed body is molded in such a way that a gap is secured between the cover material and the foamed body.

Also, in the surface having the uneven formed thereon, the molten resin sheet is not uniformly shaped along the molding surface of the molds in molding of the cover material. Corner of the uneven, in particular, tends to be thin. For these reasons, rigidity of the surface having the uneven formed thereon tends to decrease locally.

The third aspect of the present invention has been made in view of such circumstances and provides a method of manufacturing a resin laminated body preventing a local rigidity of the resin laminated body from decreasing.

Fourth Aspect
In Patent Literature 1, the reinforcement is commonly made of metal. However, depending on shape of the resin panel and use environment, metal reinforcement may not be provided at a desired position.

The fourth aspect of the present invention has been made in view of such circumstances and provides a foamed body being configured to reinforce a desired position of a resin panel without being restricted by shape of the resin panel and use environment of the resin panel.

Solution of Technical Problem

Solutions of the problems of the first to fourth aspects will be described below. The solutions of the first to fourth aspects presented below can be combined with one another.

First Aspect
The first aspect of the present invention provides a foamed structure, comprising:
a first foamed body extending in a first direction;
a second foamed body extending in the first direction and facing the first foamed body with a gap interposed therebetween; and
a reinforcement disposed in the gap between the first foamed body and the second foamed body, the reinforcement having an elongated shape, wherein the first foamed body has a portion overlapping with the second foamed body in the first direction view.

Hereinafter, various embodiments according to the first aspect of the present invention will be exemplified. The following embodiments can be combined with one another.

Preferably, the portion of the first foamed body has a wall surface orthogonal to the first direction.

Preferably, the first and second foamed bodies are defined by a first and second boundaries, the first boundary is provided in a side of one end of the reinforcement, the second boundary is provided in a side of the other end of the reinforcement, the first and second foaming bodies are defined by the first and second boundaries, and the first and second boundaries are colinear.

Preferably, the first and second foamed bodies are is defined by a first and second boundaries, the first boundary is provided in a side of one end of the reinforcement, the second boundary is provided in a side of the other end of the reinforcement, the first and second foamed body are defined by the first and second boundaries, and a direction of at least one of the first and second boundaries is different from the first direction.

Another aspect of the present invention provides a resin panel, comprising: the foamed structure of any one of above foamed structures; and a cover material covering the foamed structure.

Second Aspect

The second aspect of the present invention provides a resin panel, comprising:
a hollow resin molded body;
a spacing member; and
a reinforcing member, wherein
the spacing member and the reinforcing member are disposed in the resin molded body,
the reinforcing member includes an end surface, the end surface being an end surface in a longitudinal direction of the reinforcing member,
the spacing member includes a facing portion facing to the end surface of the reinforcing member, and
the facing portion includes a resin reservoir adjacent to the end surface of the reinforcing member.

The resin panel according to the second aspect comprises the facing portion including a resin reservoir adjacent to the end surface of the reinforcing member. And reserving extra resin in the resin reservoir, the second aspect reduces resin rising near the interface between the end surface of the reinforcing member and the facing portion of the spacing member.

Hereinafter, various embodiments according to the second aspect of the present invention will be exemplified. The following embodiments can be combined with one another.

Preferably, the spacing member comprises a base surface and a recess provided in the base surface, the recess is provided in the facing portion and functions as the resin reservoir.

Preferably, thickness of the facing portion is smaller than thickness of the reinforcing member.

Preferably, in an end view of the spacing member, a width of the facing portion is 50% or more of a width of the reinforcing member.

Preferably, the resin panel further comprising: a protrusion protruding from the base surface, the protrusion being provided around the facing portion.

Preferably, the protrusion includes a sloping surface, and in the end view of the spacing member, the sloping surface slopes in a direction away from the facing portion.

Preferably, the reinforcing member includes a pair of plate members facing one another and a connecting member connecting the pair of the plate members, and the facing portion is configured to contact the connecting member.

Another aspect of the present invention provides a method of manufacturing a resin panel, comprising: hanging down first and second resin sheets between the first and second molds; fixing a structure to the first resin sheet; and clamping the first and second molds, wherein the structure comprises a spacing member and a reinforcing member, the spacing member and the reinforcing member are disposed between the first and second resin sheets, the reinforce member includes an end surface, the spacing member includes a facing portion facing the end surface of the reinforcing member, the facing portion includes a resin reservoir adjacent to the end surface of the reinforcing member.

Third Aspect

The third aspect of the present invention provides a method of manufacturing a resin laminated body including a foamed body and a cover material covering the foamed body comprising:
placing a pair of molten resin sheets in front of a first mold having a first surface and a second mold having a second surface;
pressuring the pair of the molten resin sheets on the first and second surfaces of the first and second molds respectively;
placing the foamed body between the pair of molten resin sheets pressured on the first and second surfaces; and
clamping the first and second molds, wherein
the resin laminated body has a protrusion or a recess formed therein,
the first surface is provided with a mold recess or a mold protrusion for molding the protrusion or the recess of the resin laminated body,
the foamed body includes a part facing to the molten resin sheet pressured on the mold recess or mold protrusion, and
first volume is larger than second volume in third volume,
the first volume being defined by a volume of a first part of the foamed body in a state before the placing step, the first part facing a second part of the molten resin sheet, the second part being disposed on the mold recess or the mold protrusion,
the second volume being defined by a volume of the first part of the foamed body in a state after the clamping step,
the third volume being defined by a volume of the foamed body between the pair of molten resin sheets in a state after the clamping step.

Hereinafter, various embodiments according to the third aspect of the present invention will be exemplified. The following embodiments can be combined with one another.

Preferably, the mold recess or the mold protrusion has an undercut shape.

Preferably, the recess of the resin laminated body is configured to fit another member.

Fourth Aspect

The fourth aspect of the present invention provides a foamed body having a plate shape, comprising:
a first foaming region having a first expansion ratio;
a second foaming region having a second expansion ratio lower than the first expansion ratio, wherein
the second foaming region
is formed along a peripheral edge of the foamed body and is formed at least partly in the peripheral edge of the foamed body or is formed to traverse from one part of the peripheral edge of the foamed body to the other part of the peripheral edge of the foamed body.

Hereinafter, various embodiments according to the fourth aspect of the present invention will be exemplified. The following embodiments can be combined with one another.

Preferably, thickness of cross section of the second foaming region is not uniform.

Preferably, the second foaming region have a hinge formed therein, and the hinge is formed in at least a part of the second foaming region.

Preferably, the foamed body further comprising: a first foamed portion having the first foaming region; and a second foamed portion having the second foaming region, wherein the first and second foamed portions are connected to one another.

Preferably, the foamed body includes a front surface and a back surface, and in a connecting region where the first and second foamed portions are connected, the first and second foamed portions have portions penetrating from the front surface of the foamed body to the back surface of the foamed body.

Another aspect of the present invention provides a resin panel, comprising: the foamed body of any one of above foaming bodies; and a cover material covering the foamed body.

BRIEF DESCRIPTION OF THE DRAWINGS

First Aspect

Second Aspect

Figure 18:
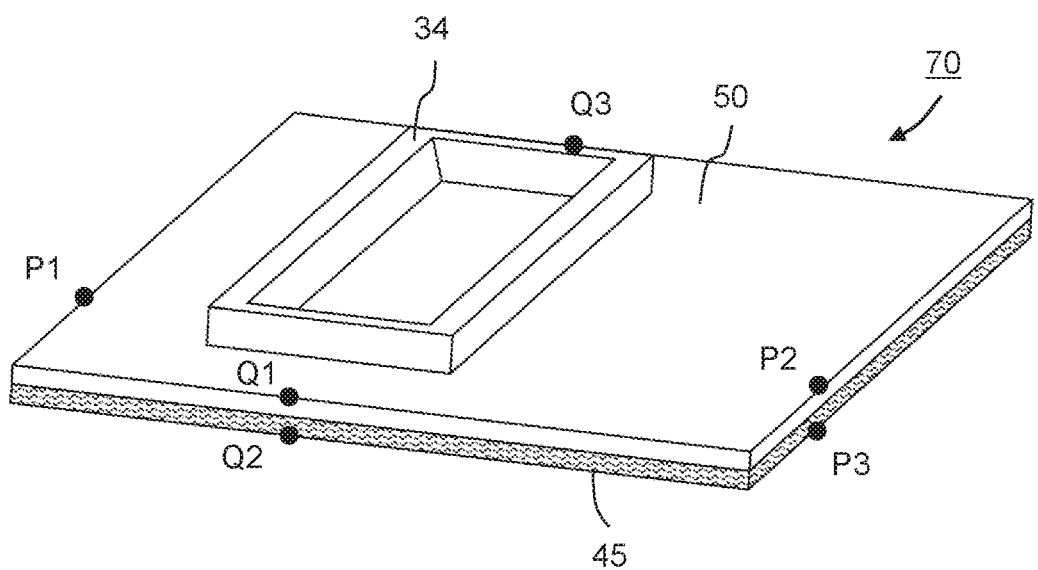

FIG. 18 is a perspective view of a resin panel 70s according to an embodiment of the present invention.

Figure 19:
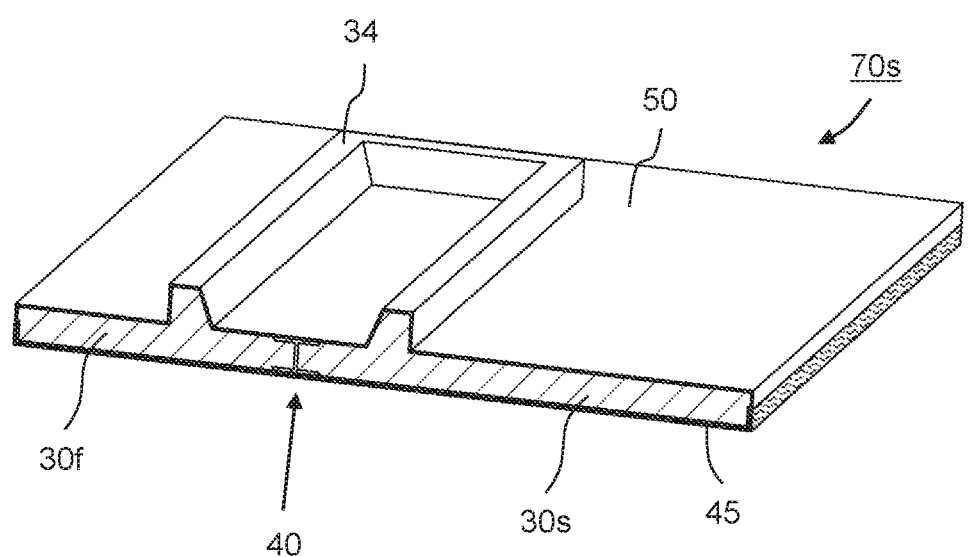

FIG. 19 is a cross-sectional view of a plane passing through points P1 to P3 in FIG. 18.

Figure 20:
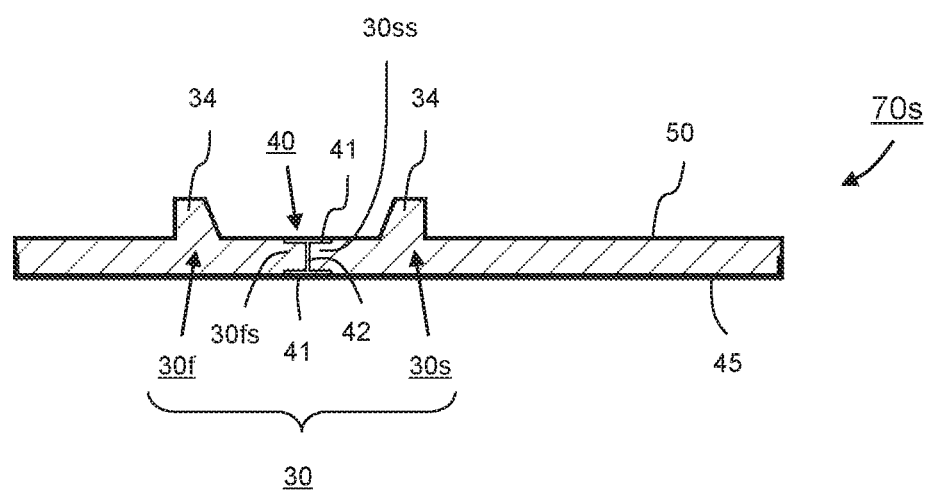

FIG. 20 is a front view of the cross section of FIG. 19.

Figure 21:
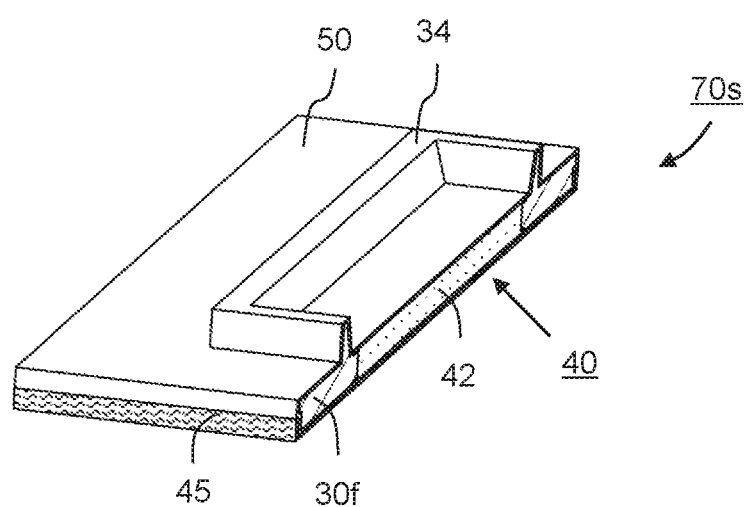

FIG. 21 is a cross-sectional view of a plane passing through points Q1 to Q3 in FIG. 18.

Figure 22:
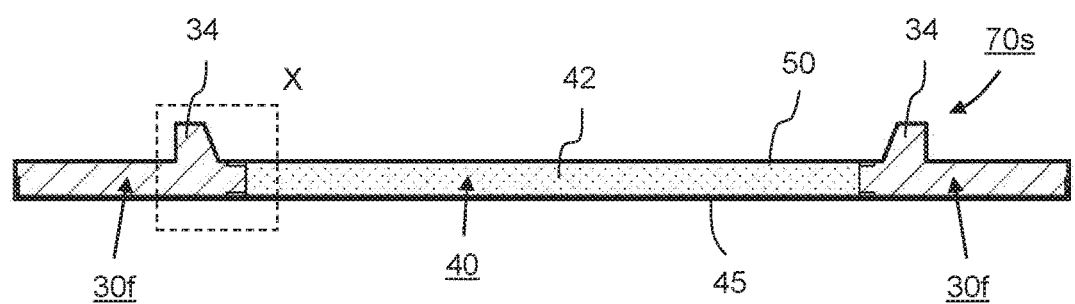

FIG. 22 is a front view of the cross section of FIG. 21; Fig.

Figure 23:
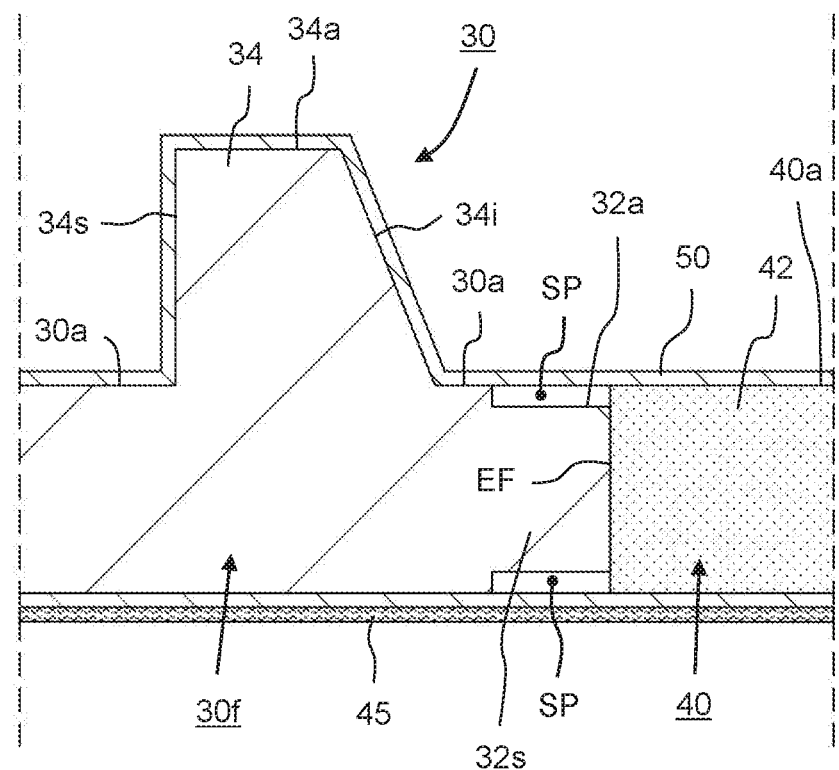

FIG. 23 is a partial enlarged view of a region X in FIG. 22.

Figure 24:
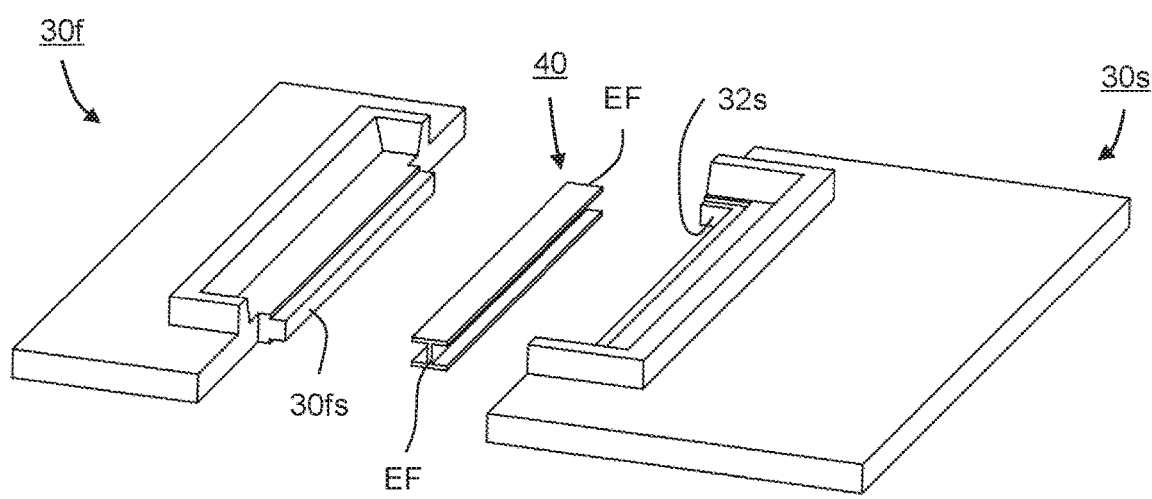

FIG. 24 is a perspective view of spacing member 30 (first spacing member 30f+ second spacing member 30s) and reinforcing member 40 constituting structure 60.

Figure 25:
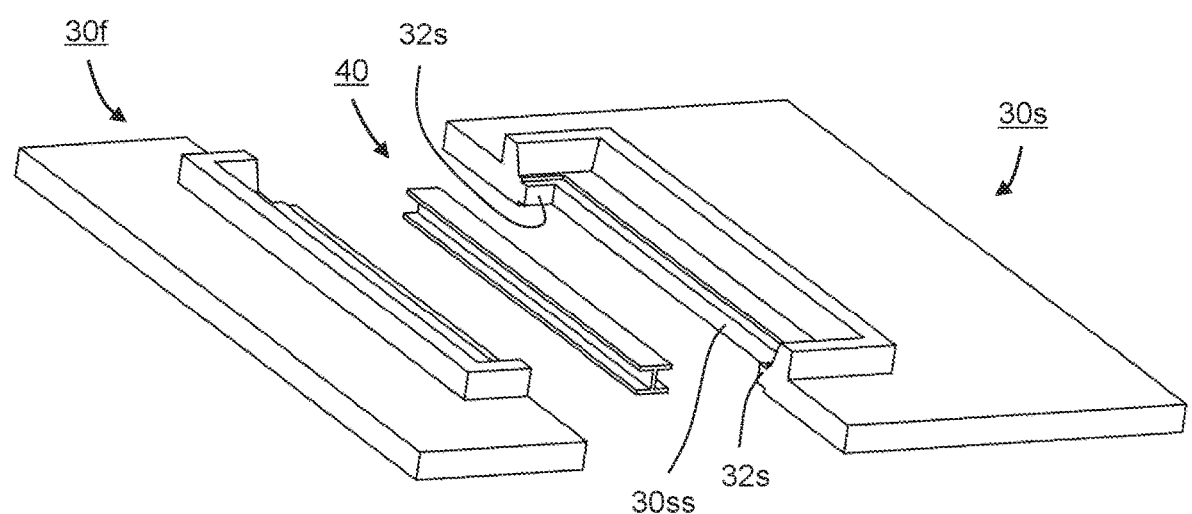

FIG. 25 is a perspective view seen from another angle with FIG. 24.

Figure 26:
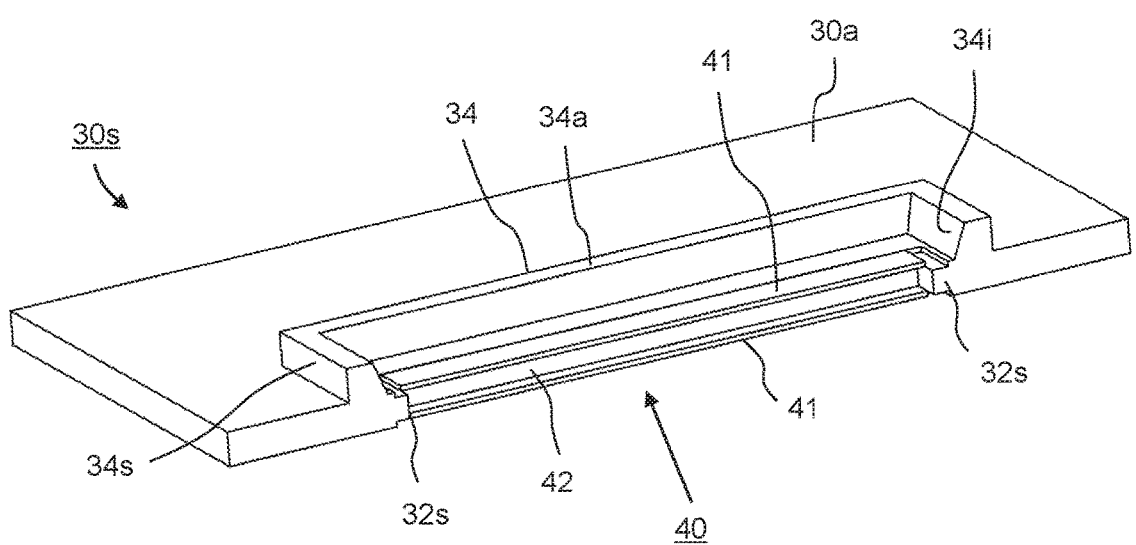

FIG. 26 is a perspective view of a state where a reinforcing member 40 is fitted into a side protrusion 30ss of a second spacing member 30s.

Figure 27:
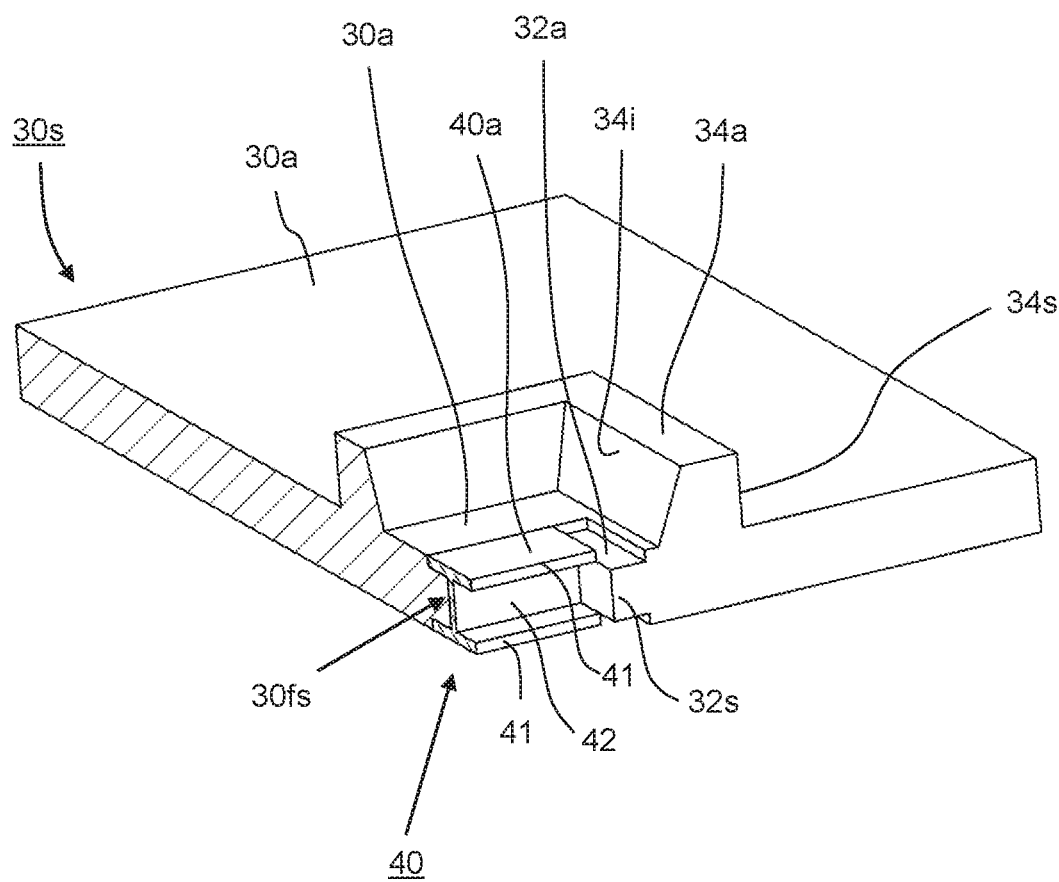

FIG. 27 is a partially enlarged view of the periphery of the end covering portion in FIG. 26, and this partially enlarged view including a cross section in a direction perpendicular to a longitudinal direction of the reinforcing member 40.

Figure 28:
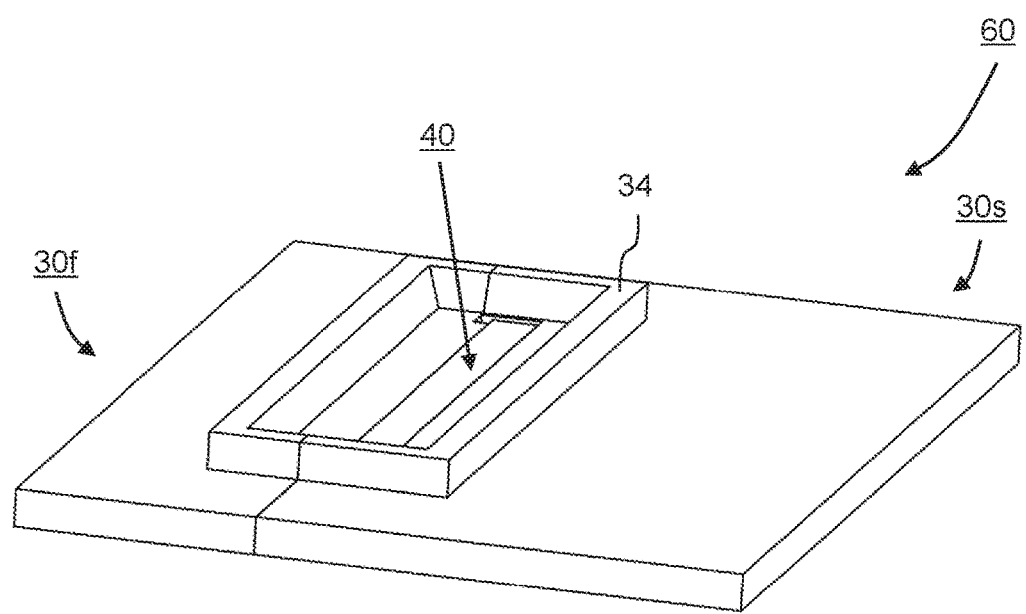

FIG. 28 is a perspective view of the structure 60 (spacing member 30+ reinforcing member 40). Such a structure 60 is placed in the resin molded body 50 to form a resin panel 70s.

Figure 29:
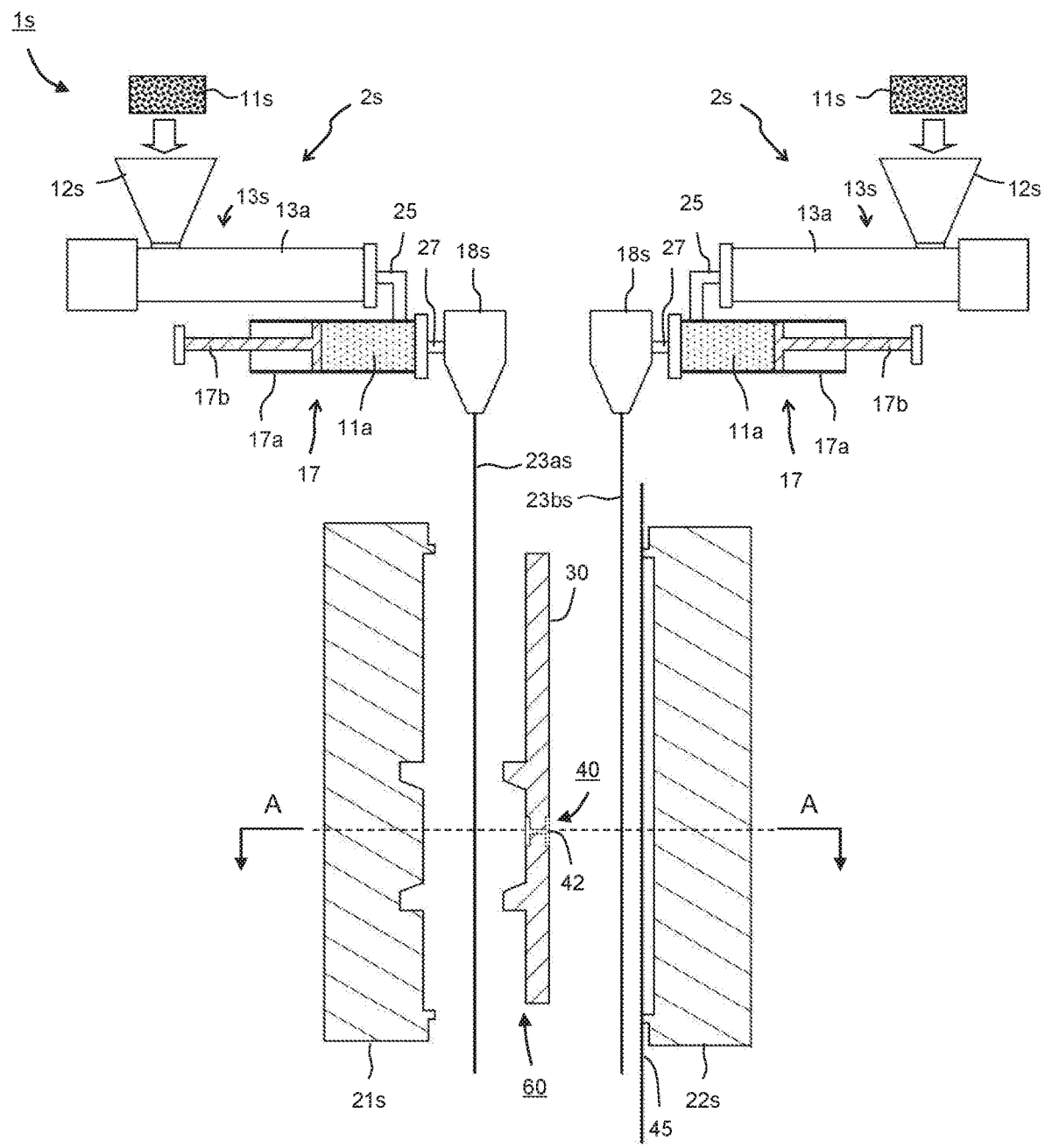

FIG. 29 is a view showing an example of a molding machine 1S that can be used in a method of manufacturing a resin panel 70s.

Figure 30:
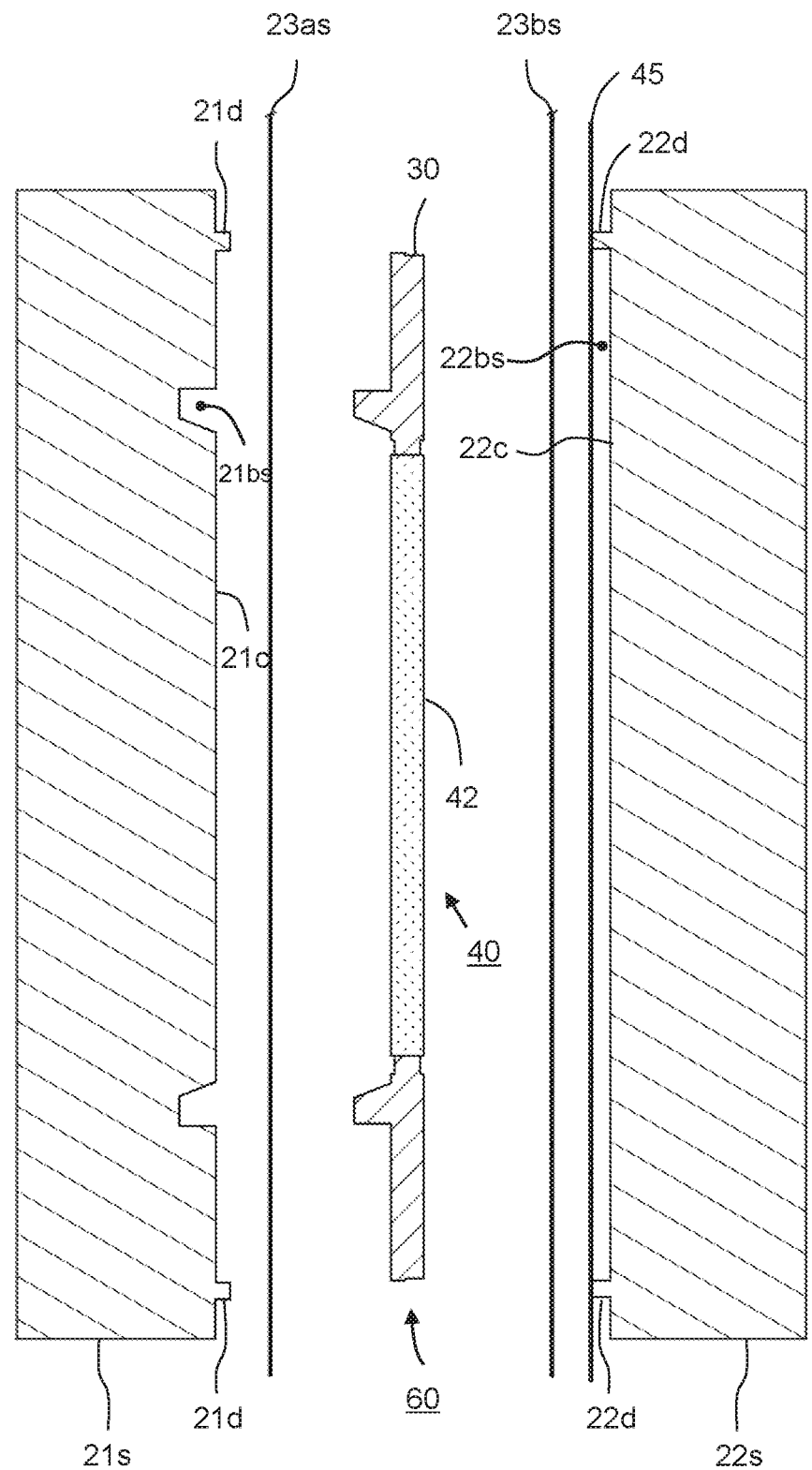

FIG. 30 is an enlarged view of a cross section taken along line A-A in FIG. 29 (that is, a cross sectional view viewed from a vertically upper side) in the vicinity of the first and second molds 21s and 22s and the first and second resin sheets 23as and 23bs. Here, the line A-A is a line passing through the center of the connecting member 42.

Figure 31:
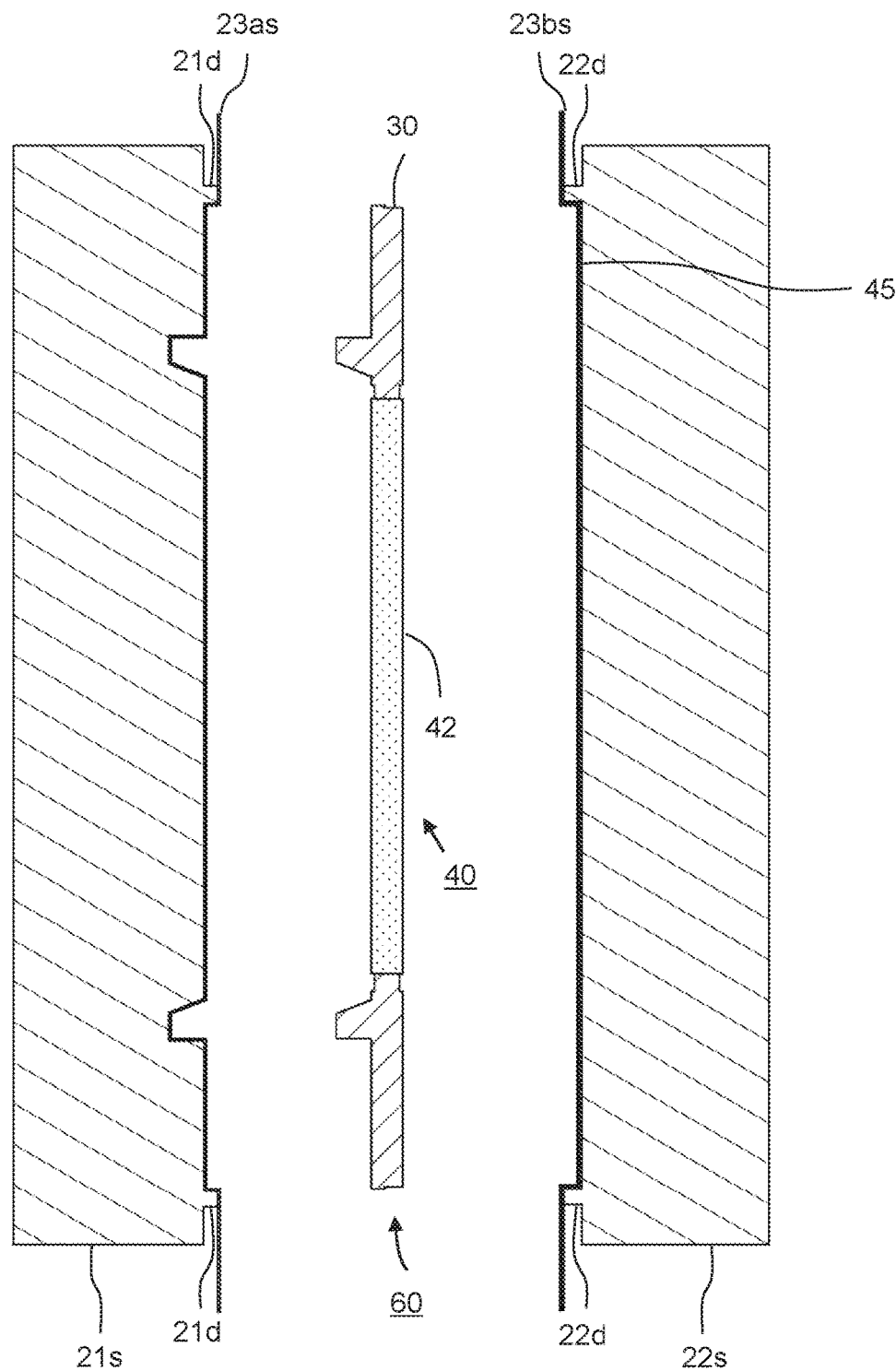

FIG. 31 is a view showing a state in which the first and second resin sheets 23as and 23bs, shown in FIG. 30, are sucked under reduced pressure.

Figure 32:
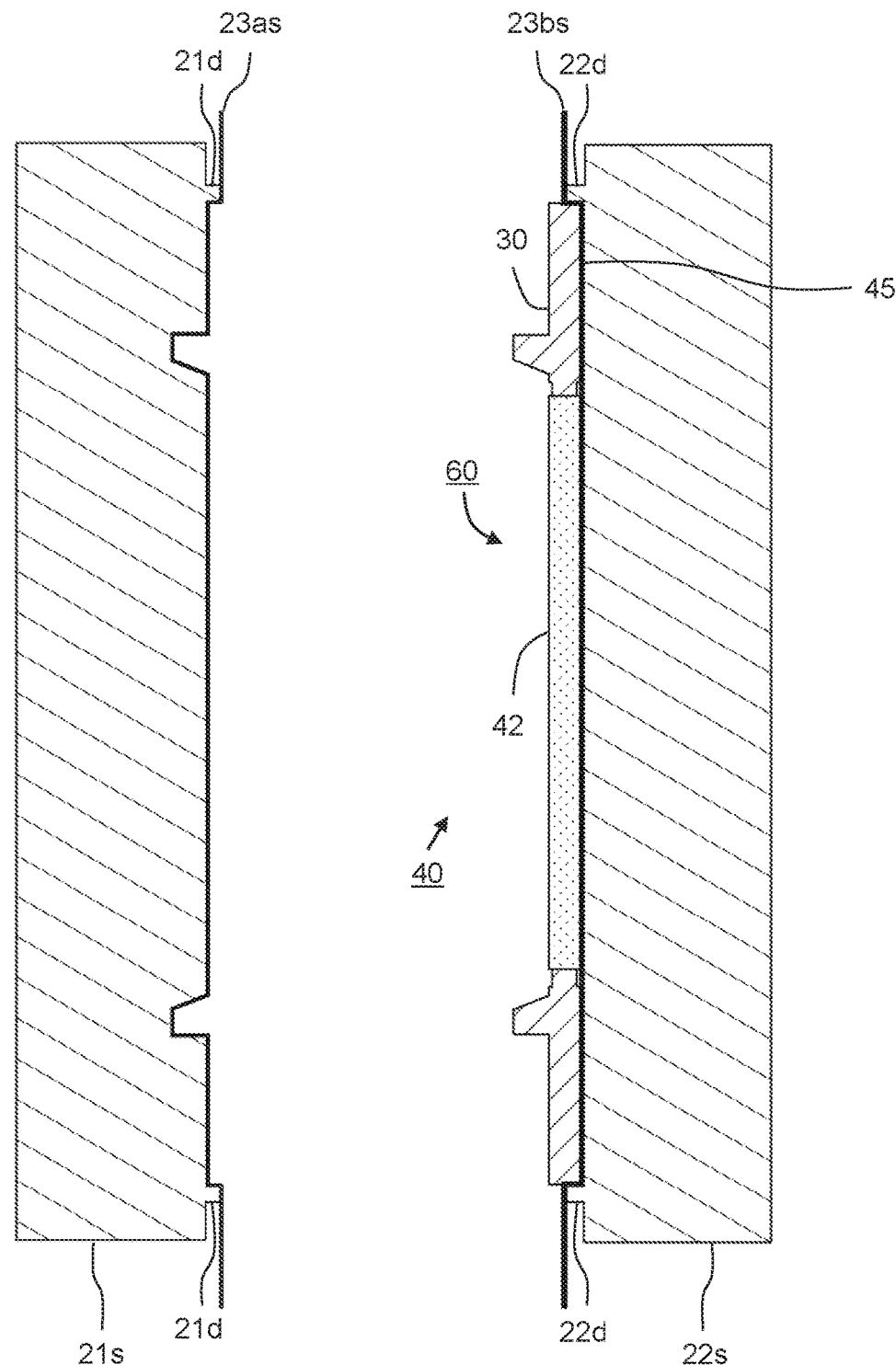

FIG. 32 is a view showing a state in which a spacing member 30 is fixed to a first resin sheet 23as.

Figure 33:
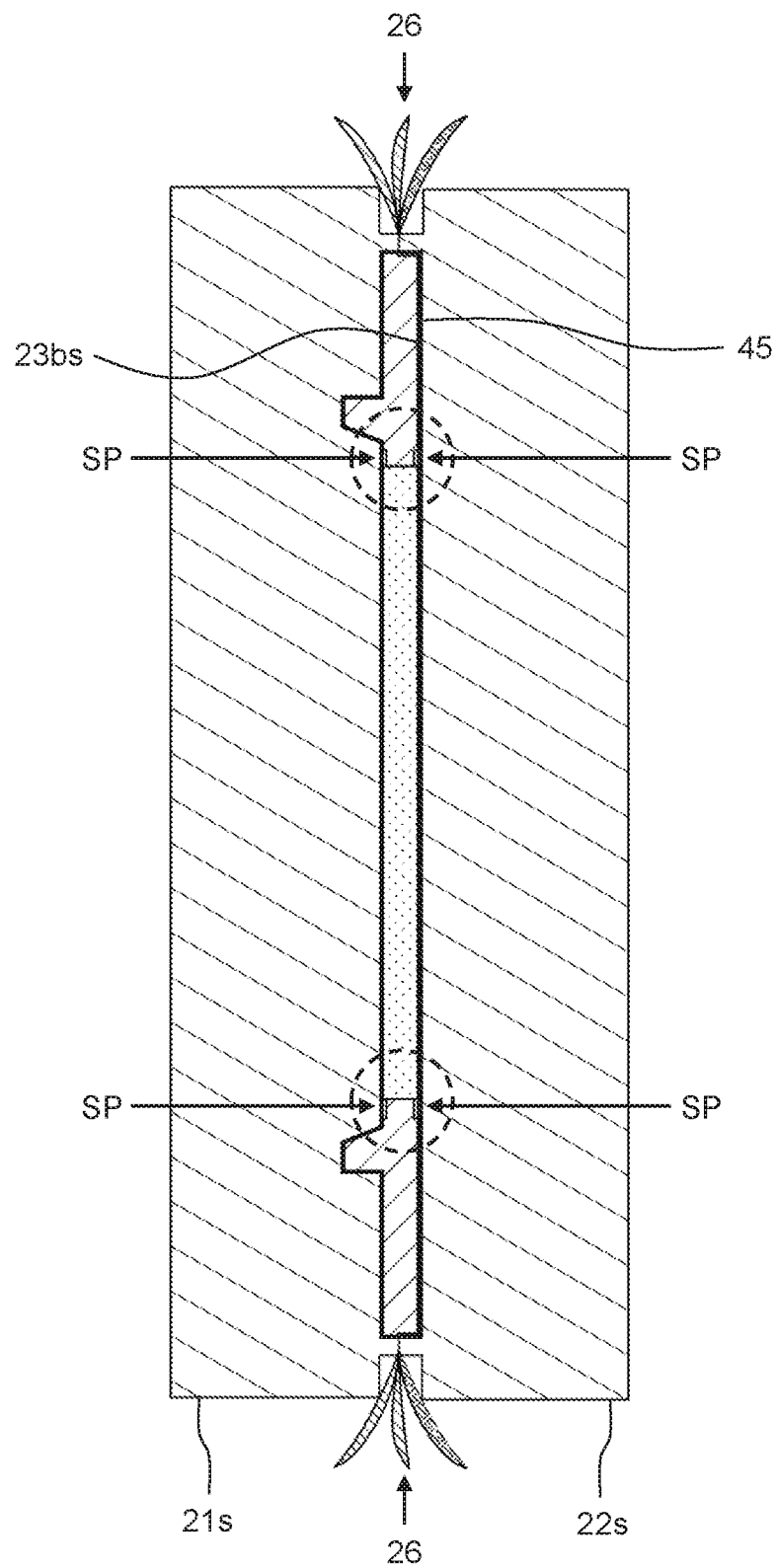

FIG. 33 is a cross-sectional view showing a state in which the first and second molds 21s and 22s are tightened.

Figure 34:
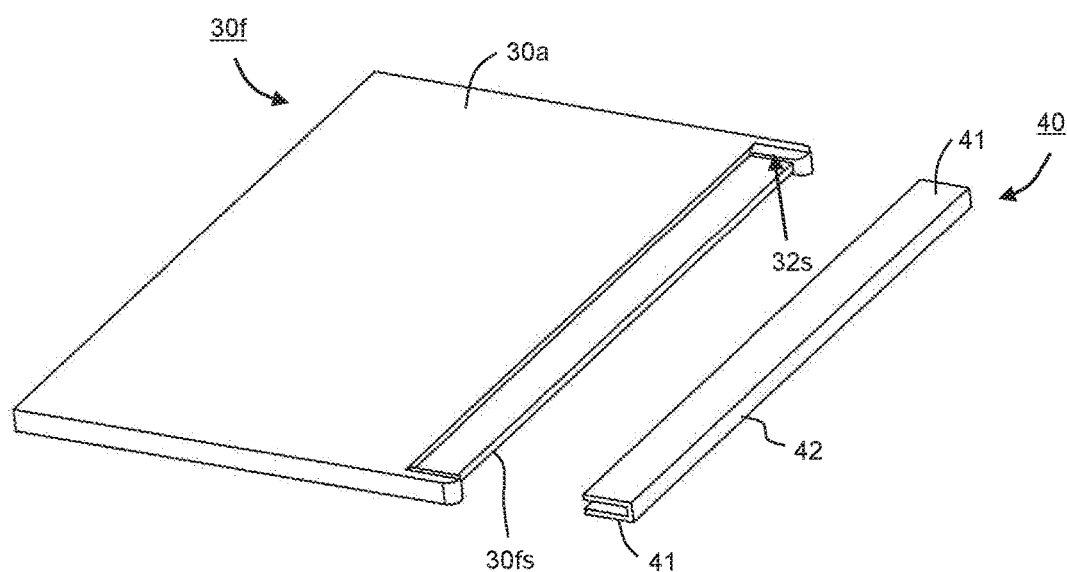

FIG. 34 is a partial perspective view showing a modified example of the first and second spacing members 30f, 30s.

Figure 35:
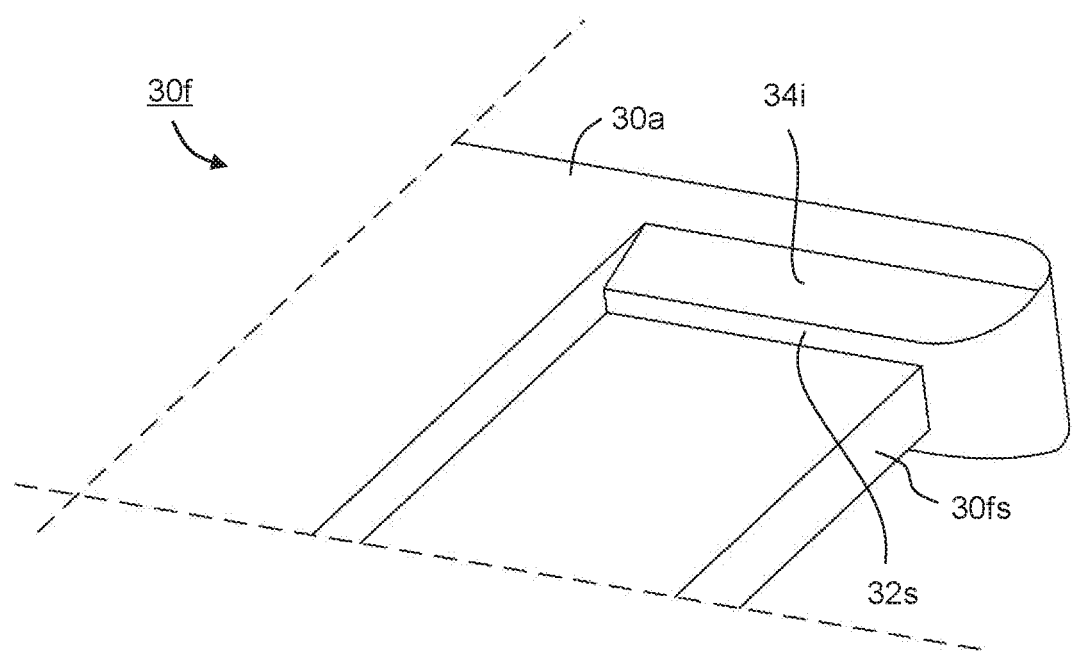

FIG. 35 is a partially enlarged view of the periphery of the facing portion 32s in FIG. 34.

Figure 36:
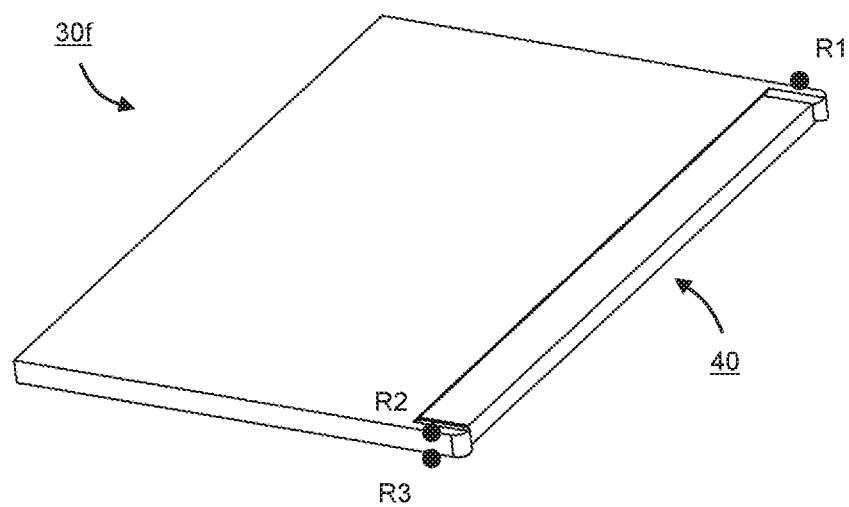

FIG. 36 is a perspective view showing a state in which a reinforcing member 40 is attached to a first spacing member 30f.

Figure 37:
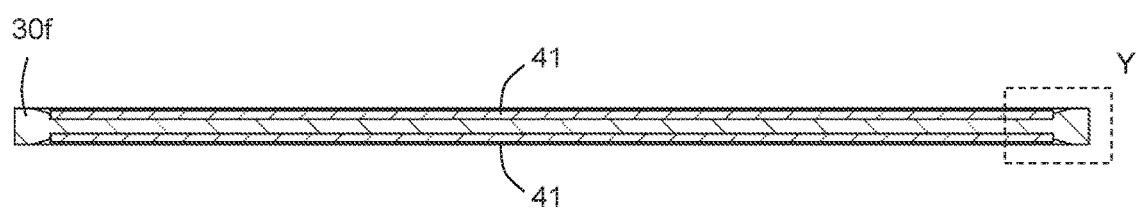

FIG. 37 is a cross-sectional view of a plane passing through points R1 to R3 in FIG. 36.

Figure 38:
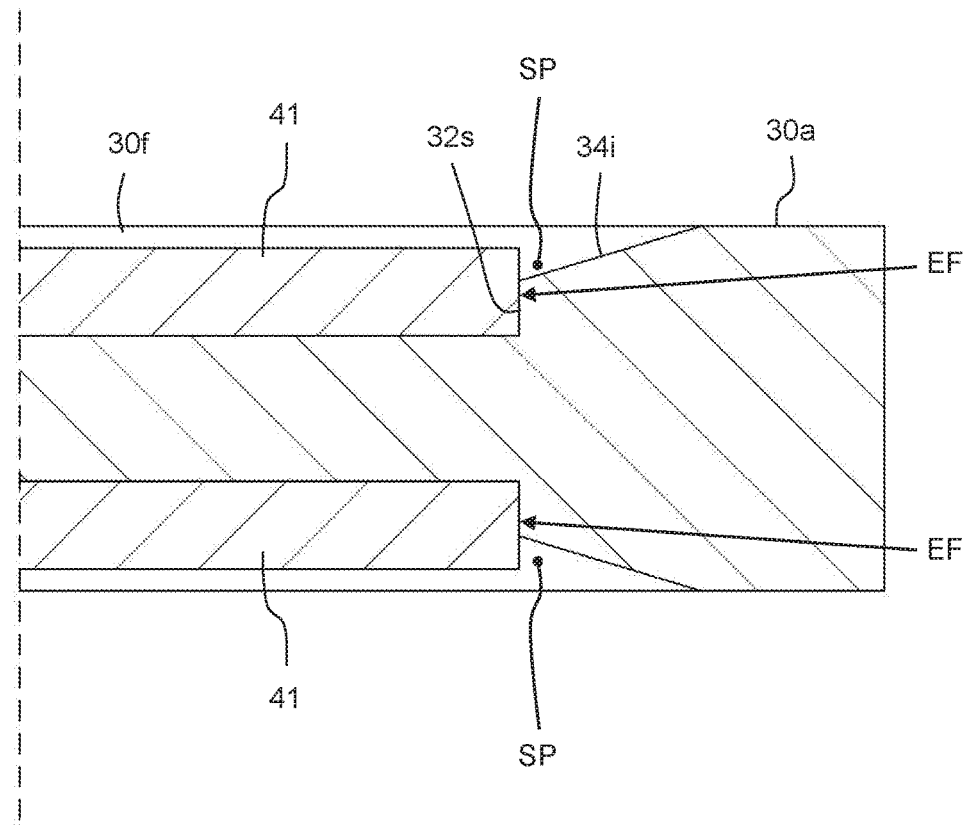

FIG. 38 is a partial enlarged view of a region Y in FIG. 37.

Third Aspect

Figure 39:
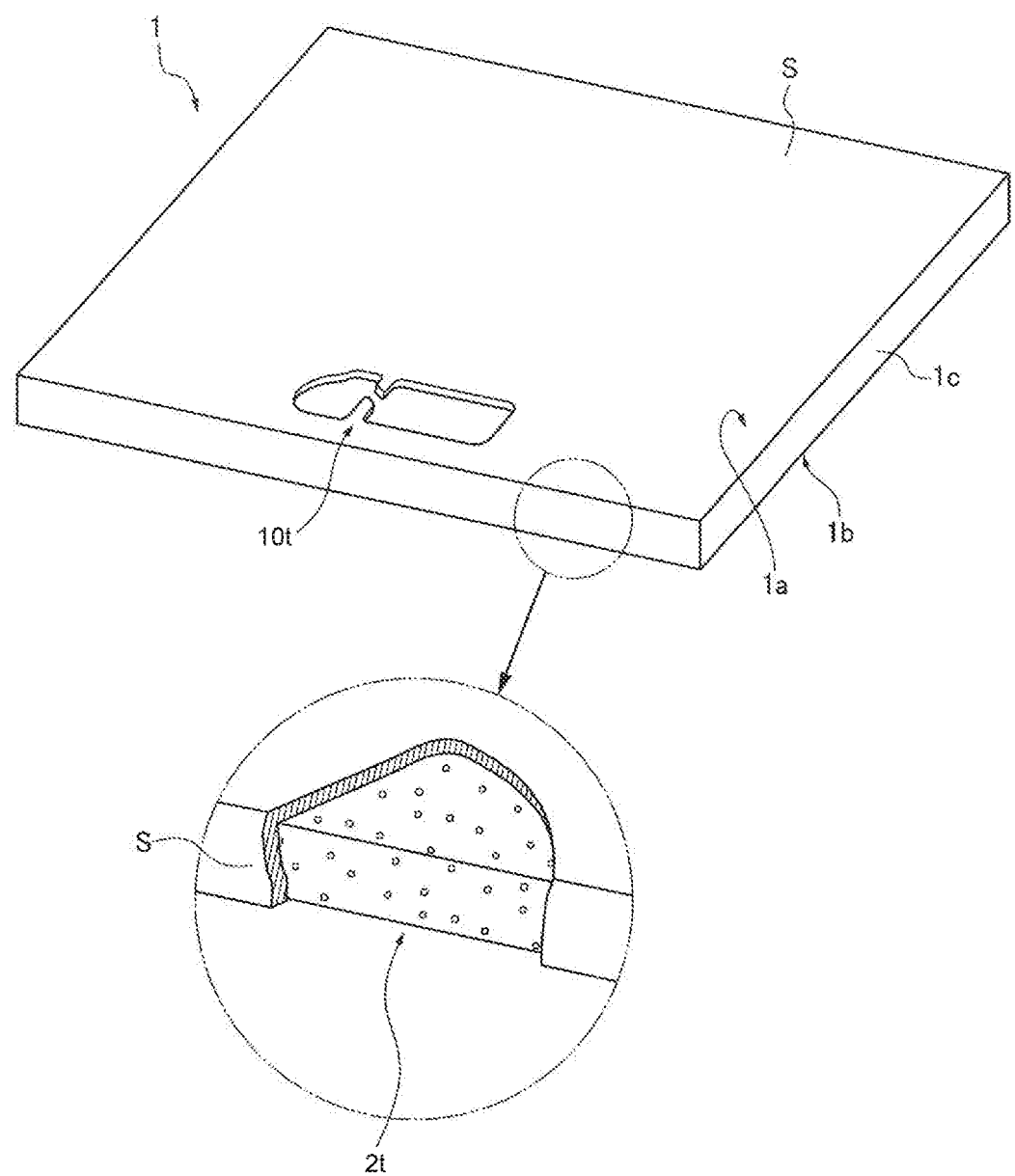

FIG. 39 is a perspective view of the resin panel of the first embodiment and an enlarged cut-away view of a part thereof.

Figure 40:
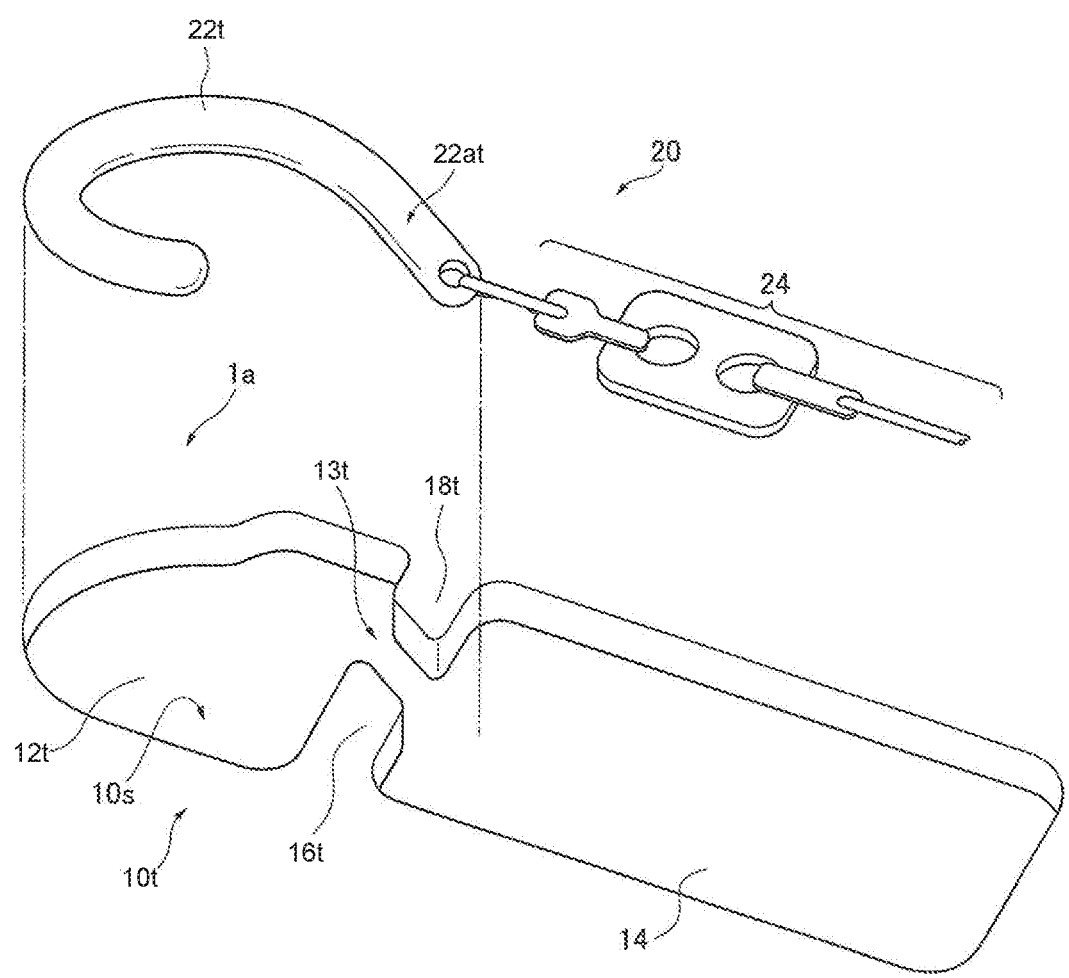

FIG. 40 is a perspective enlarged view of a hook housing portion and a hook of the resin panel of the first embodiment.

Figure 41:
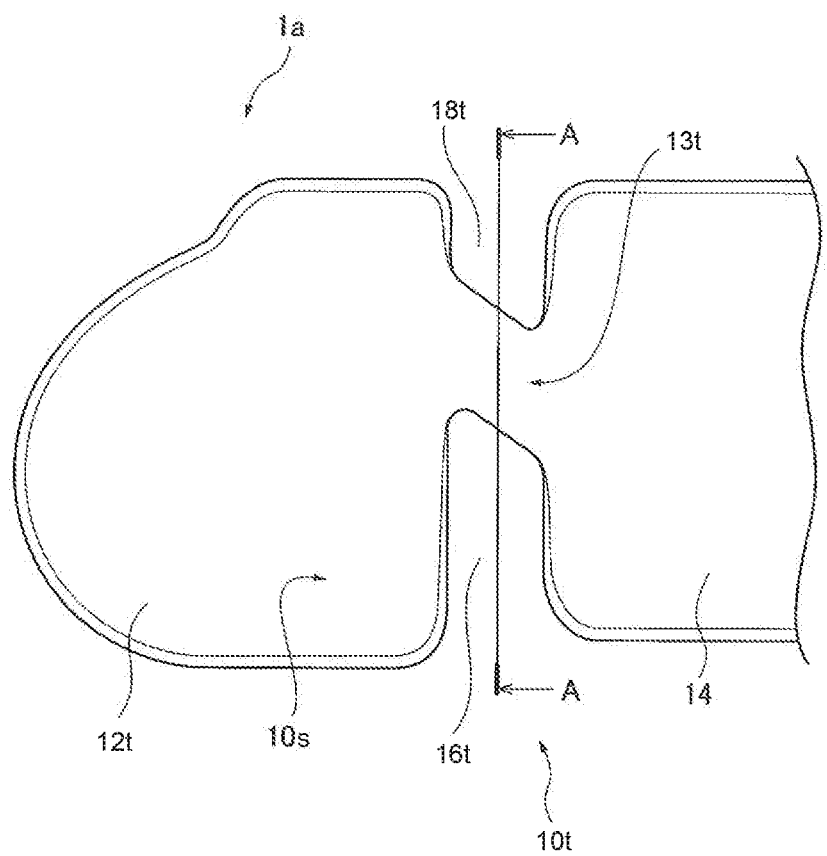

FIG. 41 is an enlarged plan view of a part of the hook housing portion of the resin panel of the first embodiment.

Figure 42:
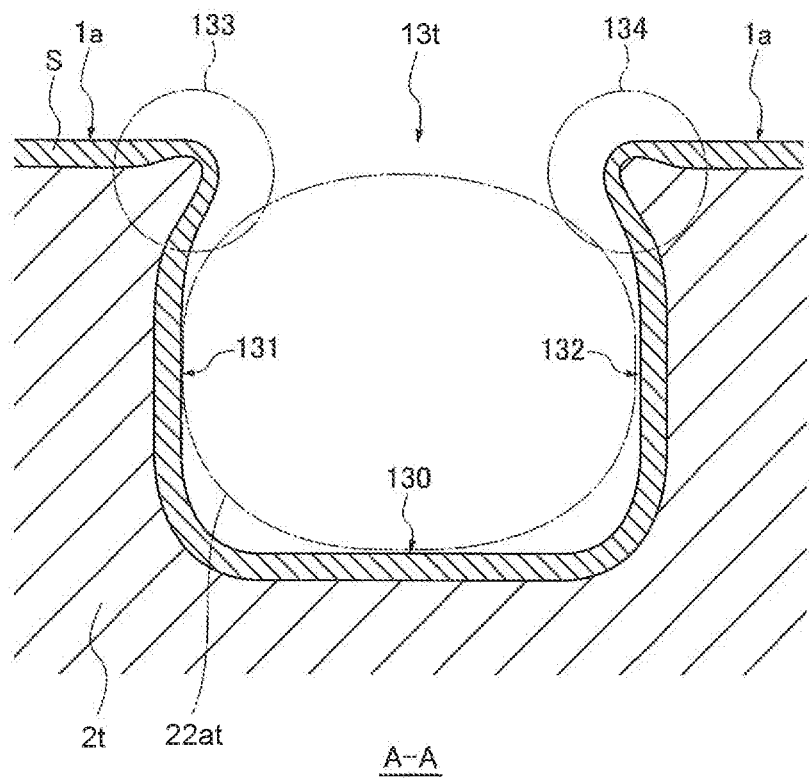

FIG. 42 is an enlarged cross-sectional view of A-A in FIG. 41.

Figure 43:
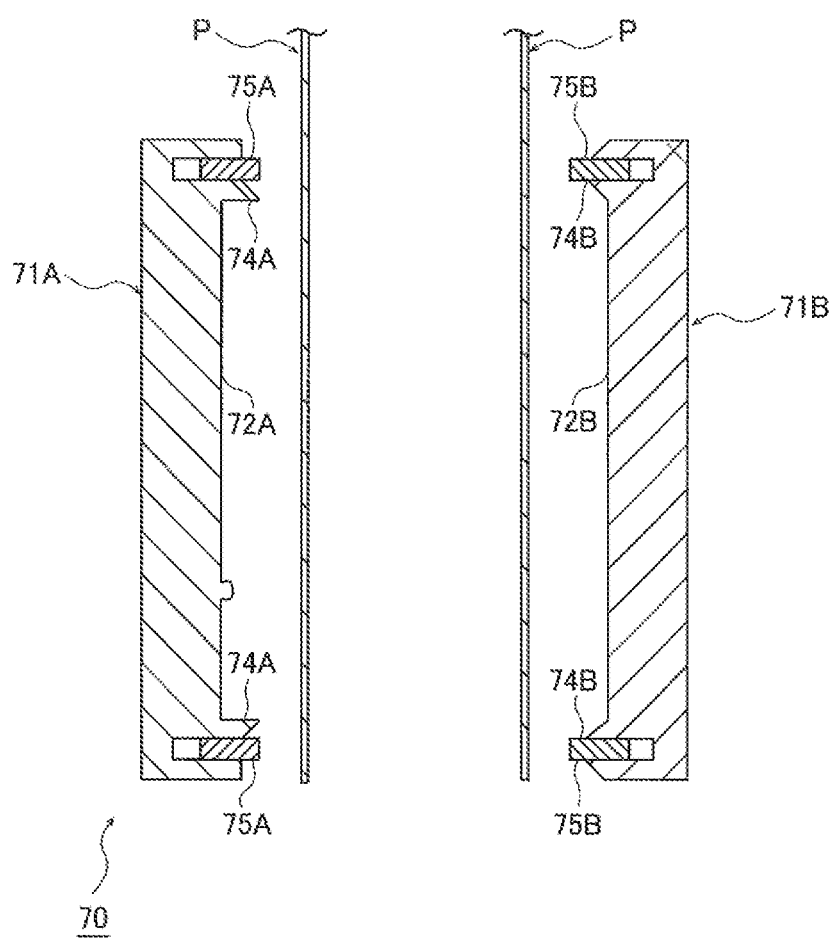

FIG. 43 is a view for explaining a step of molding the cover material of the resin panel of the first embodiment.

Figure 44:
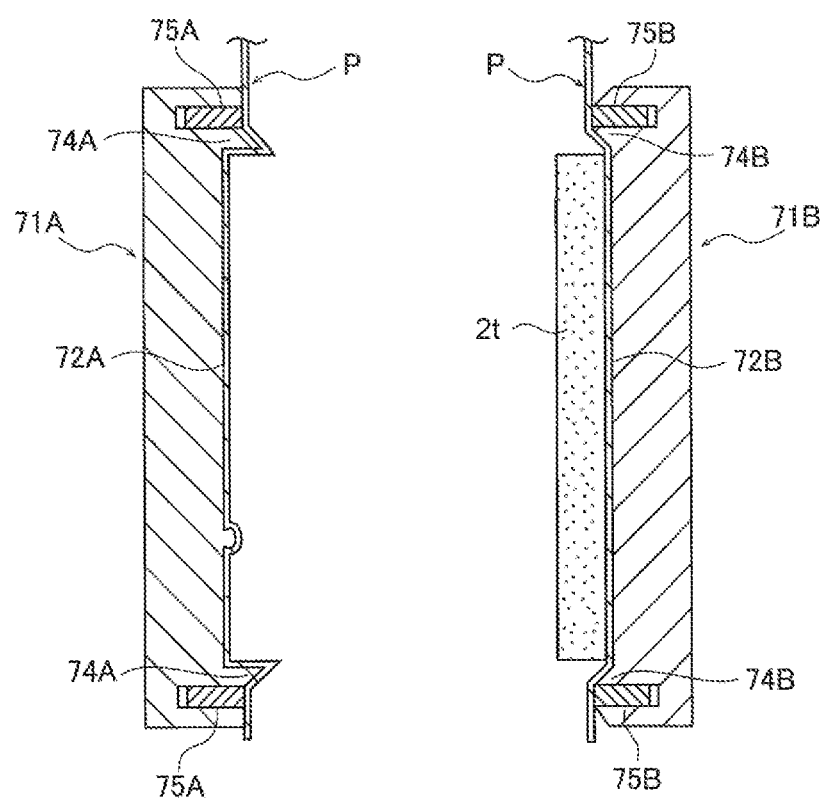

FIG. 44 is a view for explaining a step of molding the cover material of the resin panel of the first embodiment.

FIGS. 45A1 to 45C2 are views each sequentially showing a molding step for a part of the hook housing portion of the resin panel of the first embodiment.

Figure 46:
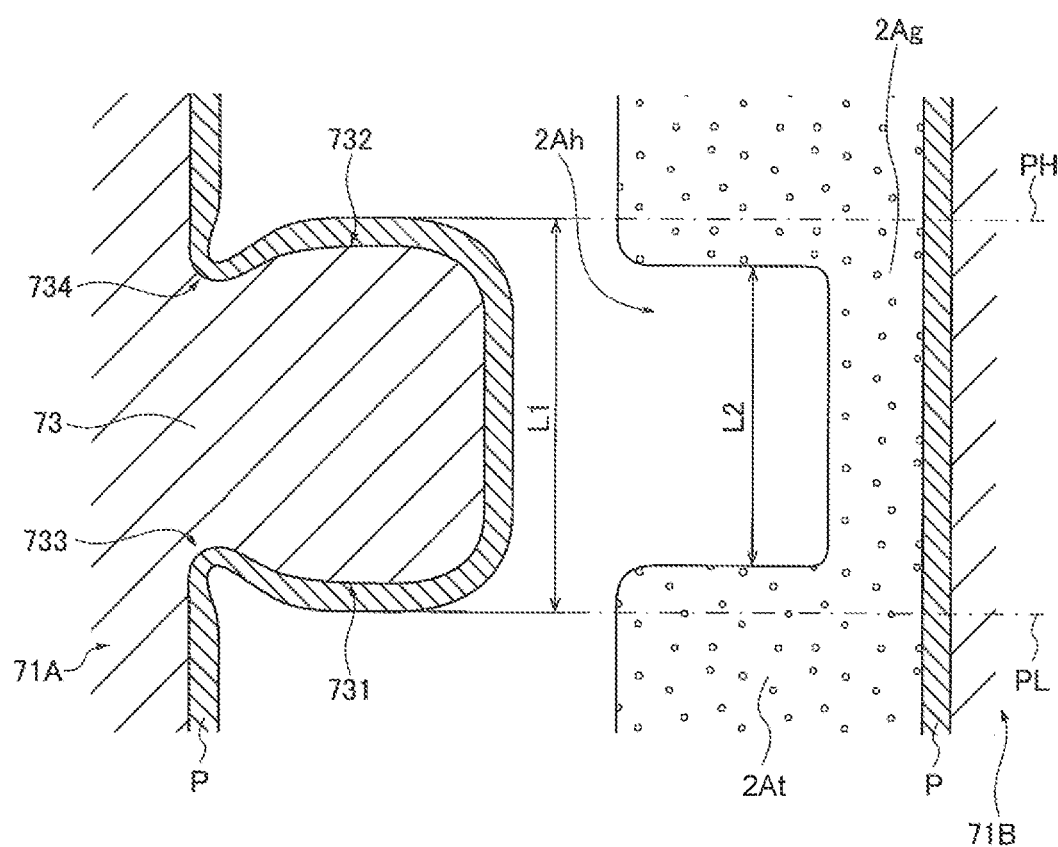

FIG. 46 is a view showing a step of welding a foamed body according to a modified example of the first embodiment to a molten resin sheet.

Figure 47A:
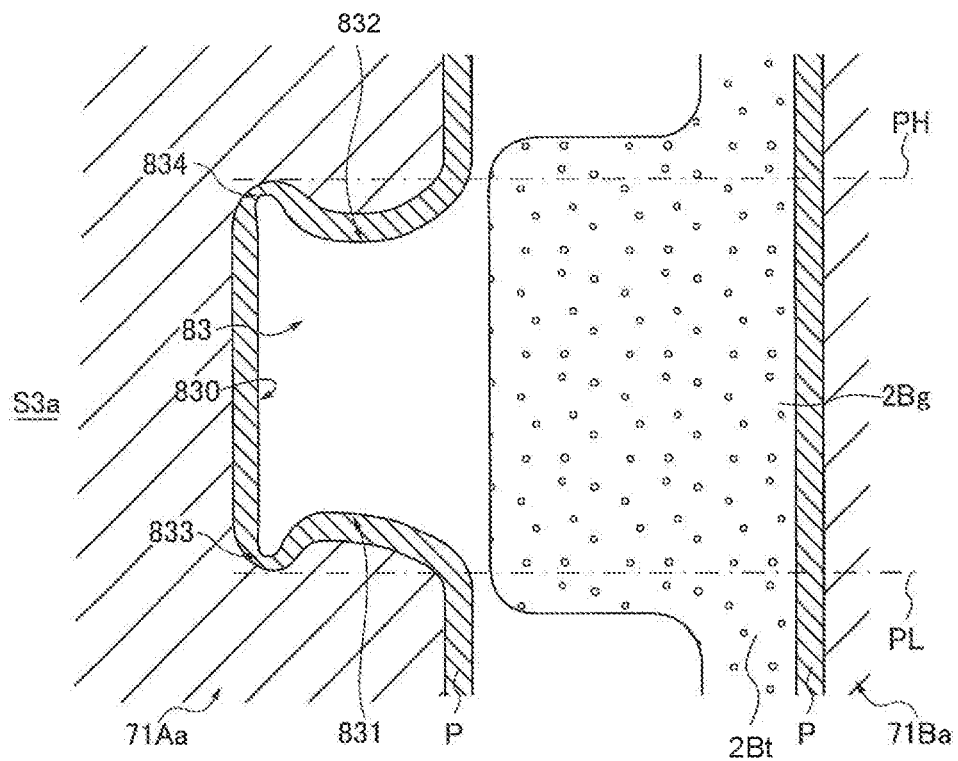
Figure 47B:
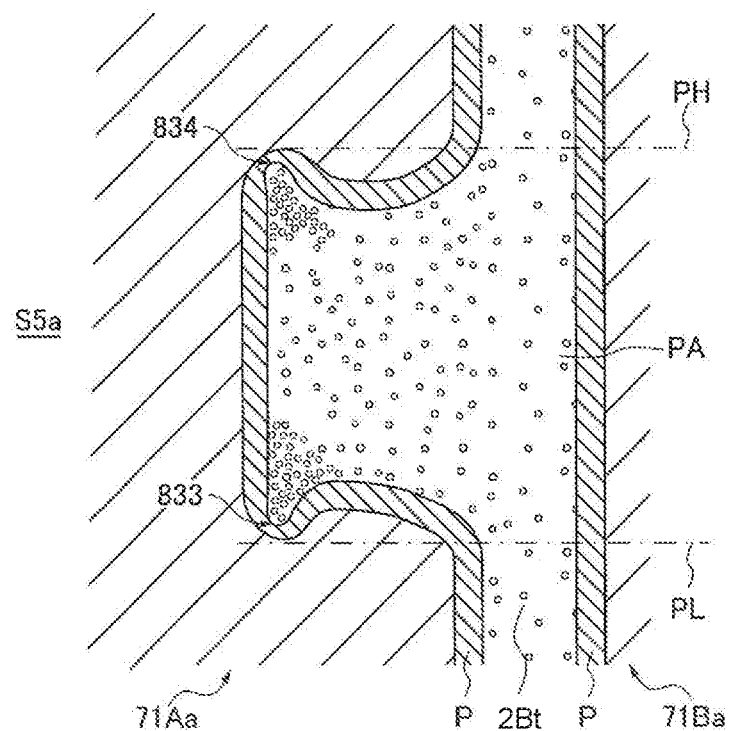

FIGS. 47A and 47B are views sequentially showing a molding step for a part of the resin panel of the second embodiment respectively.

Fourth Aspect

Figure 48:
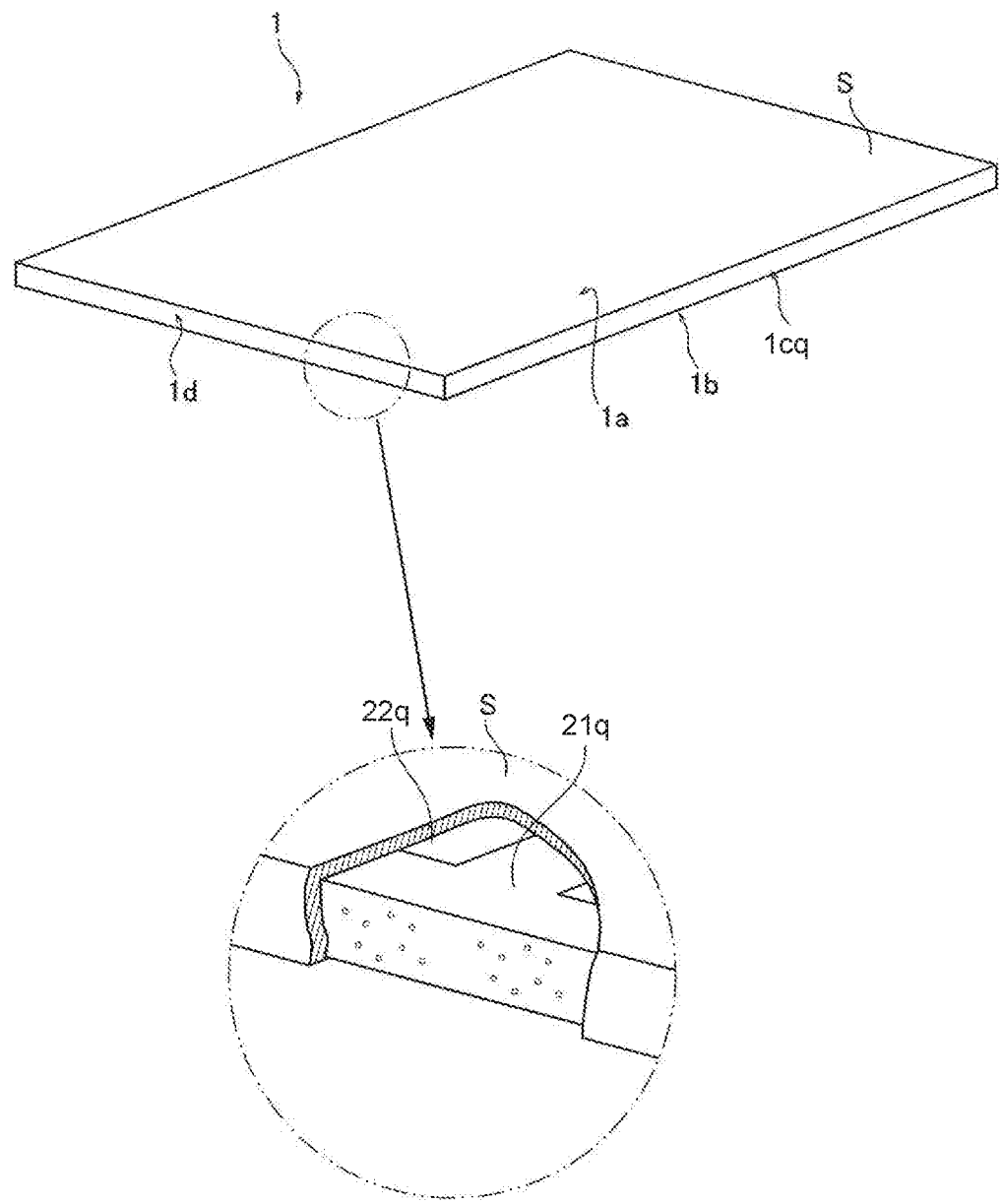

FIG. 48 is a perspective view of the resin panel of the embodiment and an enlarged cut-away view of a part thereof.

Figure 49:
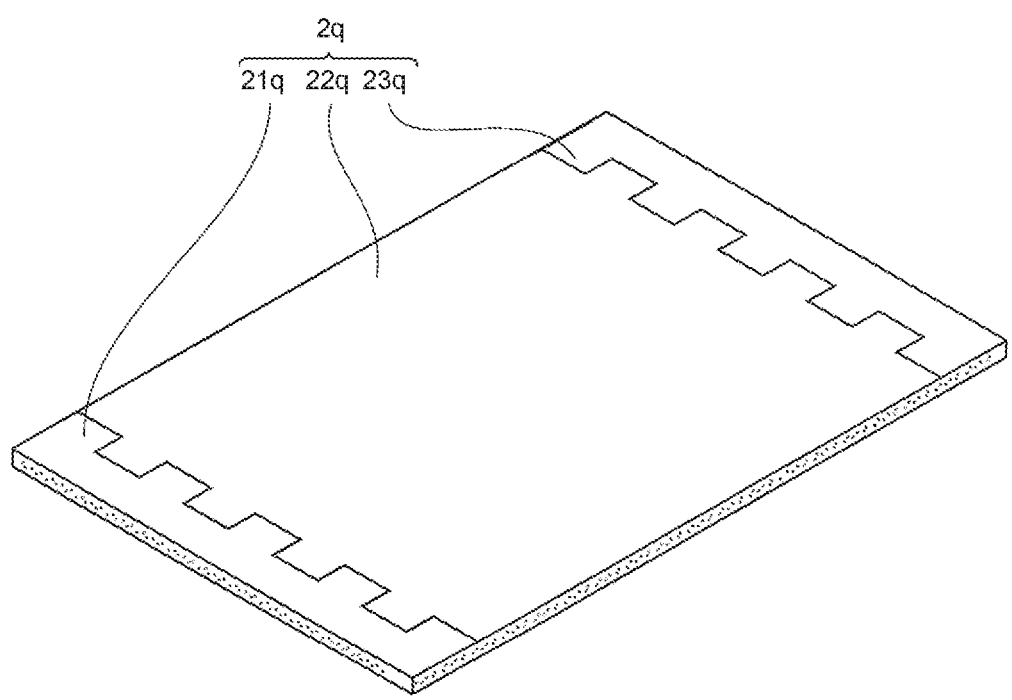

FIG. 49 is a perspective view of an interior material installed in the resin panel of the embodiment.

Figure 50A:
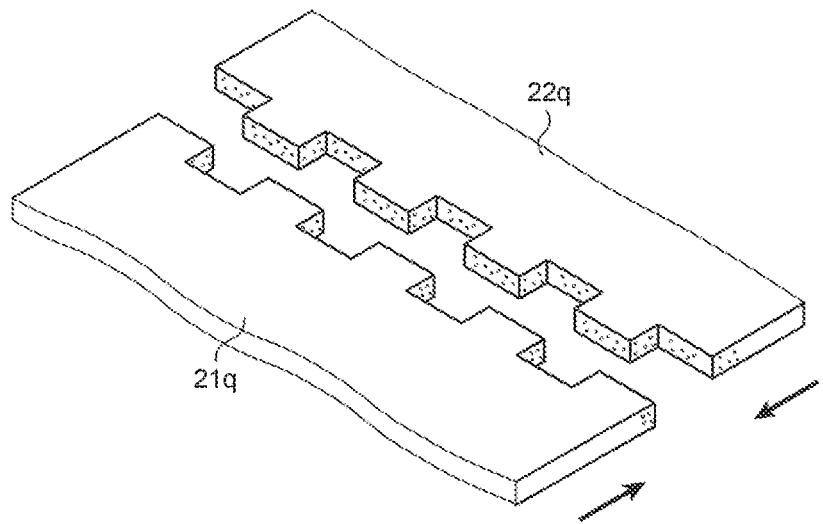
Figure 50B:
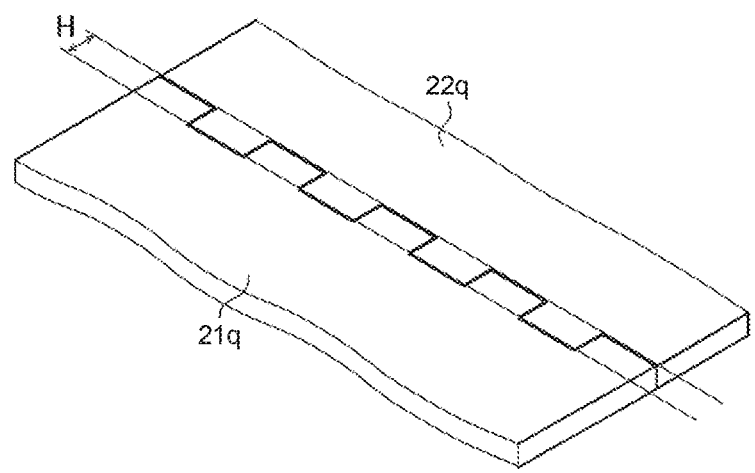

FIGS. 50A and 50B are views for explaining a method of forming an interior material of an embodiment by a plurality of foamed portions.

Figure 51:
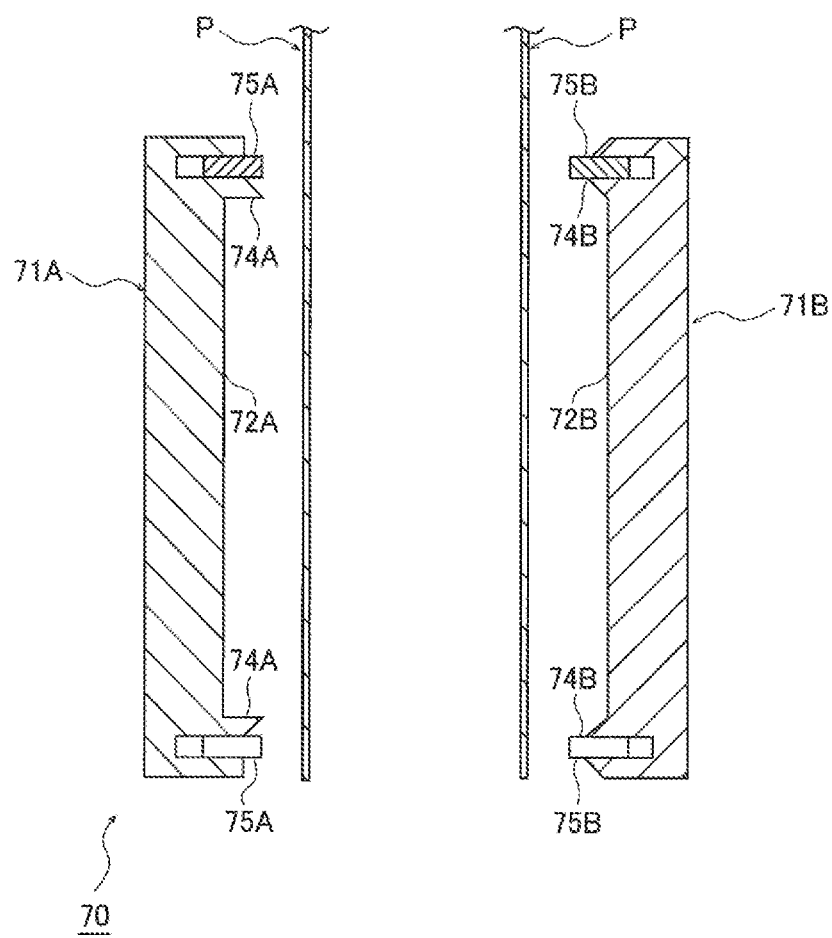
Figure 52:
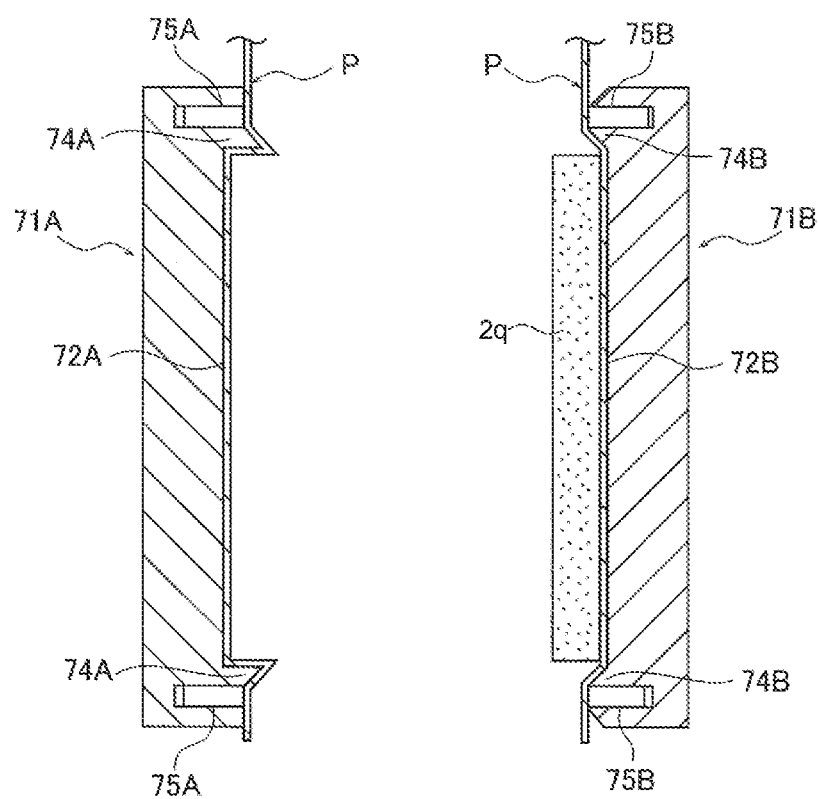

FIGS. 51 and 52 are views each for explaining a step of molding the cover material of the resin panel according to the embodiment.

Figure 53:
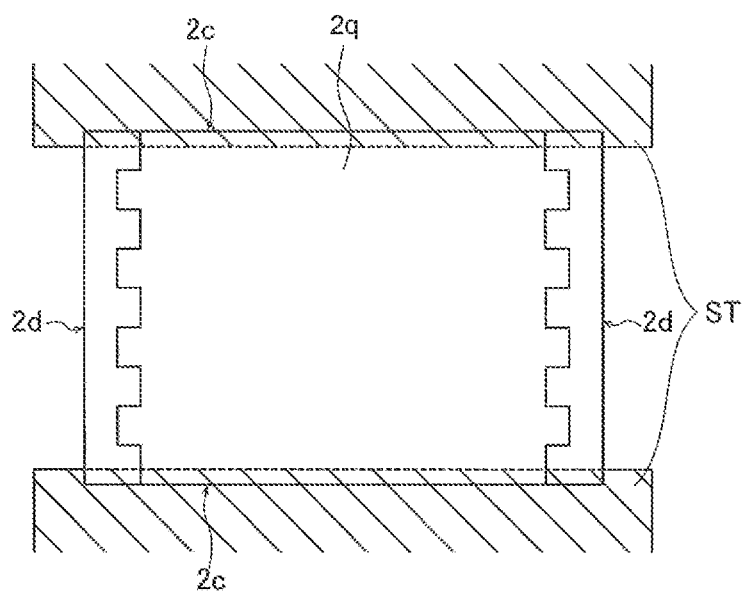

FIG. 53 is a plan view showing an application example of the resin panel of the embodiment.

FIGS. 54A to 59 are views each showing an interior material according to a modified example of the embodiment.

FIGS. 60A to 65B are views each for explaining a method of connecting two foamed portions.

Figure 66:
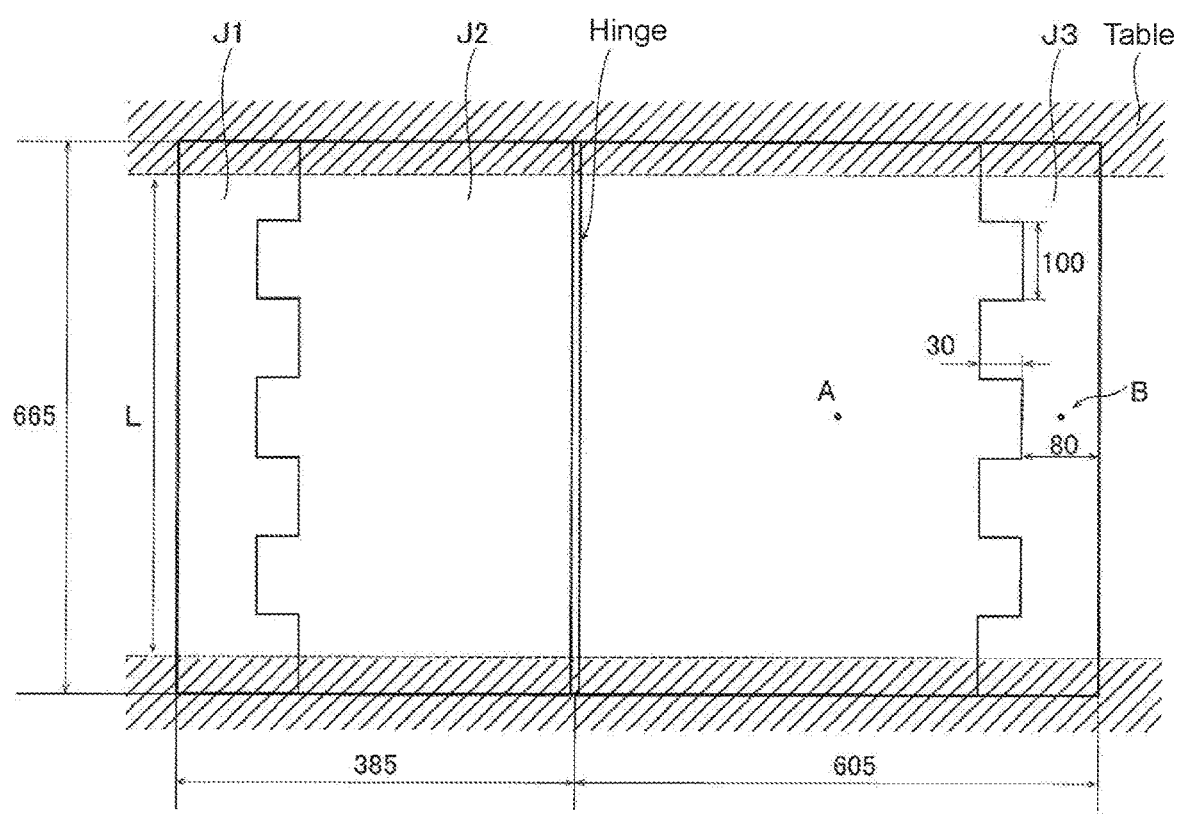

FIG. 66 is a plan view of the interior material according to the embodiment.

Figure 67:
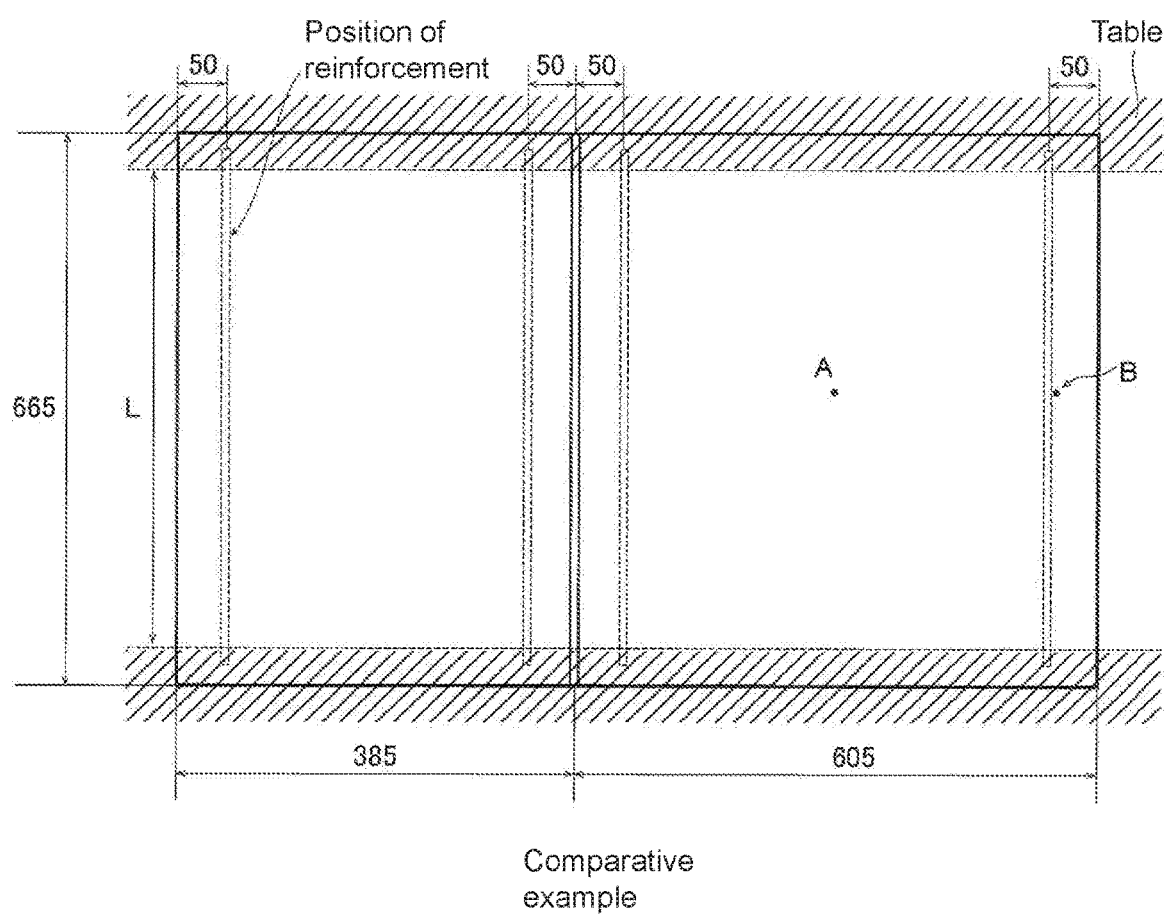

FIG. 67 is a plan view of an interior material according to a comparative example.

DESCRIPTION OF EMBODIMENTS

Various embodiments of the present invention are described below. The embodiments below can be combined with one another. And, each feature independently establishes the present invention.

First Aspect

Hereinafter, the resin panel 1 according to the first aspect of the present invention and the interior material 10f for the resin panel 1 will be described. Interior material 10f for resin panel 1 is an example of the foamed structure of the present invention.

1 First Embodiment 1-1 Interior Material 10f for Resin Panel 1 and Resin Panel 1

Figure 1:
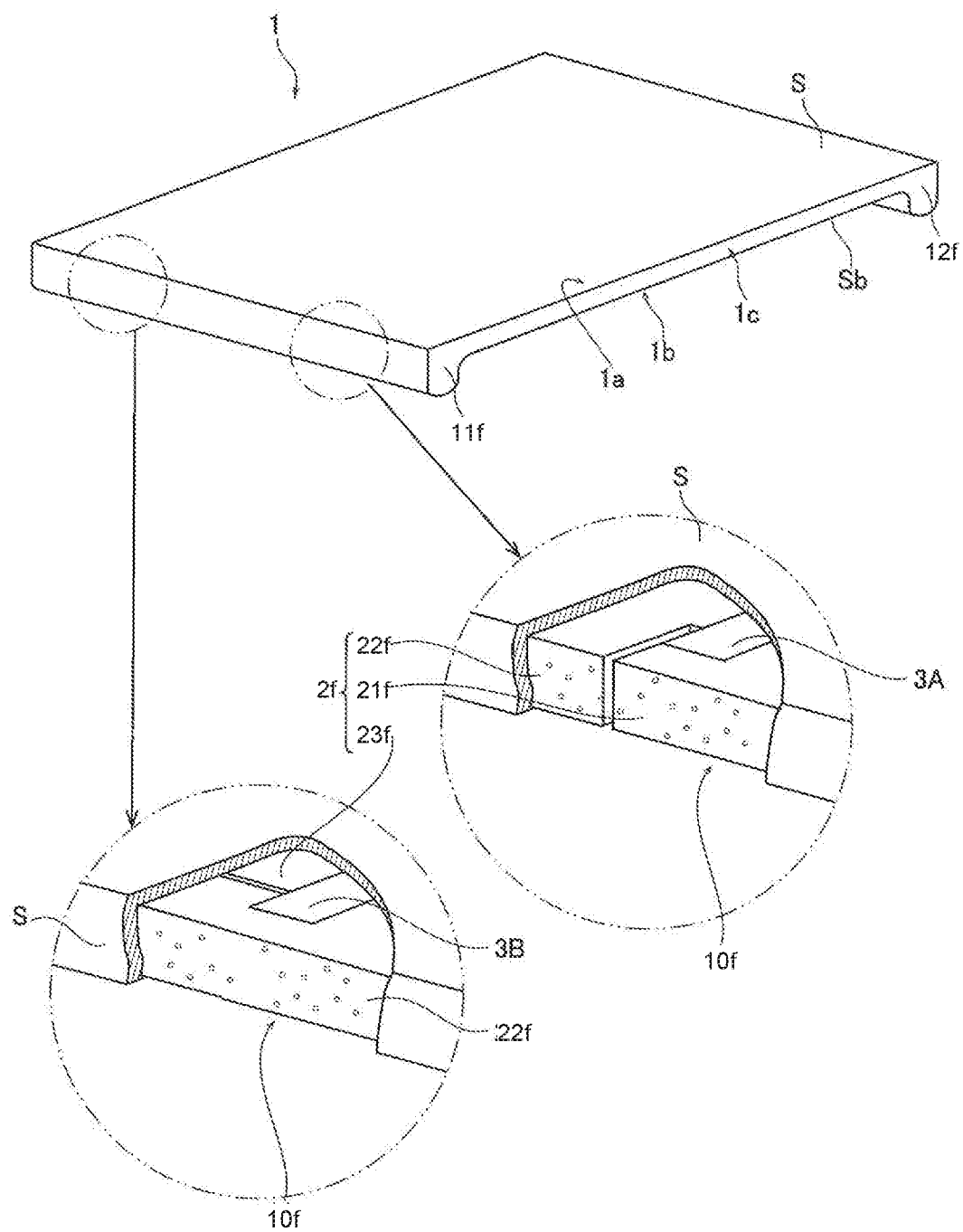
FIG. 1 is a perspective view of a front side of a resin panel according to a first embodiment and an enlarged cut-away view of a part thereof.
Figure 2:
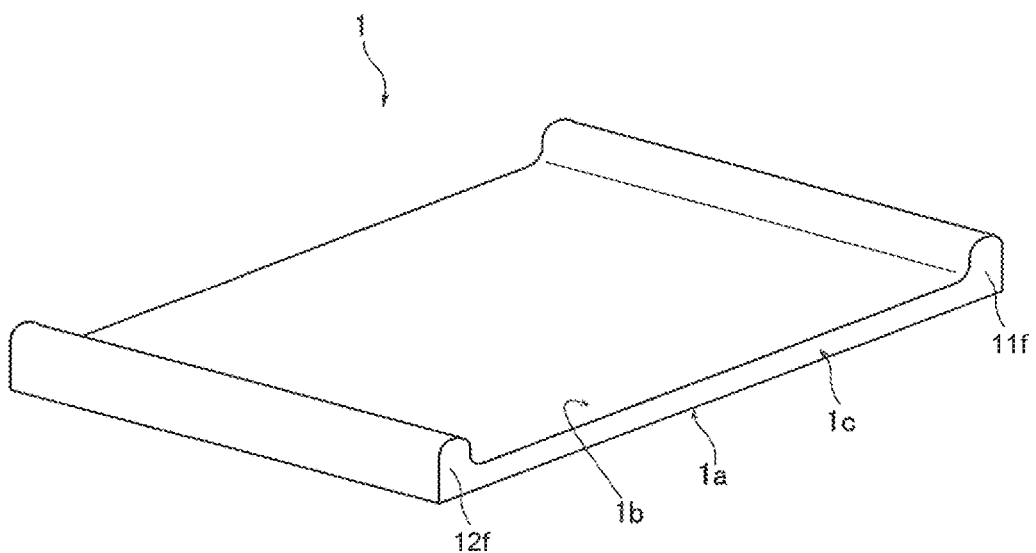
FIG. 2 is a perspective view of the back side of the resin panel of the first embodiment.
Figure 3:
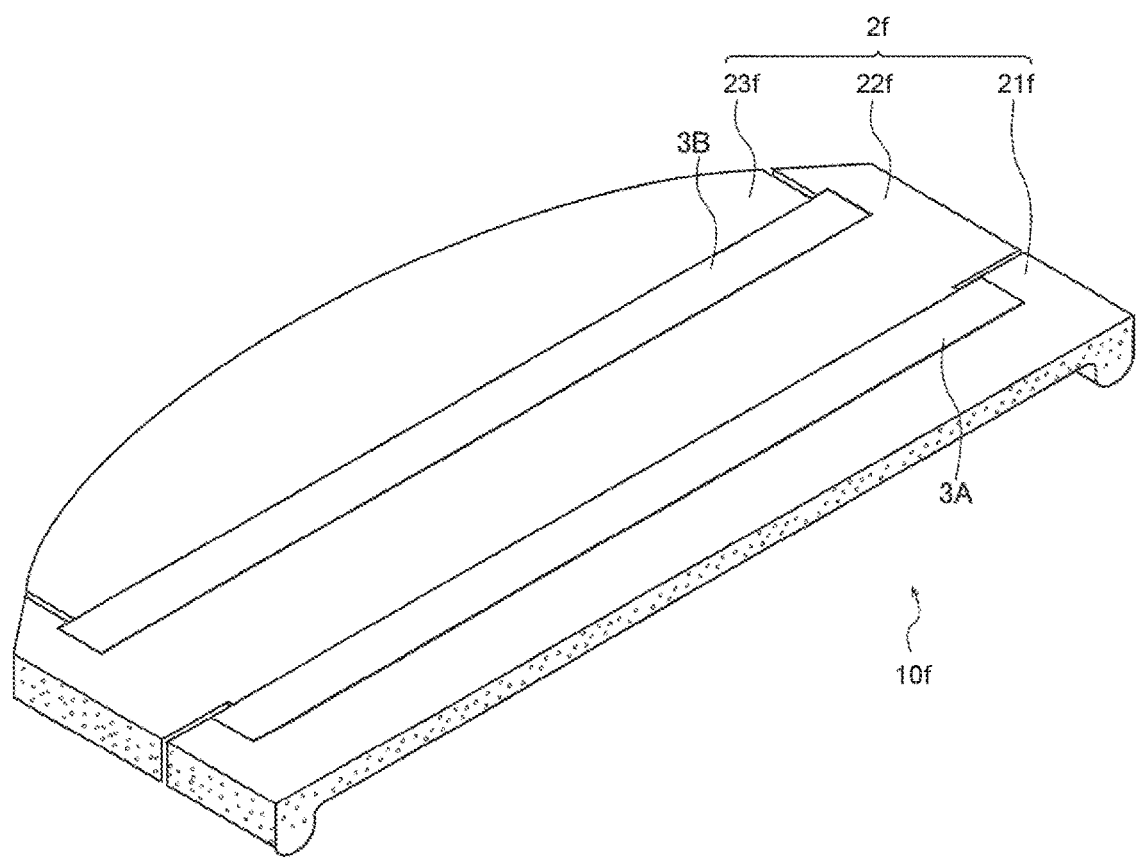
FIG. 3 is a perspective view of the interior material of the first embodiment.

Referring to FIGS. 1 to 3, the configuration of the resin panel 1 and the interior material 10f of this embodiment will be described.

FIG. 1 is a perspective view of the front side of the resin panel 1 of this embodiment and an enlarged cut-away view of a part thereof.

FIG. 2 is a perspective view of the back side of the resin panel 1 of the present embodiment.

FIG. 3 is a perspective view of an interior material 10f as a foamed structure of the present embodiment.

As shown in FIG. 1, an outer shape of the resin panel 1 according to the embodiment has a front surface 1a, a back surface 1b, and a side wall surface 1c interposed between the front surface 1a and the back surface 1b. The front surface 1a, the back surface 1b, and the side wall surface 1c are made of thermoplastic resin material S, and the interior material 10f is provided in the front surface 1a, the back surface 1b, and the side wall surface 1c. That is, the resin panel 1 has a structure in which an interior material 10f is covered with a cover material S of thermoplastic resin.

As shown in FIG. 1 and FIG. 2, in the resin panel 1 of the present embodiment, raised portions 11f and 12f protruding from the flat portion of the back surface 1b are formed at an end portions of the resin panel.

In the resin panel 1 of the embodiment, the cover material S is not limited to its resin material, but the cover material S is preferably formed from a non-foamed resin to ensure the rigidity of the resin panel 1. For example, considering moldability, the cover material S may be made by mixing polystyrene (PS) and styrene ethylene butylene styrene block copolymer resin (SEBS) in polypropylene (PP) as main material.

As shown in FIGS. 1 and 3, the interior material 10f is a composite structure in which a reinforcement 3A intervenes between foaming bodies 21f and 22f and a reinforcement 3B intervenes between foaming bodies 22f and 23f.

The Reinforcements 3A and 3B are each an elongated member. As will be described later, the cross-sectional shape of the reinforcement 3A and 3B are H-shape (H type extruded reinforcement). The shapes of the reinforcements 3A and 3B are not limited to this shape. The cross-sectional shape of the reinforcement 3A and 3B may be, for example, a C-shape, a rectangular pipe shape, a circular pipe shape. The cross-sectional shape of the reinforcements 3A and 3B may be any shape as long as it can be fitted to each foamed body and integrated.

The reinforcements 3A and 3B are preferably made of a metal such as aluminum or a hard plastic. The shapes of the foaming bodies 21f to 23f are not particularly limited as long as they are appropriately determined to secure the appearance, strength and rigidity required for the resin panel 1.

In the resin panel 1 of the embodiment, the foaming bodies 21f to 23f are molded using, for example, thermoplastic resin.

The resin material is not limited, but includes, for example, polyolefin such as polypropylene and polyethylene, acrylic derivative such as polyamide, polystyrene, polyvinyl chloride, or mixture of two or more of these materials.

The expansion ratio of the foaming bodies 21f to 23f is not particularly limited. The expansion ratio is, for example, in the range of 1.5 to 60 times, typically 20 times or 30 times, preferably 10 to 45 times, more preferably 15 to 35 times. Then, the expansion ratio is a value obtained by dividing a density of the mixed resin before foaming by an apparent density of the foamed resin after foaming.

In the resin panel 1 of the embodiment, foaming agents usable for the foaming bodies 21f to 23f are known physical foaming agents, chemical foaming agents and mixtures of these agents.

Examples of physical foaming agent, inorganic physical foaming agent such as air, carbon dioxide gas, nitrogen gas, and organic physical foaming agent such as butane, pentane, hexane, dichloromethane, dichloroethane may be adapted to this embodiment.

Examples of organic foaming agent for chemical foaming agent, azodicarbonamide (ADCA), N,N'-dinitrosopentamethylenetetramine, 4,4'-oxybis (benzenesulfonyl hydrazide), diphenylsulfone-3,3' disulfonylhydrazide, p-Toluenesulfonyl semicarbazide, trihydrazino triazine, azobisisobutyronitrile may be adapted to this embodiment.

Examples of inorganic foaming agent of chemical foaming agent, polycarboxylic acid may be adapted to this embodiment. Examples of the polycarboxylic acid, citric acid, oxalic acid, fumaric acid, phthalic acid, malic acid, tartaric acid, cyclohexane-1,2-dicarboxylic acid, camphoric acid, ethylenediaminetetraacetic acid, triethylenetetramine hexaacetic acid, nitriloic acid may be adapted to this embodiment.

And examples of the inorganic foaming agent of chemical foaming agent, mixture of inorganic carbonate compounds can also be applied. Example of the mixture of inorganic carbonate compounds, sodium hydrogen carbonate, sodium aluminum hydrogen carbonate, potassium hydrogen carbonate, ammonium hydrogen carbonate, ammonium carbonate may be adapted to this embodiment.

And examples of the inorganic foaming agent of chemical foaming agent, salt of polycarboxylic acid can also be applied. Examples of the salt of polycarboxylic, sodium hydrogen citrate, potassium oxalate may be adapted to this embodiment.

For the purpose of increasing the rigidity and strength, the cover material S and the foaming bodies 21f to 23f may be molded using the resin material mixed with glass filler.

Examples of the glass filler, glass fiber, glass fiber cloth such as glass cloth and glass nonwoven fabric, glass beads, glass flake, glass powder, milled glass may be adapted to this embodiment.

Examples of the glass, E glass, C glass, A glass, S glass, D glass, NE glass, T glass, quartz, low dielectric constant glass, high dielectric constant glass may be adapted to this embodiment.

The material mixed into the resin material is not limited to the glass filler. Inorganic fillers such as talc, calcium carbonate, wollastonite, magnesium-based materials, and carbon fibers may be adapted to this embodiment.

1-2. Detailed Structure of Interior Material 10f

Next, with reference to FIGS. 4 to 13, detailed structures of the interior material 10f of this embodiment will be described.

The foaming bodies 21f to 23f of the interior material 10f are obtained by cutting off molded body 2f.

1-2-1. Configuration of Molded Body 2F

First, the configuration of the molded body 2f will be described with reference to FIGS. 4 to 10.

Figure 4:
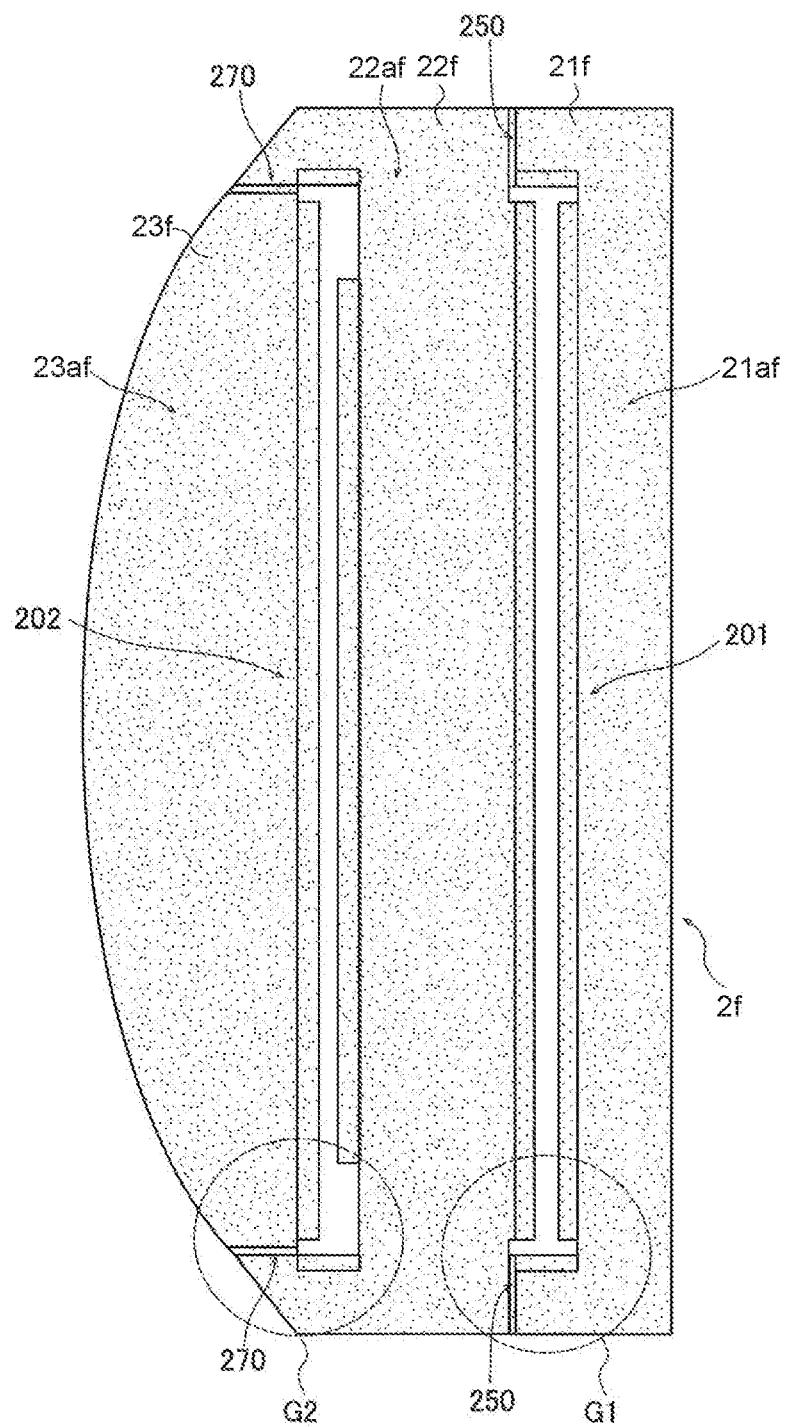
FIG. 4 is a plan view of a foamed body of the first embodiment.

FIG. 4 is a plan view of the molded body 2f of the present embodiment.

Figure 5:
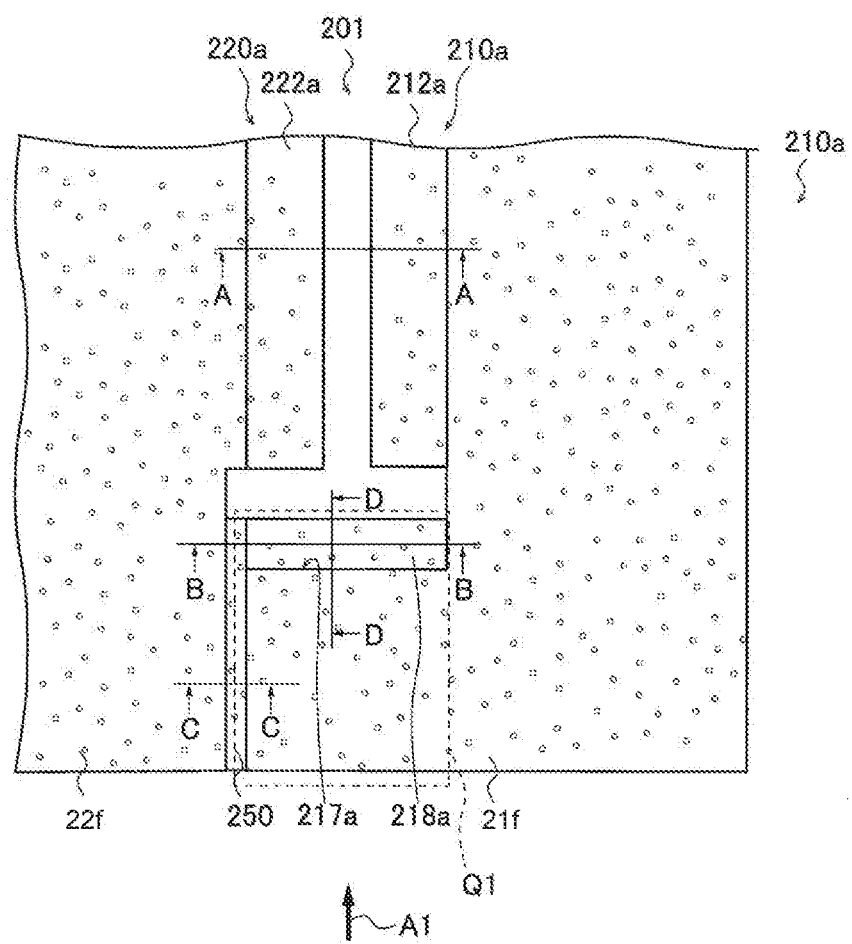
FIG. 5 is an enlarged view of an area G1 in FIG. 4.

FIG. 5 is an enlarged view of an area G1 of FIG. 4.

Figure 6:
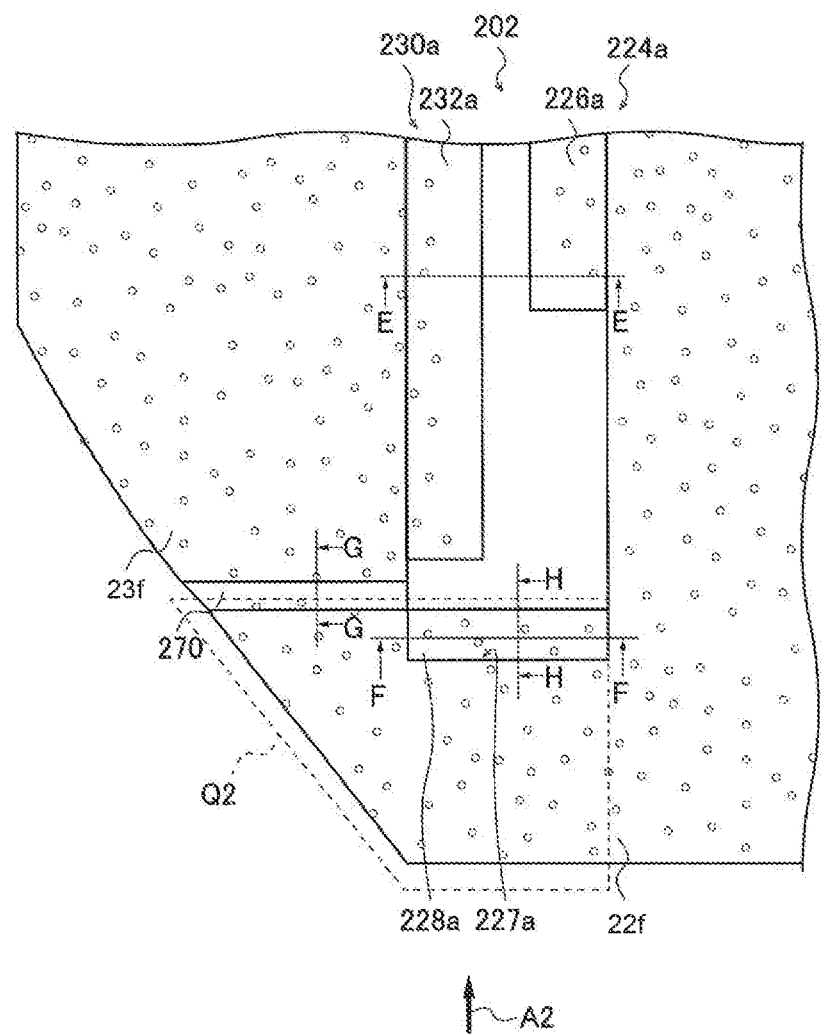
FIG. 6 is an enlarged view of an[ area G2 in FIG. 4.

FIG. 6 is an enlarged view of an area G2 in FIG. 4.

Figure 7A:
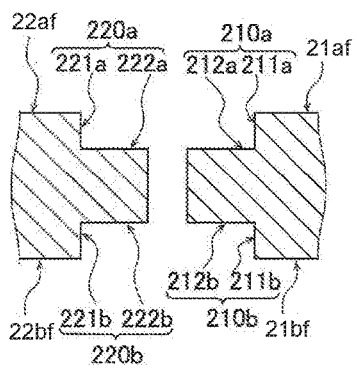
FIG. 7A to 7C are cross-sectional views taken along lines A-A, B-B, and C-C shown in FIG. 5 respectively.
Figure 7B:
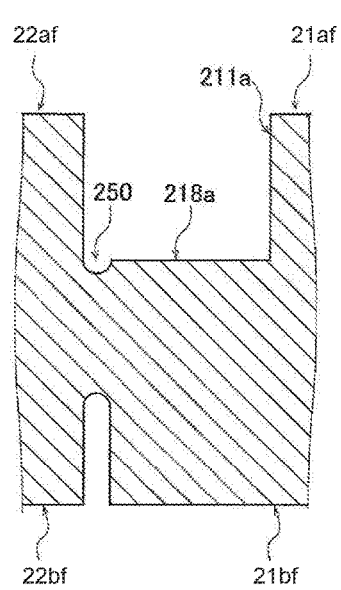
Figure 7C:
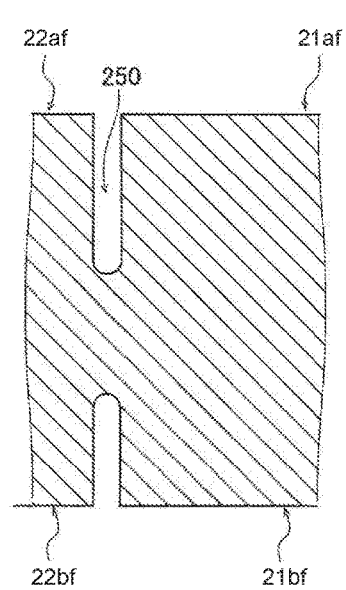

FIGS. 7A to 7C are cross-sectional views taken along lines A-A, B-B, and C-C shown in FIG. 5 respectively.

Figure 8:
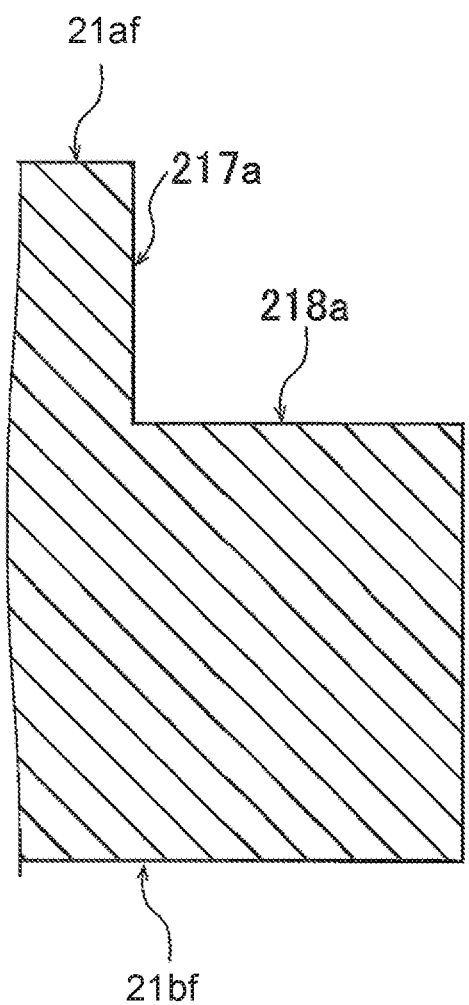
FIG. 8 is a cross-sectional view taken along line D-D in FIG. 5.

FIG. 8 is a cross sectional view taken along the line D-D in FIG. 5.

Figure 9A:
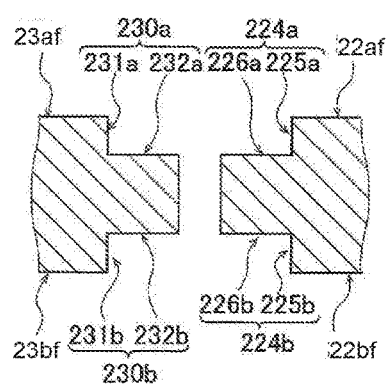
FIGS. 9A to 9C is cross-sectional views taken along line E-E, and G-G shown in FIG. 6 respectively.
Figure 9B:
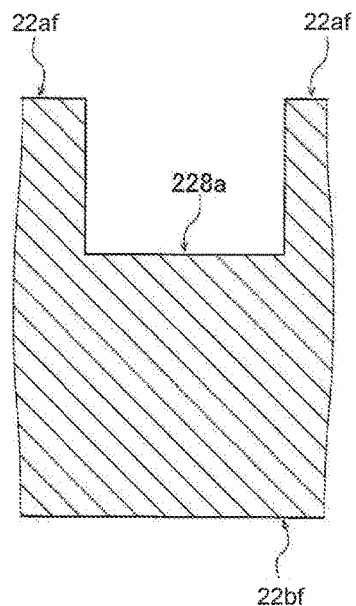
Figure 9C:
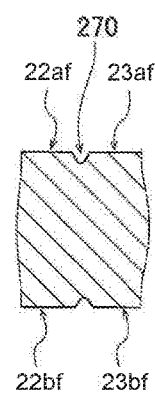

FIGS. 9A to 9C are cross-sectional views taken along line E-E, F-F, and G-G shown in FIG. 6 respectively.

Figure 10:
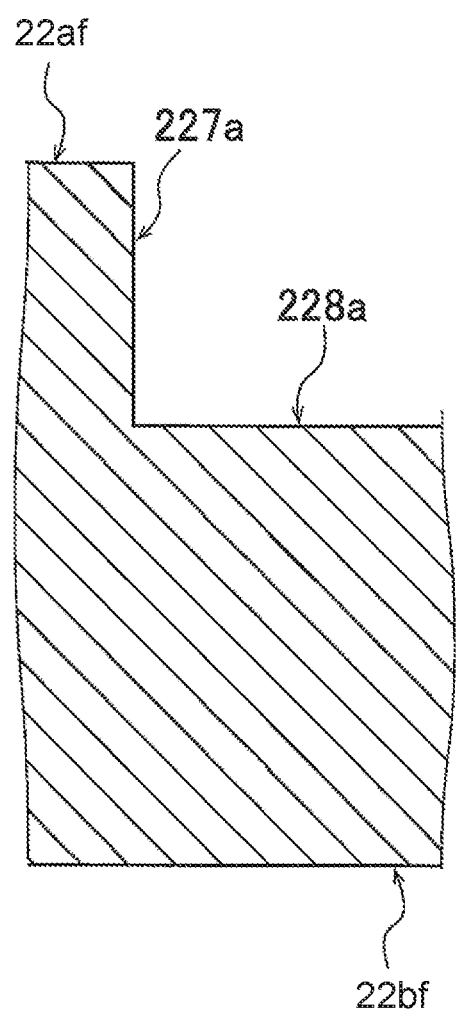
FIG. 10 is a cross-sectional view taken along line H-H shown in FIG. 6.

FIG. 10 is a cross-sectional view taken along the line H-H shown in FIG. 6.

As shown in FIG. 4, a front surface of the molded body 2f has linear groove portions 201 and 202 extending from one end to the other end. On the back surface of molded body 2f, the groove portions 201 and 202 are also formed.

The molded body 2f is separated into foaming bodies 21f to 23f. After the groove portions 201 and 202 are separated, the groove portions 201 and 202 are provided to fit reinforcements 3A and 3B (H type extruded reinforcement) having an H-shaped cross section into the foamed body.

The front surface of the molded body 2f comprises the front surface 21a of the foamed body 21f, the front surface 22af of the foamed body 22f, and the front surface 23af of the foamed body 23f. As shown in FIG. 4, the foamed portions 21 to 23 extend substantially in a direction each of the groove portion 201 and 202 extending (example for a first direction).

The foamed portions 21 and 22 face to each other with a gap therebetween across the groove portion 201, and the foamed portions 22 and 23 face to each other with a gap therebetween across the groove portion 202. As will be described later, the reinforcement 3A is placed in the gap between foamed portions 21 and 22 and the reinforcement 3B is placed in the gap between foamed portions 22 and 23.

Two boundaries 250 are provided in an end side of the portion where the reinforcement 3A is fitted, and two boundaries 250 define the boundary between the foamed body 21f and the foamed body 22f. The boundary 250 is a portion for separating the foamed body 21f and the foamed body 22f. In the example of the present embodiment, the two boundaries 250 are corlinear, which makes it easier to break the molded body 2f into the foamed body 21f and the foamed body 22f in the boundary 250.

The two boundaries 270 are provided in the end side of the portion where the reinforcement 3B is fitted, and the two boundaries 270 define the boundary between the foamed body 22f and the foamed body 23f. The boundary 270 is a portion for separating the foamed body 22f and the foamed body 23f. In the example of the present embodiment, the boundary 270 is provided avoiding the molded body 2f portion corresponding to the raised portions 11f and 12f. The boundary 270 is provided in a direction different from the extending direction of the reinforcement 3B (extending direction of the groove portion 202).

The molded body 2f is molded by, for example, a bead type internal foam molding method. Molded examples by the bead type internal foam molding method are disclosed in, for example, Japanese Unexamined Patent Application Publication No. 2014-128938.

As shown in FIG. 5 and in the cross section A-A in FIG. 7A, in the groove portion 201, a front side stepped portion 210a of the foamed body 21f and a front side stepped portion 220a of the foamed body 22f have steps formed therein respectively. These steps are based on the front surface 21a of the foamed body 21f and the front surface 22af of the foamed body 22f respectively.

The front side stepped portion 210a and the front side stepped portion 220a extend in the extending direction of the reinforcement 3A and face one another.

The front side stepped portion 210a includes a front side engaging surface 212a engaging with the reinforcement 3A and a front side wall surface 211a interposed between the front side engaging surface 212a and the front surface 21a. The front side stepped portion 220a includes a front side engaging surface 222a engaging with the reinforcement 3A and a front side wall surface 221a interposed between the front side engaging surface 222a and the front surface 22af.

Likewise, a back side stepped portion 210b of the foamed body 21f and a back side stepped portion 220b of the foamed body 22f form steps respectively. These steps are based on a back surface 21bf of the foamed body 21f and a back surface 22bf of the foamed body 22f.

The back side stepped portion 210b and the back side stepped portion 220b extend in the extending direction of the reinforcement 3A and face one another.

The back side stepped portion 210b includes a back side engaging surface 212b engaging with the reinforcement 3A and a back side wall surface 211b interposed between the back side engaging surface 212b and the back surface 21bf. The back side stepped portion 220b includes a back side engaging surface 222b engaging with the reinforcement 3A and a back side wall surface 221b interposed between the back side engaging surface 222b and the back surface 22bf.

The steps of the front side stepped portions 210a and 220a are preferably set so that the front surfaces 21a and 22a of the foaming bodies 21f and 22f and the upper surface of the reinforcement 3A are substantially coplanar in a state where the foaming bodies 21f and 22f are integrally fitted to the reinforcement 3A. The steps of the front side stepped portions 210a and 220a are not limited to this.

The steps of the back side stepped portions 210b and 220b are preferably set so that the back surfaces 21bf and 22bf of the foaming bodies 21f and 22f and the lower surface of the reinforcement 3A are substantially coplanar in a state where the foaming bodies 21f and 22f are integrally fitted to the reinforcement 3A. The steps of the back side stepped portions 210b and 220b are not limited to this.

The steps of the front side stepped portions 210a and 220a and the steps of the back side stepped portions 210b and 220b may be different from one another. A distance between the front side wall surfaces 211a and 221a and a distance between the back side wall surfaces 211b and 221b may be arbitrarily set as long as the reinforcement 3A can be engaged.

As shown in FIG. 5, the foamed body 21f has a portion Q1 overlapping the stepped portions 220a and 220b of the foamed body 22f when viewed from an extending direction A1 (extending direction of the groove portion 201) of the stepped portions 210a and 210b. That is, the foamed portion 21 has the portion overlapping with the foamed portion 22 as seen from the direction A1. The portion Q1 may overlap in entire region in a width direction of the engaging surfaces 222a and 222b of the stepped portions 220a and 220b of the foamed body 22f or may overlap a part of this entire region.

In cross section B-B in FIG. 7B, a mounting surface 218a is a surface on which the end portion of the reinforcement 3A is placed. The mounting surface 218a is formed at both ends of the groove portion 201 and supports reinforcement 3A at both ends.

As shown in the cross section C-C in FIG. 7C, the boundary 250 is formed to be thin so that the foamed body 21f and the foamed body 22f are cut off easily.

Thickness of the boundary 250 is not particularly limited. This thickness is appropriately determined on the basis of formability and workability of cutting.

As shown in FIG. 5 and in the cross section D-D in FIG. 8, the portion Q1 of the foamed body 21f has an contacting wall surface 217a interposed between the front surface 21a and the mounting surface 218a. The contacting wall surface 217a is formed to face one end of the reinforcement 3A. The contacting wall surface 217a functions as a stopper contacting the reinforcement 3A so that the reinforcement 3A does not fall off from the interior material 10f. As shown in FIG. 5, the contacting wall surface 217a is formed over an entire width of the groove portion 201. In other words, the contacting wall surface 217a is formed over an entire region (see A-A cross section in FIG. 7A) between the front side wall surface 211a and the front side wall surface 221a as seen from the extending direction of the groove portion 201.

As shown in FIG. 5, the contacting wall surface 217a is preferably orthogonal to the extending direction A1 of the stepped portions 210a and 210b, thereby effectively functioning as the stopper of the reinforcement 3A. The contacting wall surface 217a is not limited to being orthogonal to the extending direction A1. The contacting wall surface 217a can function as the stopper even if the contacting wall surface 217a slopes with respect to a direction orthogonal to the extending direction A1.

As shown in FIG. 6 and in the cross section E-E in FIG. 9E, in the groove portion 202, a front side stepped portion 224a of the foamed body 22f and a front side stepped portion 230a of the foamed body 23f have steps formed therein respectively. These steps are based on the front surface 22af of the foamed body 22f and the front surface 23af of the foamed body 23f respectively.

The front side stepped portion 224a and the front side stepped portion 230a extend in the extending direction of the reinforcement 3B and face one another.

The front side stepped portion 224a includes a front side engaging surface 226a engaging with the reinforcement 3B and a front side wall surface 225a interposed between the front side engaging surface 226a and the front surface 22af. The front side stepped portion 230a includes a front side engaging portion 232a engaging with the reinforcement 3B and a front side wall surface 231a interposed between the front side engaging surface 232a and the front surface 23af.

Likewise, a back side stepped portion 224b of the foamed body 22f and a back side stepped portion 230b of the foamed body 23f have steps formed therein respectively. These steps are based on the back surface 22bf of the foamed body 22f and the back surface 23bf of the foamed body 23f respectively.

The back side stepped portion 224b and the back side stepped portion 230b extend in the extending direction of the reinforcement 3B and face one another.

The back side stepped portion 224b includes a back side engaging surface 226b engaging with reinforcement 3B and a back side wall surface 225b interposed between back side engaging surface 226b and back surface 22bf. The back side stepped portion 230b includes a back side engaging surface 232b engaging with the reinforcement 3B and a back side wall surface 231b interposed between the back side engaging surface 232b and the back surface 23bf.

The steps of the front side stepped portions 224a and 230a are preferably set so that the front surfaces 22af and 23af of the foaming bodies 22f and 23f and the upper surface of the reinforcement 3B are substantially coplanar in a state where the foaming bodies 22f and 23f are integrally fitted to the reinforcement 3B. The steps of the front side stepped portions 224a and 230a are not limited to this.

The step of the back side stepped portions 224b and 230b is preferably set so that the back surfaces 22bf and 23bf of the foaming bodies 22f and 23f and the lower surface of the reinforcement 3B are substantially coplanar in a state where the foaming bodies 22f and 23f are integrally fitted to the reinforcement 3B. The steps of the back side stepped portions 224b and 230b are not limited to this.

The steps of the front side stepped portions 224a and 230a and the steps of the back side stepped portions 224b and 230b may be different from one another. A distance between the front side wall surfaces 225a and 231a and a distance between the back side wall surfaces 225b and 231b may be arbitrarily set as long as the reinforcement 3B can be engaged.

As shown in FIG. 6, the foamed body 22f has a portion Q2 overlapping the stepped portions 230a and 230b of the foamed body 23f as seen from the extending direction A2 of the stepped portions 224a and 224b (the extending direction of the groove portion 202).

That is, the foamed portion 22 has a portion overlapping the foamed portion 23 as seen from the direction A2. The portion Q2 may overlap in an entire region in a width direction of the engaging surfaces 232a and 232b of the stepped parts 230a and 230b of the foamed body 23f or may overlap a part of this entire region.

In the section F-F in FIG. 9B, the mounting surface 228a is the surface on which the end portion of the reinforcement 3B is placed. The mounting surface 228a is formed at both ends of the groove portion 202 and supports reinforcement 3B at both ends.

As shown in the G-G cross section in FIG. 9C, in the boundary 270 is formed to be thin so that the foamed body 22f and the foamed body 23f are cut off easily.

Thickness of the boundary 270 is not particularly limited. This thickness is appropriately determined on the basis of formability and workability of cutting.

As shown in FIG. 6 and in the cross section H-H in FIG. 10, the portion Q2 of the foamed body 22f has an contacting wall surface 227a interposed between the front surface 22af and the mounting surface 228a.

The contacting wall surface 227a is formed to face one end of the reinforcement 3B. The contacting wall surface 227a functions as a stopper contacting the reinforcement 3B so that the reinforcement 3B does not fall off from the interior material 10f. As shown in FIG. 6, the contacting wall surface 227a is formed over an entire width of the groove portion 202. In other word, the contacting wall surface 227a is formed over an entire region (see E-E cross section in FIG. 9A) between the front side wall surface 225a and the front side wall surface 231a as seen from the extending direction of the groove portion 202.

As shown in FIG. 6, the contacting wall surface 227a is preferably orthogonal to the extending direction A2 of the stepped portions 224a and 224b, thereby effectively functioning as the stopper of the reinforcement 3B.

The contacting wall surface 227a is not limited to being orthogonal to the extending direction A2. The contacting wall surface 227a can function as the stopper even if the contacting wall surface 227a slopes with respect to a direction orthogonal to the extending direction A2.

1-2-2. Assembling Interior Material 10f

Next, a method of assembling the interior material 10f based on the above molded body 2f will be described with reference to FIGS. 11 to 13.

Figure 11:
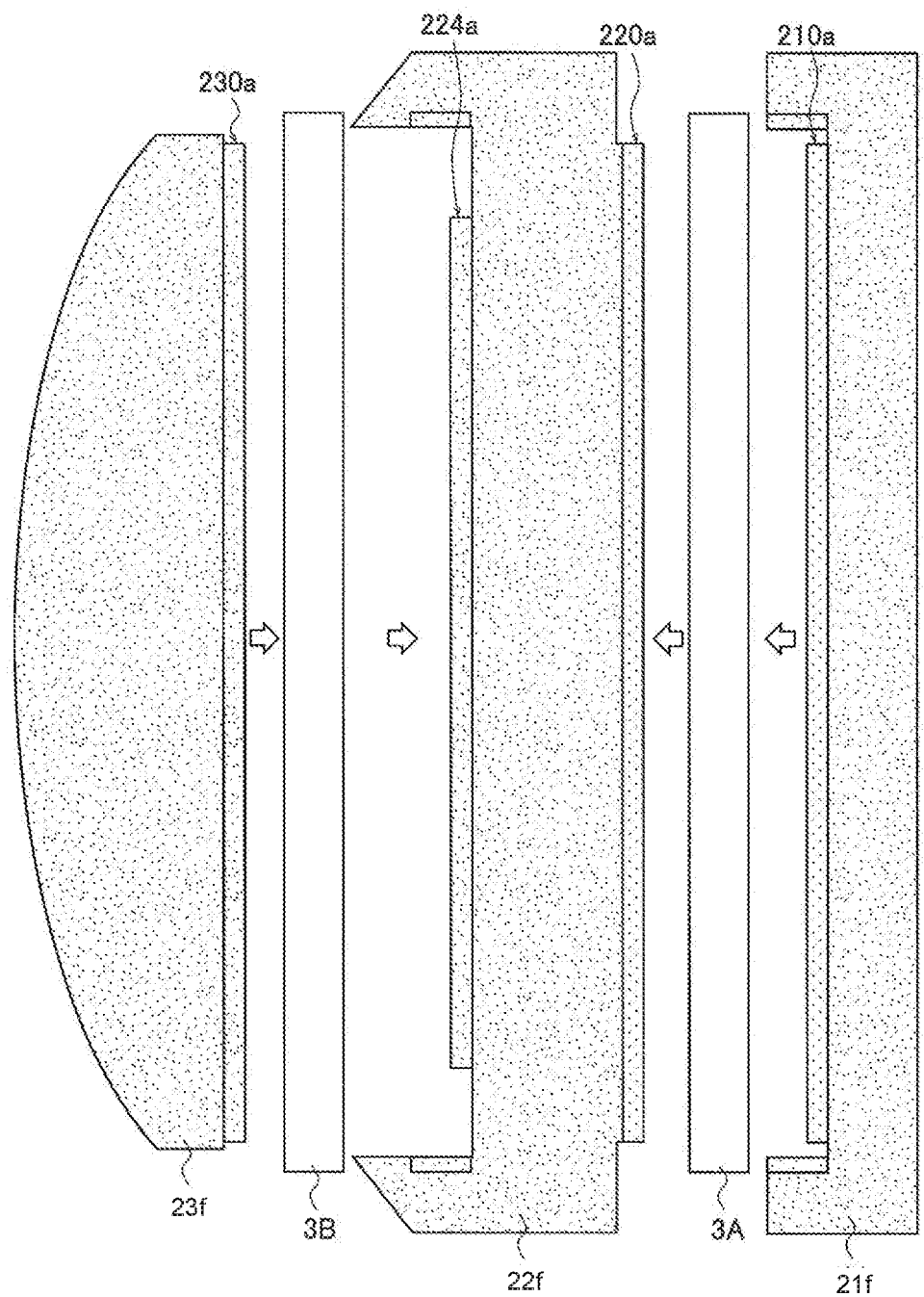
FIG. 11 is a view showing a step of assembling the interior material of the first embodiment.

FIG. 11 is a view showing a step of assembling the interior material 10f of the present embodiment.

Figure 12:
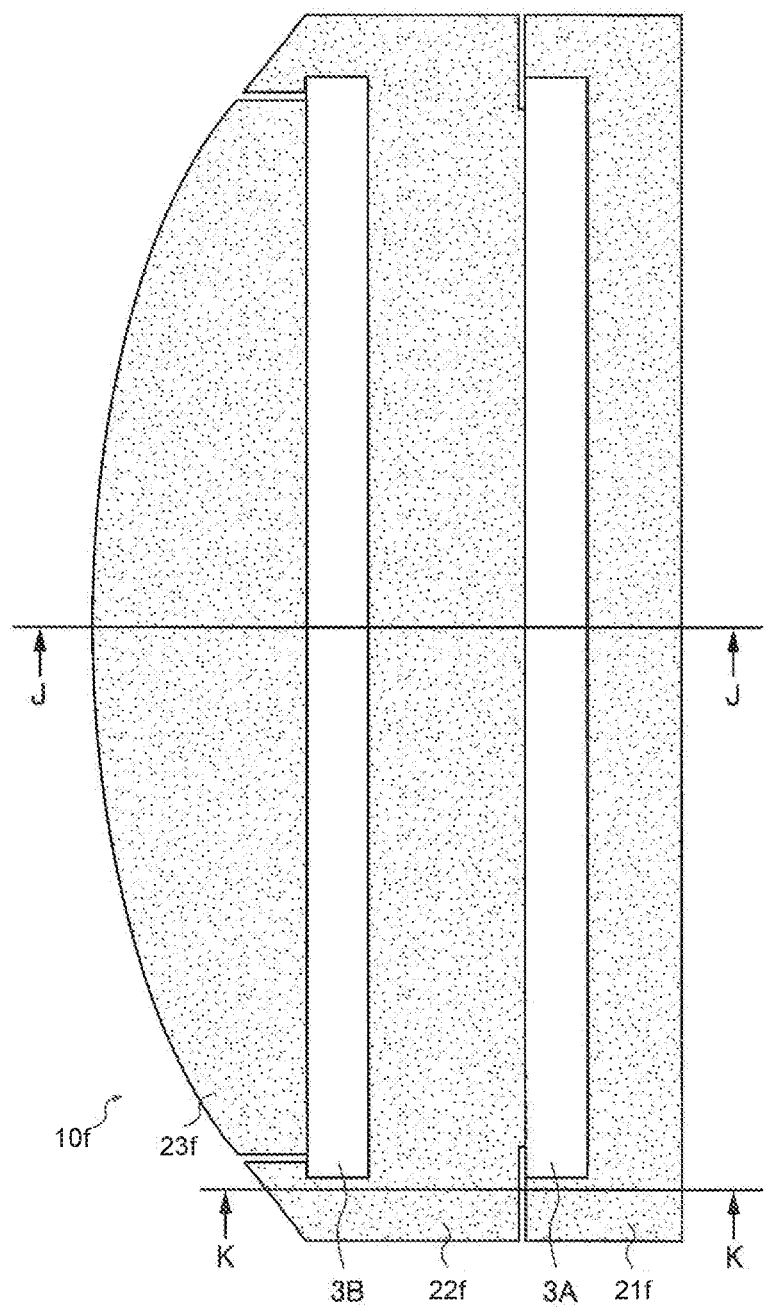
FIG. 12 is a plan view of the interior material of the first embodiment.

FIG. 12 is a plan view of the interior material 10f of this embodiment.

Figure 13A:
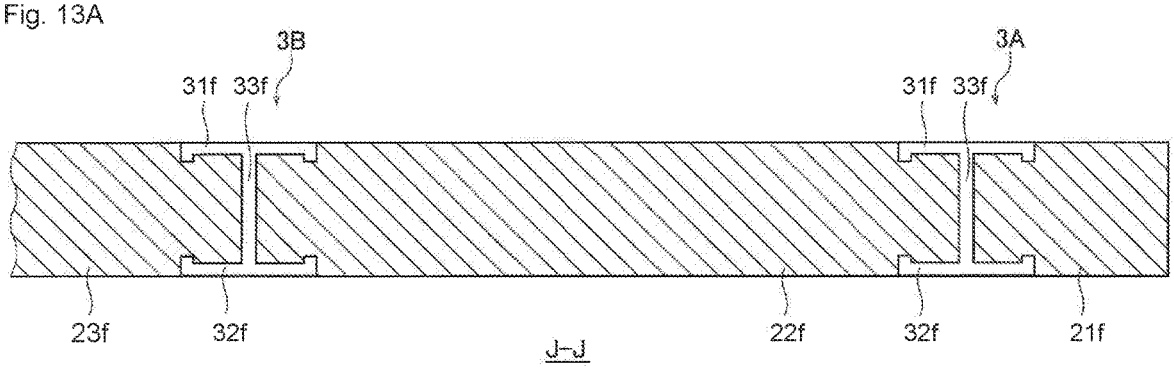
FIGS. 13A and 13B are cross sectional views taken along lines J-J and K-K shown in FIG. 12 respectively.
Figure 13B:
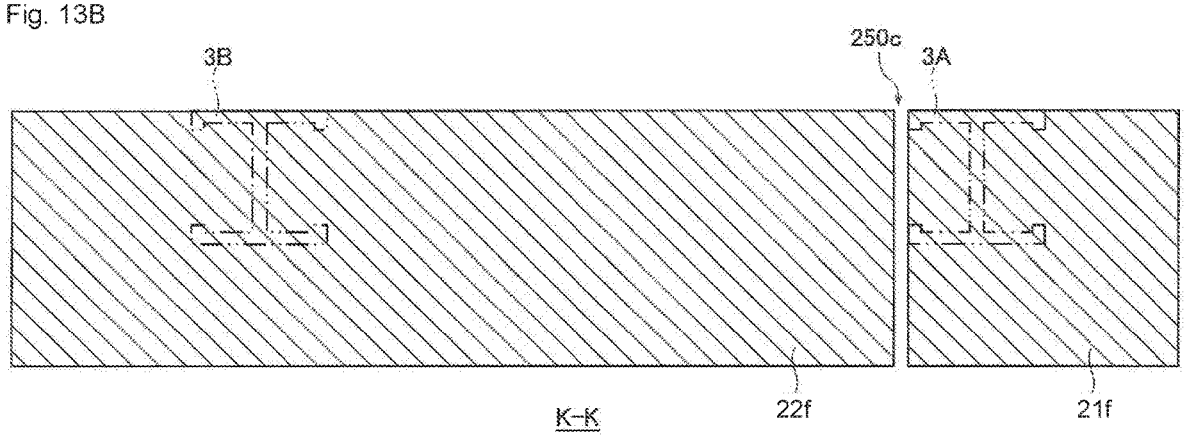

FIGS. 13A and 13B are sectional views taken along lines J-J and K-K shown in FIG. 12 respectively. Then, a notch 250c in FIG. 13B is formed after the boundary 250 is cut off.

In assembling the interior material 10f, after molding the molded body 2f, the molded body 2f is cut off at the boundaries 250 and 270 and separated into foaming bodies 21f-23f.

Next, as shown in FIG. 11, the front side stepped portion 210a and the back side stepped portion 210b of the foamed body 21f are fitted to one side of the reinforcement 3A. And the front side stepped portion 220a and the back side stepped portion 220b of the foamed body 22f are fitted to the other side of the reinforcement 3A. The front side stepped portion 224a and the back side stepped portion 224b of the foamed body 22f are fitted to one of the reinforcements 3B. And the front side stepped portion 230a and the back side stepped portion 230b of the foamed body 23f are fitted to the other side of the reinforcement 3B. As a result, as shown in FIG. 12, the reinforcement 3A is placed between the foamed body 21f and the foamed body 22f, reinforcement 3B is placed between the foamed body 22f and the foamed body 23f.

As shown in cross section J-J in FIG. 13A, the reinforcements 3A and 3B include first and second plate portion 31f and 32f facing one another and a connecting portion 33f connecting the first plate portion 31f and the second plate portion 32f. A sectional shape of each of the reinforcements 3A and 3B is H-shape. The step portion of the foamed body is fitted between the first and second plate portions 31f and 32f.

As shown in FIG. 5, the foamed body 21f has a portion Q1 overlapping the stepped portions 220a and 220b of the foamed body 22f as seen from the extending direction of the stepped portions 210a and 210b. Thus, in a state where the reinforcement 3A is fitted to each step portion, the reinforcement 3A is covered with the foamed body 21f as shown in a cross section K-K in FIG. 13B. Thus, the present embodiment reliably prevents the reinforcement 3A from falling off from the interior material 10f in molding of the resin panel 1 described later.

As shown in FIG. 6, the foamed body 22f has a portion Q2 overlapping the stepped portions 230a and 230b of the foamed body 23f as seen from the extending direction of the stepped portions 224a and 224b. Thus, in a state where the reinforcement 3B is fitted in each step portion, the reinforcement 3B is covered with the foamed body 22f as shown in a cross section K-K in FIG. 13B. Thus, the present embodiment reliably prevent the reinforcement 3B from falling off from the interior material 10f in molding of the resin panel 1 described later.

1-3. Method of Molding Resin Panel 1

Figure 14:
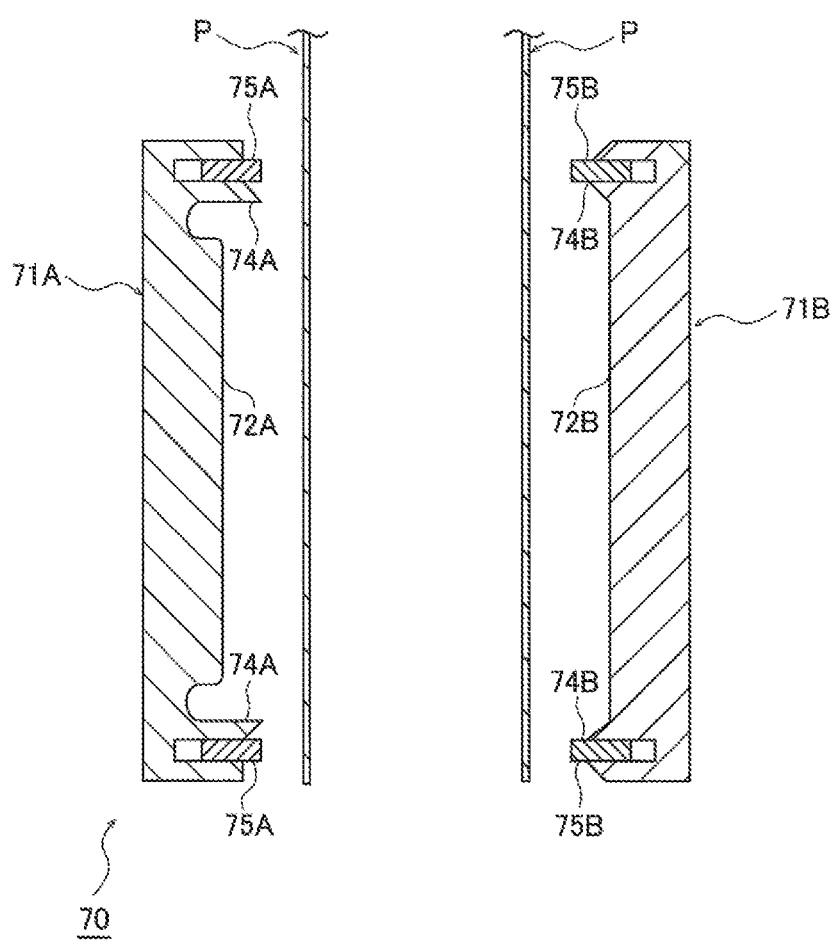
FIG. 14 is a view for explaining a step of molding the cover material of the resin panel of the first embodiment.
Figure 15:
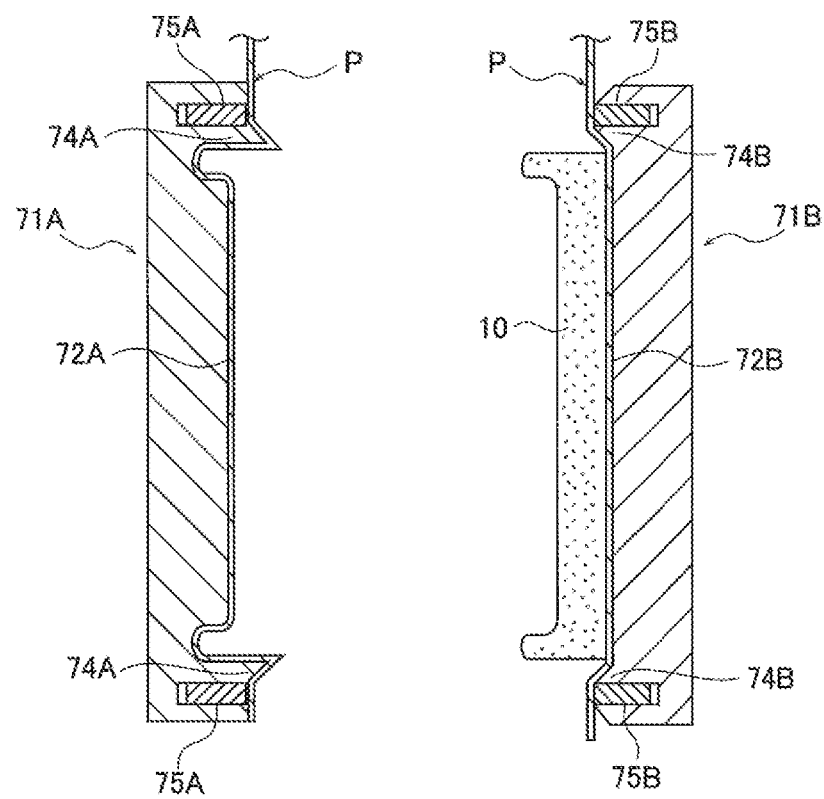
FIG. 15 is a view for explaining a step of molding the cover material of the resin panel of the first embodiment.

Next, with reference to FIGS. 14 and 15, a method of molding the resin panel 1 of the embodiment using a mold will be described. FIGS. 14 and 15 are views for explaining the step of molding the cover material S of the resin panel 1 of the present embodiment.

Referring to FIG. 14, the clamping apparatus 70 comprises molds 71A and 71B. The molds 71A and 71B is configured to move between an open position and a closed position in a direction substantially orthogonal to the molten resin sheets P and P pushed vertically downward from an extrusion device (not shown).

The molds 71A and 71B are arranged in a state where surfaces 72A and 72B face one another. The surface 72A has a shape corresponding to the front and back surfaces of the molded body 2f.

In each of the molds 71A and 71B, pinch off parts 74A and 74B are formed near upper and lower ends of the surface 72A and 72B. The pinch off parts 74A and 74B are annularly formed around the surfaces 72A and 72B, respectively, and protrude toward facing molds 71B and 71A. As a result, when clamping the molds 71A and 71B, tip portions of the pinch off parts 74A and 74B contact with one another and a parting line is formed at a periphery of the molten resin sheets P and P.

In the molds 71A and 71B, sliding portions 75A and 75B are provided to protrude from the surfaces 72A and 72B around the surfaces 72A and 72B. In the state protruding from the surfaces 72A and 72B, the sliding portions 75A and 75B are brought into contact with the molten resin sheets P and P of the end surfaces thereof, so that enclosed space is formed between the molten resin sheets P and P and the surface 72A and 72B of the molds 71A and 71B.

A vacuum chamber (not shown) is built in the molds 71A and 71B. The vacuum chamber is connected to a vacuum pump and a vacuum tank (none of which are shown). A communication passage (not shown) for vacuum suction is provided between the vacuum chamber and the surfaces 72A and 72 B.

The molds 71A and 71B are driven by a mold driving device (not shown) to be movable between the open position and the closed position. In the open position, two molten resin sheets P and P can be placed at a distance from one another and two molten resin sheets P and P can be placed between the molds 71A and 71B. The two molten resin sheets P and P are the cover material S in the resin panel 1 after molding. In the closed position, the pinch off parts 74A and 74B of the molds 71A and 71B contact with one another.

Next, the molding method of the resin panel 1 will be described. First, as shown in FIG. 14, the molten resin sheets P and P are pushed out vertically downward from the extrusion device and are supplied between the surfaces 72A and 72B of the molds 71A and 71B. At this point, the molds 71A and 71B are in the open position.

Next, sliding portions 75A and 75B around the surfaces 72A and 72B are made to protrude. Then, the end surfaces of sliding portions 75A and 75B are made to contact with molten resin sheets P and P. As a result, the enclosed space is formed between the molten resin sheets P and P and the surfaces 72A and 72B of the molds 71A and 71B. Then, air in the enclosed space is sucked via a communication passage provided between the vacuum chamber and the surfaces 72A and 72B. By this suction, the two molten resin sheets P and P are pressured on the surfaces 72A and 72B of the molds 71A and 71B. Then, as shown in FIG. 15, the two molten resin sheets P and P are shaped (formed) in a shape along the surfaces 72A and 72B, that is, a substantially outer shape of the resin panel 1.

Next, between the molds 71A and 71B, the interior material 10f assembled as described above is positioned by a manipulator (not shown). Then, as shown in FIG. 15, the interior material 10f is inserted from the side of one mold (mold 71B in FIG. 15) to be pressured on one mold. As a result, the interior material 10f is welded to one molten resin sheet P.

As described above, in the interior material 10f, the portion Q1 (see FIG. 5) is formed in the foamed body 21f and the portion Q2 (see FIG. 6) is formed in the foamed body 22f. Thus, even if the interior material 10f is arranged so that the extending direction of the reinforcements 3A and 3B is in the vertical direction, the present embodiment reliably prevents the reinforcements 3A and 3B from falling off from the interior material 10f.

Thereafter, the molds 71A and 71B are moved from the open position to the closed position and are clamped. As a result, the interior material 10f welded to one molten resin sheet P (right side in the drawing) is also welded to the other molten resin sheet P (left side in the drawing). Further, in the pinch off parts 74A and 74B of the molds 71A and 71B, the peripheral edges of the molten resin sheets P and P are welded and the molten resin sheets P and P have the parting line PL formed therein.

Finally, the molds 71A and 71B are again moved to the open position, and the molded resin panel 1 is separated from the surfaces 72A and 72B. Then, burr formed around the parting line PL is cut off with, for example, a cutter and is removed. From the above, the resin panel 1 having the structure covering interior material 10f with cover material S is completed.

In the molding method of the resin panel 1 described above, a method in which the molten resin sheet P is pressured on the surfaces 72A and 72B of the molds 71A and 71B by suction has been described, but the method is not limited to this. By blowing a fluid such as air onto the molten resin sheet P, the molten resin sheet P may be pressured on the surfaces 72A and 72B of the molds 71A and 71B (blow molding).

2. Second Embodiment

Next, the second embodiment of the present invention will be described with reference to FIGS. 16 and 17. This embodiment is different from the first embodiment in the molded body before fitting of the reinforcement 3A and 3B.

Figure 16:
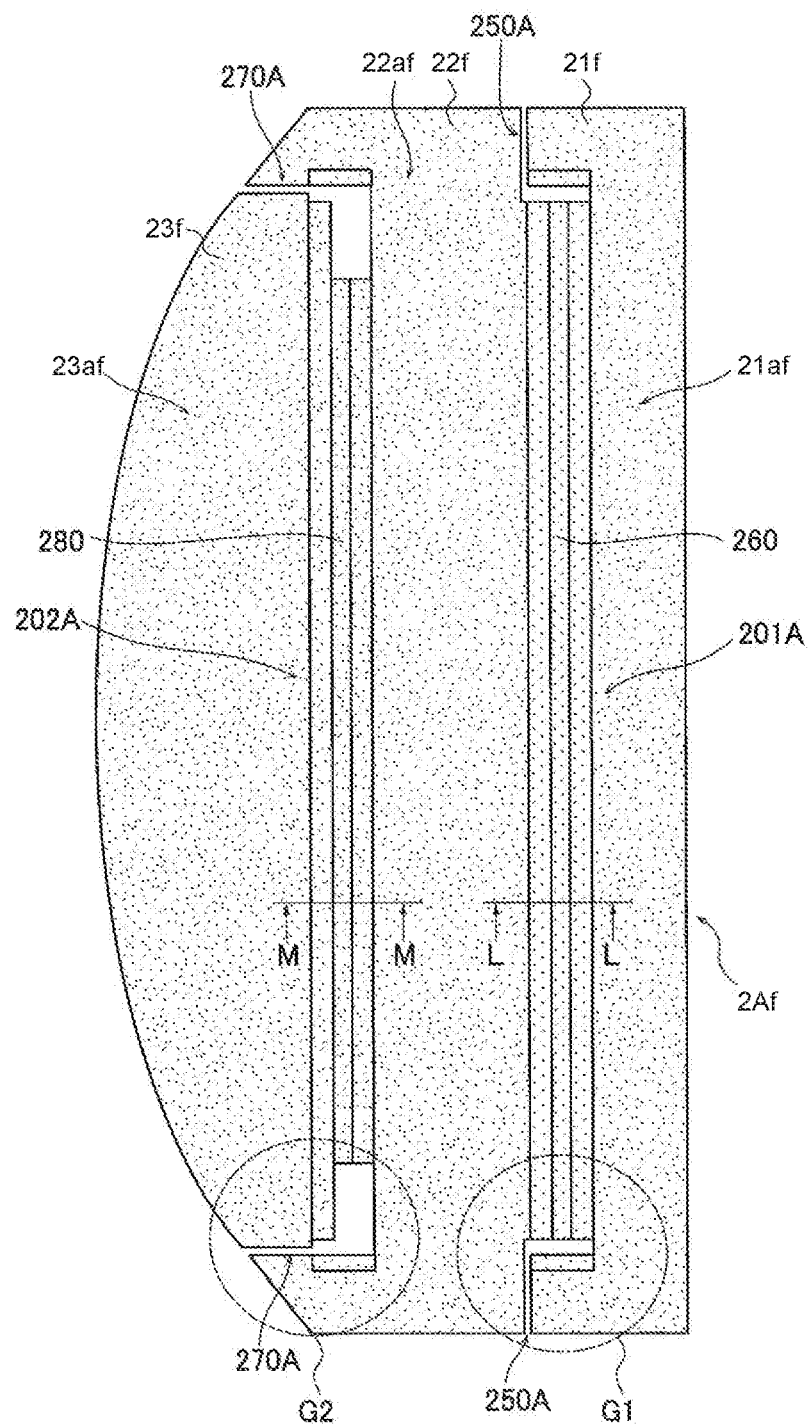
FIG. 16 is a plan view of a foamed body of a second embodiment.

FIG. 16 is a plan view of the molded body 2Af of the second embodiment.

Figure 17A:
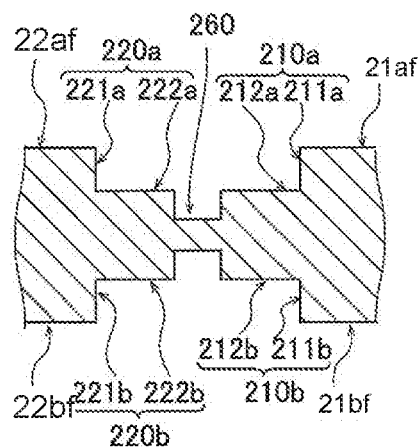
FIGS. 17A and 17B are cross-sectional views taken along lines L-L and M-M shown in FIG. 16 respectively.
Figure 17B:
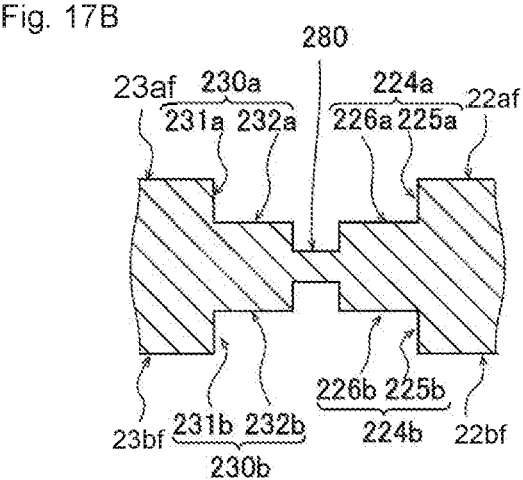

FIGS. 17A and 17B are cross sectional views of L-L and M-M shown in FIG. 16 respectively.

Comparing FIG. 16 with the molded body 2f of the first embodiment shown in FIG. 4, both are different in following (i) and (ii).

(i) In the molded body 2f of the first embodiment, the boundaries 250 and 270 are formed to be thin, whereas in the molded body 2Af of this embodiment, the boundaries 250A and 270A are gaps.

(i) In the molded body 2f of the first embodiment, the gap is formed between facing step portions in the groove portions 201 and 202 of the molded body 2f, whereas in the molded body 2Af of the present embodiment, thin portions 260 and 280 (see FIGS. 17A and 17B) are formed.

In order to assemble the interior material 10f based on the molded body 2Af of the present embodiment, after molding the molded body 2Af, the molded body 2Af is cut off at the thin portions 260 and 280 and separated into foaming bodies 21f to 23f.

The subsequent assembling method is the same as the method shown in FIGS. 11 and 12. In other words, the reinforcement 3A is placed between foamed body 21f and foamed body 22f, the reinforcement 3B is placed between foamed body 22f and foamed body 23f.

The molding method of the resin panel 1 may be the same as the method described in the first embodiment.

Compared to the second embodiment where the thin portions 260 and 280 to be cut off are arranged at positions corresponding to the connecting portions 33f of the reinforcements 3A and 3B, the first embodiment has following advantage.

In the first embodiment, as shown in FIGS. 4 and 12, the positions of the boundaries 250 and 275 to be cut off are different from the positions corresponding to the connecting portions 33f of the reinforcements 3A and 3B. This can eliminate need accommodating the connecting portion 33f. Thus, the first embodiment allow a width of boundaries 250 and 270 to be narrowed. And the first embodiment improves the appearance and increases the local rigidity in the vicinity of the boundary.

Although the embodiments of the present invention have been described in detail above, the resin panel and foamed structure of the present invention are not limited to the above embodiments. Various improvements and modifications may be made without departing from the gist of the present invention.

In the first embodiment described above, the case where two boundaries 250 are corlinear has been described, but boundaries 250 is not limited to this. The two boundaries 250 may be provided in parallel to each other.

In the first embodiment described above, the case where the boundary 270 is provided in the direction orthogonal to the extending direction of the reinforcement 3B has been described, but the boundary 270 is not limited to this. The boundary 270 may be provided in a direction different from the extending direction of the reinforcement 3B. That is, the boundary between two adjacent foaming bodies in the molded body may be provided in a desired direction starting from positions corresponding to the end of the reinforcements 3A and 3B based on the overall shape of the molded body 2f (that is, depending on the overall shape of the resin panel 1). In this case, the direction in which the pair of boundaries are formed may be different from each other.

Hereinafter, the resin panel 70s according to the second aspect of the present invention will be described.

1. Resin Panel 70s

As shown in FIGS. 18 to 28, the resin panel 70s according to this embodiment of the present invention includes a hollow resin molded body 50, a spacing member 30, and a reinforcing member 40.

The spacing member 30 comprises a first spacing member 30f and a second spacing member 30s.

The spacing member 30 and the reinforcing member 40 constitute the structure 60. The structure 60 is arranged in the resin molded body 50. Further, in this embodiment, the nonwoven fabric 45 is integrally formed on the surface of the resin panel 70s.

As shown in FIGS. 23 to 27, the spacing member 30 has a facing portion 32s facing to an end surface EF of the reinforcing member 40. The end surface EF is a surface in the longitudinal direction of reinforcing member 40. As shown in FIG. 23, the facing portion 32s comprises a resin reservoir SP at a position adjacent to the end surface EF of the reinforcing member 40. The significance of the resin reservoir SP will be described later.

Each component will be described in detail below. As shown in FIG. 18, the resin panel 70s is a panel covered with a resin molded body 50 having a rectangular shape in plan view.

2. Structure 60 (Spacing Member 30+Reinforcing Member 40)

As shown in FIGS. 19, 20, 24, 25 and 28, the structure 60 comprises the spacing member 30 (first spacing member 30f+second spacing member 30s) and the reinforcing member 40.

As shown in FIGS. 19 and 20, in the present embodiment, the reinforcing member 40 is an extruded H-shaped steel. The reinforcing member 40 includes a pair of plate members 41 facing each other and a connecting member 42 connecting the pair of plate members 41.

As shown in FIG. 20, in the sectional view of the resin panel 70s perpendicular to the longitudinal direction of the reinforcing member 40, a side protrusion 30fs of the first spacing member 30f and a side protrusion 30ss of the second spacing member 30s respectively contact with the connecting member 42 of the reinforcing member 40. As a result, the reinforcing member 40 is attached to the spacing member 30.

As shown in FIGS. 21 to 23, in the longitudinal direction of the reinforcing member 40, specifically, in the longitudinal cross sectional view at the center of the connecting member 42, the facing portion 32s includes the resin reservoir SP at the position adjacent to the end surface EF of the reinforcing member 40. Then, in the present embodiment, thickness of the facing portion 32s is smaller than thickness of the reinforcing member 40.

A value of (thickness of facing portion 32s)/(thickness of reinforcing member 40) is, for example, 0.3 to 0.95. Preferably, the value of (thickness of the facing portion 32s)/(thickness of the reinforcing member 40) is 0.4 to 0.9, more preferably 0.5 to 0.85, more preferably 0.6 to 0.8. The value, specifically, is for example 0.3, 0.4, 0.5, 0.55, 0.6, 0.65, 0.7, 0.75, 0.8, 0.85, 0.95, and may be within the range between any two of these values exemplified here.

Then, as shown in FIGS. 26 and 27, in the end view of the spacing member 30, a length in the width direction of the facing portion 32s is 50% or more of a length in the width direction of the reinforcing member 40.

As shown in FIG. 27, in the present embodiment, in the end view of the spacing member 30, the length in the width direction of the facing portion 32s is 100% or more of the length in the width direction of the reinforcing member 40. As a result, the facing portion 32s faces the entire end surface EF of the reinforcing member 40.

The spacing member 30 also comprises a base surface 30a and a recess 33s provided in the base surface 30a. The recess 33s is provided in the facing portion 32s and functions as the resin reservoir SP. The recess 33s, specifically, is formed by the upper surface 40a of the reinforcing member 40, the upper facing surface 32a of the facing portion 32s, and the base surface 30a of the spacing member 30. The shape of the resin reservoir SP is not limited to the recess 33s, and the shape of the resin reservoir SP may be for example a tapered shape, a plurality of slits or a depressed shape.

As shown in FIGS. 23 and 27, the spacing member 30 comprises a protrusion 34 protruding from the base surface 30a. The protrusion 34 is provided around the facing portion 32s. As shown in FIG. 28, protrusion 34 is formed to surround reinforcing member 40 in this embodiment. Further, as shown in FIG. 23, the protrusion 34 comprises a sloping surface 34i sloping in a direction away from the facing portion 32s in an end view of the spacing member 30. Then, the base surface 30a is connected via the sloping surface 34i, the protruding surface 34a, and the rising surface 34s of the protrusion 34.

As shown in FIGS. 23 and 27, the facing portion 32s is configured to contact the connecting member 42 of the reinforcing member 40. The facing portion 32s may be configured to contact a part of the plate member 41.

3. Composition of Molding Machine 1S

Next, referring to FIGS. 29 and 30, the molding machine 1S that can be used for the method of manufacturing the resin panel 70s of the embodiment of the present invention will be described. Then, FIG. 30 is a sectional view of a plane passing through the line A-A in FIG. 29 (that is, a sectional view seen from the vertically upper side in FIG. 29).

The molding machine 1S comprises a resin supplying device 2s, a T-DIE 18S and first and second molds 21s and 22s. The resin supplying device 2s includes a hopper 12s, an extrusion machine 13s, and an accumulator 17. The extrusion machine 13s and the accumulator 17 are connected via a connecting pipe 25. The accumulator 17 and the T-DIE 18S are connected via a connecting pipe 27. Each component will be described in detail below.

Hopper 12s and Extrusion Machine 13s

The hopper 12s is used to provide the raw resin 11s with the cylinder 13a of the extrusion machine 13s. Form of raw resin 11s is not particularly limited, but it is usually pellet form.

The raw resin is, for example, a thermoplastic resin such as polyolefin. Examples of the polyolefin include low density polyethylene, linear low density polyethylene, high density polyethylene, polypropylene, ethylene-propylene copolymer, and mixtures thereof.

The raw resin 11s is provided into the cylinder 13a from the hopper 12s. Then, the raw resin 11s melts by being heated in the cylinder 13a and becomes a molten resin. Further, it is conveyed to the tip of the cylinder 13a by rotation of the screw disposed in the cylinder 13a. The screw is placed in the cylinder 13a, and the screw conveys and kneads the molten resin by its rotation. A gear device is provided at a base end of the screw, and the screw is rotationally driven by the gear device. The number of screws arranged in the cylinder 13a may be one, or two or more.

Accumulator 17, T-Die 18S

The foamed resin obtained by melt-kneading the raw resin and the foaming agent is extruded from a resin extrusion port of the cylinder 13a and injected into the accumulator 17 via the connecting pipe 25. The accumulator 17 comprises a cylinder 17a and a piston 17b slidable inside the cylinder 17a. And the molten resin 11a can be stored in the cylinder 17a. Then, by moving the piston 17b after a predetermined amount of foaming resin is stored in the cylinder 17a, the foamed resin is pushed out from the slit provided in the T-DIE 18S via the connecting pipe 27. The pushed out foamed resin corresponding to the first and second resin sheets 23as and 23bs is hung down.

First and Second Molds 21s and 22s

The first and second resin sheets 23as and 23bs are supplied between the first and second molds 21s and 22s. As shown in FIG. 24, the first mold 21s is provided with a plurality of reduced pressure suction holes (not shown), and the first resin sheet 23as is shaped to have a shape along the cavity 21bs of the first mold 21s under reduced pressure.

The cavity 21bs has a recess 21c, and a pinch off part 21d is provided to surround the recess 21c. The second mold 22s is provided with a plurality of reduced pressure suction holes (not shown), and the second resin sheet 23bs is shaped to have a shape along the cavity 22bs of the second mold 22s under reduced pressure.

The cavity 22bs has a recess 22c, and a pinch off part 22d is provided to surround the recess 22c. Then, each suction hole is minimal opening, one end of each suction hole communicates with the inner surfaces of the cavities 21bs and 22bs via the first and second mold 21s and 22s, and the other end of each suction hole is connected to a decompression device. The pinch off part 22d of the second mold 22s is provided with a mounting portion (not shown) for attaching the nonwoven fabric 45.

4. Method of Manufacturing Resin Panel 70s

Next, with reference to FIGS. 30 to 33, a method of manufacturing the resin panel 70s according to the embodiment of the present invention will be described.

The method of the present embodiment includes hanging down step, shaping step, inserting step, and clamping step. This will be described in detail below.

4.1 Hanging Down Step

In the hanging down step, as shown in FIG. 30, the structure 60 is arranged between the first and second molds 21s and 22s by using jig (not shown). Then, in the present embodiment, the structure 60 comprises the spacing member 30 and the reinforcing member 40. The spacing member 30 comprises a facing portion 32s facing the end surface EF of the reinforcing member 40. The facing portion 32s is provided with the resin reservoir SP at a position adjacent to the end surface EF of the reinforcing member 40 (see FIG. 23).

Then, after attaching the nonwoven fabric 45 to the second mold 22s, the first and second resin sheets 23as and 23bs, formed by pushing out the molten foaming resin from the slit of the T-DIE 18S, are hanged down between the first and second molds 21s and 22s. In the present embodiment, direct vacuum forming, using the first and second resin sheets 23as and 23bs pushed out from the T-DIE 18S, is performed. Thus, the first and second resin sheets 23as and 23bs are not solidified by being cooled to room temperature before molding, and the solidified first and second resin sheets 23as and 23bs are not heated before molding. Then, in FIG. 30, the structure 60 is shown between the first and second resin sheets 23as and 23bs in the hanging down step, but in the hanging down step, the structure 60 may be left elsewhere.

4.2 Shaping Step

Next, as shown in FIG. 31, the first and second resin sheets 23as and 23bs and the nonwoven fabric 45 are sucked under reduced pressure by the first and second molds 21s and 22s. And the first and second resin sheets 23as and 23bs and the nonwoven fabric 45 are shaped to have the shape along the cavity 21bs of the first and second molds 21s and 22s. By this timing, the jig (not shown) is set to the structure 60. The jig supports the structure 60 by sucking the structure 60 by a suction cup provided on the jig.

4.3 Inserting Step

In the inserting step, as shown in FIG. 32, the structure 60 is moved by the jig and is fixed to the second resin sheet 23bs. Then, in the present embodiment, the spacing member 30 is the foamed body. Thus, the foamed body is melted by the heat of the first resin sheet 23b, thereby fixing the spacing member 30 to the first resin sheet 23b. Thereafter, the jig is moves to the left in the drawing.

4.4 Clamping Step

In the mold clamping step, as shown in FIG. 33, the first and second molds 21s and 22s are clamped. At this timing, the resin reservoir SP (see FIG. 23) is formed at the position adjacent to the end surface EF of the reinforcing member 40 (a position indicated by a broken line in the drawing). The nonwoven fabric 45 is pressured between the second resin sheet 23bs and the second mold 22s, the nonwoven fabric 45 is fixed to the structure 60. As a result, the molded body having a shape along the cavities 21bs and 22bs of the first and second molds 21s and 22s is obtained.

Then, by detaching the molded body from the first and second molds 21s and 22s and removing the burr 26 provide in an outside of the pinch off parts 21d and 22d, the resin panel 70s shown in FIG. 18 is obtained.

5. Resin Reservoir SP

Next, the meaning of the resin reservoir SP will be described. When the resin reservoir SP is not provided, the resin may rise in the vicinity of the boundary between the end surface EF and the facing portion 32s of the reinforcing member 40. This rising of the resin cause poor appearance. The resin enters, specifically, the boundary between the end surface EF and the facing portion 32s of the reinforcing member 40, and the resin is deformed by contraction, hence the resin rises.

Thus, by providing the resin reservoir SP at the position adjacent to the end surface EF of the reinforcing member 40, this embodiment can accumulate the resin that has entered between the spacing member 30 and the reinforcing member 40. This makes it possible to reduce the rising of the resin in the vicinity of the boundary between the end surface EF and the facing portion 32s of the reinforcing member 40.

In the embodiment in which the end surface EF of the reinforcing member 40 and the facing portion 32s particularly contact with one another, when the resin reservoir SP is not provided, a compressed resin has no place to flow, hence the resin may rise in the vicinity of the boundary between the end surface EF and the facing portion 32s of the reinforcing member 40. On the other hand, the resin reservoir SP is provided in this embodiment, this embodiment can effectively accumulate the resin that has entered between the spacing member 30 and the reinforcing member 40.

In addition, the recess 33s contacts the end surface EF of the reinforcing member 40, so that the reinforcing member 40 can be properly positioned.

In the embodiment in which the protrusion 34 is particularly provided around the facing portion 32s, the contracted resin gathers at the boundary between the sloping surface 34i and the base surface 30a, hence the resin rises particularly in the vicinity of the boundary between the end surface EF and the facing portion 32s of the reinforcing member 40. Thus, by providing the resin reservoir SP, the present embodiment can accumulate unnecessary resin appropriately even if including the protrusion 34.

Others

As shown in FIGS. 34 and 35, the U-shaped reinforcing member 40 may be provided at the end of the first spacing member 30f in a side view. As shown in FIG. 35, it is possible to form a facing portion 32s by providing the sloping surface 34i at the end portion in the longitudinal direction of the first spacing member 30f. In this case, as shown in FIGS. 36 to 38, the end surface EF of the plate member 41 constituting the reinforcing member 40 contacts against the facing portion 32S of the first spacing member 30f. Then, in addition to the end surface EF of the plate member 41, the end surface EF of the connecting member 42 constituting the reinforcing member 40 may contact the facing portion 32s.

Third Aspect

1. First Embodiment

Hereinafter, the resin panel 1 (example of a resin laminated body) according to the third aspect of the present invention and the foamed body 2t installed in the resin panel 1 will be described. The resin panel 1 of the present embodiment is provided with a hook housing portion 10t (described later) for attaching a hook.

1-1. Resin Panel 1, and Foamed Body 2t

First, referring to FIGS. 39 to 42, the configuration of the resin panel 1 and the foamed body 2t installed in resin panel 1 will be described.

FIG. 39 is a perspective view of the front side of the resin panel 1 of this embodiment and an enlarged cut away view of a part thereof.

FIG. 40 is a perspective enlarged view of the hook housing portion 10t and the hook 20 of the resin panel 1 of the present embodiment.

FIG. 41 is an enlarged plan view of a part of the hook housing portion 10t of the resin panel 1 of the present embodiment.

FIG. 42 is an enlarged sectional view taken along the line A-A in FIG. 41.

As shown in FIG. 39, the outer shape of the resin panel 1 according to the embodiment has a front surface 1a and a back surface 1b which are flat surfaces, and a side wall surface 1c interposed between the front surface 1a and the back surface 1b.

The front surface 1a, the back surface 1b, and the side wall surface 1c are constituted by a cover material S made of thermoplastic resin, and the foamed body 2t is installed in the interior thereof. That is, the resin panel 1 has a structure in which the foamed body 2t is covered with the cover material S made of the thermoplastic resin.

On the front side of the resin panel 1, the front surface 1a has the recessed hook housing portion 10t formed thereon. The hook housing portion 10t is provided to accommodate the hook 20 (see FIG. 40).

In the resin panel 1 of the embodiment, the cover material S serving as the cover material is not limited to its resin material, but it is preferable that it is formed from a non-foamed resin to ensure the rigidity of the resin panel 1. For example, considering moldability, the cover material S may be made by mixing polystyrene (PS) and styrene ethylene butylene styrene block copolymer resin (SEBS) in polypropylene (PP) as a main material.

In the resin panel 1 of the embodiment, the foamed body 2t is molded using the thermoplastic resin, but the resin material is not limited to this. The resin material includes, for example, polyolefin such as polypropylene and polyethylene; acrylic derivative such as polyamide, polystyrene, and polyvinyl chloride; or a mixture of two or more these materials.

The expansion ratio of foamed body 2t is not particularly limited. The expansion ratio is, for example, 1.5 to 60 times, typically 20 or 30 times, preferably 10 to 45 times, more preferably 15 to 35 times.

The expansion ratio is a value obtained by dividing the density of the mixed resin before foaming by the apparent density of the foamed resin after foaming.

Here, the foaming agent used for the foamed body 2t conforms to the foaming agent used for the foaming bodies 21f to 23f of the first aspect.

And the cover material S and foamed body 2t conform to cover material S and foaming bodies 21f to 23f of the first aspect.

As shown in FIG. 40, the hook 20 accommodated in the hook housing portion 10t of the resin panel 1 includes a hook body 22t and a connecting member 24 connected to the hook body 22t.

The hook body 22t has a substantially J-shape and is formed of for example metal or plastic. The fitting portion 22at of the hook body 22t is a portion to be fitted to the fitting recess 13t of the hook housing portion 10t.

As shown in FIGS. 40 and 41, the hook housing portion 10t includes a first housing portion 12t for accommodating the hook body 22t of the hook 20 and a second housing portion 14 for accommodating the connecting member 24 of the hook 20.

Between the first housing portion 12t and the second housing portion 14, the fitting recess 13t fitting to the fitting portion 22at of the hook body 22t to hold the hook 20 is formed. The fitting recess 13t is formed by protrusions 16t and 18t. The protrusions 16t and 18t protrude from the contacting surface 10s to which the hook 20 contacts in the hook housing portion 10t toward the front surface 1a.

As shown in FIG. 42, the fitting recess 13t has a recessed shape. This recessed shape comprises a bottom surface 130 and a side wall surfaces 131 and 132 so that the fitting portion 22at of the hook 20 (indicated by an imaginary line in FIG. 42) is accommodated.

A depth of the fitting recess 13t may be set according to the shape and dimensions of the fitting portion 22at. The depth of the fitting recess 13t is, for example, about the same as thickness of the fitting portion 22at.

Corners 133 and 134 are formed between the ends of the fitting recess 13t, that is, between the side wall surfaces 131 and 132 and the front surface 1a. The corners 133 and 134 are located at the ends of the protrusions 16t and 18t and protrude in mutually opposite directions. That is, as shown in FIG. 42, a width of the fitting recess 13t in the vicinity of the front surface 1a is narrower than a width in the vicinity of the position near the bottom surface 130. Hence, once the fitting portion 22at accommodated in the fitting recess 13t are hold, and the fitting portion 22at is not easily detached from the fitting recess 13t.

1-2 Molding Method of Resin Panel 1

Next, with reference to FIGS. 43 and 44, the method of molding the resin panel 1 of the embodiment using a metal mold will be described.

FIGS. 43 and 44 are views for explaining the step of molding the cover material S of the resin panel 1 of the present embodiment.

FIGS. 43 and 44 each show a cross section of the metal mold taken along a line A-A in FIG. 41.

The molding method of the resin panel 1 in the third aspect conforms to the molding method of the resin panel 1 in the first aspect, so detailed explanations will be omitted and only the differences will be explained. The foamed body 2t in the third aspect corresponds to the interior material 10f in the first aspect.

The first aspect and the third aspect differ in the shapes of surface 72A. In the first aspect (FIGS. 14 and 15), the surface 72A has a shape corresponding to the front surface and the back surface of the molded body 2f, but in the third aspect (FIGS. 43 and 44) and has a shape corresponding to the front surface 1a and the back surface 1b of the resin panel 1. And, in the first aspect, the interior material 10f is welded to one molten resin sheet P. In the third aspect, the foamed body 2t is welded to one molten resin sheet P and the foamed body 2t is placed between the molten resin sheets P and P pressured on the surfaces 72A and 72B.

1-3. About Molding of Fitting Recess 13t of Hook Housing Portion 10t

Next, with reference to FIGS. 45A to 45C, the molding of especially the fitting recess 13t of the hook housing portion 10t in the molding step of resin panel 1 will be described in more detail.

FIGS. 45A to 45C are a view sequentially showing (that is, in the order of S1 to S5) a molding step for a part of the hook housing portion of the resin panel of the first embodiment.

As shown in FIGS. 45A1 and 45A2, a mold protrusion 73 protruding from the surrounding surface 72A corresponding to the fitting recess 13t is provided in the mold 71A. The mold protrusion 73 has a convex shape and includes a top surface 730 corresponding to the bottom surface 130 of the fitting recess 13t and sidewall surfaces 731 and 732 corresponding to the side wall surfaces 131 and 132 of the fitting recess 13t. Corner portions 733 and 734 corresponding to the corners 133 and 134 of the fitting recess 13t are formed between the side wall surfaces 731 and 732 and the surface 72A. As shown in FIGS. 45A1 and 45A2, the corner portions 733 and 734 each have an undercut shape.

S1 in FIGS. 45A1 and 45A2 shows a state in which a molten resin sheet P is supplied between the surface 72A provided with the mold protrusion 73 and the surface 72B (not shown in FIGS. 45A1 and 45A2).

S2 in FIGS. 45A1 and 45A2 shows a state in which the molten resin sheet P is pressured on the surface 72A and the mold protrusion 73 by the above suction and the molten resin sheet P is shaped (formed) along the shape of the surface 72A and the mold protrusion 73. At this timing, as shown in the figure, the corner portions 733 and 734 of the mold protrusion 73 are portions where the change in the surface shape between the surface 72A and the side wall surfaces 731 and 732 is large, and the molten resin sheet P is not sufficiently sucked to the corner portions 733. Hence, the thickness of molten resin sheet P becomes thinner than that of other parts.

The corner portions 733 and 734 of the mold protrusion 73 are undercut shape and the corner portions 733 and 734 of the mold protrusion 73 are recessed inwardly of the side wall surfaces 731 and 732, the thickness of the molten resin sheet P is still thinner than the other portions.

Next, the foamed body 2t is positioned between the molds 71A and 71B and is pressured on the molds 71B from the side of the foamed body 2t, hence the foamed body 2t is welded to the molten resin sheet P molded by the molds 71B as shown S3 in FIG. 45B.

Thereafter, the molds 71A and 71B are moved from the open position to the closed position, and mold clamping of the molds 71A and 71B is completed. In clamping the molds 71A and 71B, an interval between the molds 71A and 71B is narrowed, the surface 2st of the foamed body 2t firstly contacts with the molten resin sheet P welded to the top surface 730 of the mold protrusion 73 as shown S4 in FIGS. 45C1 and 45C2. And the interval between the molds 71A and 71B is further narrowed, and the state at the timing when the mold clamping is completed is shown S5 in FIG. 45C2.

Then, in the molding method of this embodiment, in the case of S4 in FIG. 45C1 (or S3 in FIG. 45B), a part of the foamed body 2t, disposed between the molten resin sheets P and P, facing to the molten resin sheet P pressured on the mold protrusion 73 is a part 2g of the foamed body 2t sandwiched between surfaces PH and PL defined by the molten resin sheet P on the side wall surface 731 and 732 of the mold protrusion 73.

Volume (first volume) of the part 2g of the foaming body 2t is larger than volume PA (second volume) in entire volume (third volume).

The volume (first volume) is defined by a volume of the part 2g (a part between the surfaces PH and PL) of the foamed body 2t in a state before placing the foamed body 2t, the part 2g faces a part of the molten resin sheet P and the part of the molten resin sheet P is disposed on the mold protrusion 73, The volume PA (second volume) is defined by a volume of the part 2g of the foamed body in a state after the clamping.

The entire volume (third volume) is defined by a volume of the foamed body 2t between the pair of molten resin sheets P and P in a state after the clamping (that is in S5). Since the volume of the part 2g of the foamed body 2t is larger than the volume PA, a surplus part of the part 2g of the foamed body 2t effectively enters the corner portions 733 and 734 of the mold protrusion 73 after clamping.

As shown S4 in FIGS. 45C1 and 45C2, the foamed body 2t according to the example of the present embodiment does not have a concave shape corresponding to the mold protrusion 73. And the surface 2st opposite to the surface welded to the molten resin sheet P is flat. Hence, the volume of the part 2g of the foamed body 2t is larger than the volume of the region PA.

In clamping the pair of molds 71A and 71B, the foamed body 2t has no recess corresponding to the mold protrusion 73. Thus, the surplus portion of the part 2g of the foamed body 2t wraps around the side wall surfaces 731 and 732 of the mold protrusion 73 and fills fill the corner portions 733 and 734, and the foamed body 2t deforms between the molten resin sheets P and P. As a result, as shown S5 in FIG. 45C2, a part of the foamed body 2t fully enters the corner portions 733 and 734 of the mold protrusion 73 where the molten resin sheet is thin compared to the other portions. Thus, the present embodiment can prevent the local rigidity from being lowered at the corners 133 and 134 of the completed resin panel 1.

The fitting recess 13t of the resin panel 1 is a portion fitted to the hook 20. Thus, the above molding method is particularly effective. That is, as shown in FIG. 42, the fitting recess 13t is configured to hold the fitting portion 22at of the hook 20 by the corners 133 and 134, hence, when attachment and detachment of the hook 20 is repeated, the fitting portion 22at repeatedly interferes with the corners 133 and 134. Then, as described above, the corners 133 and 134 of the present embodiment are filled with the foamed body sufficiently. Thus, even if the fitting portion 22at repeatedly interferes with the corners 133 and 134, plastic deformation hardly occurs and holding function of the hook 20 is maintained for a long time.

1-4. Modified Example of the First Embodiment

In FIGS. 45C1 and 45C2, in the foamed body 2t, the case where the surface 2st opposite to the surface welded to the molten resin sheet P is flat is exemplified, but the shape of the foamed body 2t is not limited this. FIG. 46 shows a foamed body 2At according to modified example having a shape different from that of the foamed body 2t in FIGS. 45C1 and 45C2.

In FIG. 46, similarly to S3 in FIG. 45B, the foamed body 2At is placed between the pair of molten resin sheets P and P pressured on surfaces 72A and 72B of the molds 71A and 71B. As shown in FIG. 46, the foamed body 2At has a recess 2Ah facing the mold protrusion 73 formed therein.

Here, a width L2 of the recess 2Ah is smaller than a distance L1 between the surfaces PH and PL defined by the molten resin sheet P on the side wall surfaces 731 and 732 of the mold protrusion 73 (L1<L2). As a result, a volume of the part 2Ag of the foamed body 2At (the part of the foamed body 2t between the surfaces PH and PL) is larger than a volume of the region PA (see FIG. 45C2). As FIGS. 45C1 and 45C2, the surplus portion of the foamed body 2At also enters the corner portions 733 and 734 of the mold protrusion 73 where the molten resin sheet is thin compared to the other portions.

In this modified example, the recess 2Ah is merely an example. As long as the volume of the part of foamed body before clamping facing the molten resin sheet P pressured on the mold protrusion 73 is larger than the volume PA of the part after clamping facing the molten resin sheet P, the foamed body has any form.

2. Second Embodiment

Next, the second embodiment will be described with reference to FIGS. 47A and 47B. In the first embodiment, the case where recess (fitting recess 13t) is formed on the surface of the resin panel 1 has been described. In this embodiment, the case where a protrusion is formed on the surface of the resin panel will be described.

FIG. 47 is a view sequentially showing a molding step for a part of the resin panel of the second embodiment.

S3a in FIG. 47A shows a state in which a foamed body 2Bt is disposed between a pair of molten resin sheets P and P pressured on each surface of molds 71Aa and 71Ba, similarly to S3 in FIG. 45B. S5a in FIG. 47B shows a state when mold clamping is completed, similarly to S5 in FIG. 45C2.

A mold recess 83 for molding protrusion on the surface of the resin panel is formed in the molds 71Aa. The surface of the mold 71Ba is a flat surface like the mold 71B of the first embodiment.

As shown in FIGS. 47A and 47B, the mold recess 83 includes a bottom surface 830, side wall surfaces 831 and 832, and corner portions 833 and 834 interposed between the bottom surface 830 and the side wall surfaces 831 and 832. The side wall surfaces 831 and 832 are curved, hence an undercut shape from the side wall surfaces 831, 832 to the corner portions 833, 834 is formed.

In the mold recess 83, the corner portions 833 and 834 are in a deep position, and the molten resin sheet P is likely to be pressed. Thus, the thickness of the molten resin sheet P pressured on the corner portions 833 and 834 is thinner than that of the molten resin sheet P pressured on the bottom surface 830 and the side wall surfaces 831, 832.

Then, in the case of S3a in FIG. 47A, a part of the foamed body 2Bt, disposed between the molten resin sheets P and P, facing to the molten resin sheet P pressured on the mold recess 83 is a part 2Bg of the foamed body 2Bt sandwiched between surfaces PH and PL defined by the molten resin sheet P on the corner portion 833 and 834 of the mold recess 83.

Volume (first volume) of the part 2Bg of the foamed body 2Bt is larger than volume PA (second volume) in entire volume (third volume).

The volume (first volume) is defined by a volume of the part 2Bg (a part between the surfaces PH and PL) of the foamed body 2Bt in a state before placing the foamed body 2t, the part 2Bg faces a part of the molten resin sheet P and the part of the molten resin sheet P is disposed on the mold recess 83, The volume PA (second volume) is defined by a volume of the part 2Bg of the foamed body 2Bt in a state after the clamping.

The entire volume (third volume) is defined by a volume of the foamed body 2Bt between the pair of molten resin sheets P and P in a state after the clamping (that is in S5a).

In particular, the foamed body 2Bt according to an example of the present embodiment has protrusion with a volume larger than the volume of the mold recess 83, as shown by S3a in FIG. 47A.

Since the volume of the part 2Bg of the foamed body 2Bt is larger than the third volume PA, a surplus part of the part 2Bg of the foamed body 2Bt effectively enters the corner portions 833 and 834 of the mold recess 83 after clamping.

In clamping the pair of the molds 71A and 71B, the surplus portion of the foamed body 2Bt fills the corner portions 733 and 734 and the foamed body 2Bt deforms between the molten resin sheets P and P. As a result, as shown S5a in FIG. 47B, a part of the foamed body 2Bt fully enters the corner portions 833 and 834 of the mold recess 83 where the molten resin sheet is thin compared to the other portions. Thus, the present embodiment can prevent the local rigidity from being lowered at a corner (not shown). This corner is a portion formed corresponding to the corner portions 833 and 834 of the mold recess 83.

Although the embodiments of the present invention have been described in detail above, the method of manufacturing resin laminated body of the present invention are not limited to the above embodiments. Various improvements and modifications may be made without departing from the gist of the present invention.

In above first embodiment, the method of using the mold having mold protrusion to mold the resin panel having the recess formed on the flat surface is described. And in the second embodiment, the method of using the mold having the mold recess to mold the resin panel having the protrusion formed on the flat surface is described.

However, the recess of the resin panel and the shape of the corresponding mold protrusion, and the protrusion of the resin panel and the shape of the corresponding mold recess are merely examples. In this embodiment, various forms can be adopted according to the appearance and function required for the resin panel.

For example, the upper surface of the protrusion of the resin panel and/or the bottom surface of the recess of the resin panel may be curved rather than flat. And the step may be formed on the protrusion of the resin panel and/or the side wall surface of the recess.

In each of above embodiments, the case where the mold protrusion and the mold recess have the undercut shape has been described, but the embodiments is not limited to this. When the mold protrusion or the mold recess is in the undercut shape, the corner portion of the mold protrusion or the mold recess is in a deeper position than when the mold protrusion or the mold recess is not in the undercut shape. Thus, the pressed molten resin sheet is likely to be thin. However, even in that case, according to the molding method of the present invention, the corner portion is filled with the foaming resin by the surplus portion of the foamed body before clamping, hence the embodiments prevent the local rigidity from decreasing. The mold protrusion and the mold recess shown in FIGS. 45 and 47 have relatively shallow undercut shapes. Thus, there is no problem in clamping and opening the molds 71A and 71B. If there is any problem, dividing one of the molds may suppress this problem.

Fourth Aspect

Hereinafter, the resin panel 1 according to the fourth aspect of the present invention and the interior material 2q for the resin panel 1 will be described.

The interior material 2 for resin panel 1 is an example of the foamed body of the present invention and is a core material of resin panel 1.

1. Interior Material 2q for Resin Panel 1 and Resin Panel 1

Referring to FIGS. 48 and 49, the configuration of the resin panel 1 and the interior material 2q of this embodiment will be described.

FIG. 48 is a perspective view of the resin panel 1 of the embodiment and an enlarged cut-away view of a part thereof.

FIG. 49 is a perspective view of an interior material 2q installed in the resin panel 1 of the embodiment.

As shown in FIG. 48, the outer shape of the resin panel 1 according to the embodiment has a substantially rectangular parallelepiped shape. And the outer shape of the resin panel 1 comprises the front surface 1a, the back surface 1b, and the first and second side wall surfaces 1cq and 1d interposed between the front surface 1a and the back surface 1b. The front surface 1a, the back surface 1b, the first and second side wall surfaces 1cq and 1d are constituted by the cover material S of thermoplastic resin, and an interior material 2q is installed in the cover material S. In other words, the resin panel 1 has a structure in which the interior material 2q is covered with the cover material S of the thermoplastic resin.

In the resin panel 1 of the embodiment, the cover material S serving as the cover material is not limited to its resin material, but it is preferable that it is formed from a non-foamed resin to ensure the rigidity of the resin panel 1. For example, considering moldability, the cover material S may be made by mixing polystyrene (PS) and styrene ethylene butylene styrene block copolymer resin (SEBS) in polypropylene (PP) as a main material.

As shown in FIG. 49, the interior material 2q is a composite structure in which the foamed portions 21q to 23q are connected and integrated. The shapes of the foamed portions 21q to 23q are not particularly limited as long as the shapes are appropriately determined according to the appearance required for the resin panel 1 and the use environment.

In the resin panel 1 of the embodiment, the foamed portions 21q to 23q are molded using, for example, the thermoplastic resin. The resin material is not limited, but includes, for example, polyolefin such as polypropylene, polyethylene, acrylic derivative such as polyamide, polystyrene, polyvinyl chloride, or a mixture of two or more these materials.

Then, the foaming agent used for the foamed portions 21q to 23q conforms to the foaming agent used for the foaming bodies 21f to 23f of the first aspect.

If the interior material of resin panel 1 is used foamed body with low expansion ratio, the required rigidity can be secured but the overall weight becomes large. Thus, in the interior material 2q of this embodiment, the foamed portion having low expansion ratio is applied to a portion where there is requirement for reinforcement (for example, a portion having the lowest rigidity), and the foamed portion having high expansion ratio is applied to a portion where there is not much requirement for reinforcement. Hence, this embodiment has the feature enhancing the rigidity while suppressing the overall weight.

In the example shown in FIG. 49, it is assumed that the reinforcement is required in the vicinity of the second side wall surface 1d of the resin panel 1. Thus, the expansion ratio of the foamed portion 21q and the foamed portion 23q corresponding to the vicinity of the second side wall surface 1d is relatively low, and the expansion ratio of the foamed portion 22q between the foamed portion 21q and the foamed portion 23q is relatively high.

In this embodiment, the foamed portion 22q is an example of the first foaming region of the interior material 2q. The foamed portions 21q and 23q are an example of the second foaming region of the interior material 2q and are formed partially along a periphery of the interior material 2q.

As shown in FIG. 49, when interior material 2q is constituted by two or more foamed portions having different expansion ratios, the expansion ratios are not particularly limited. For example, when a relatively high expansion ratio is 30 to 40 times, and the relatively low expansion ratio is 10 to 20 times. The expansion ratio is a value obtained by dividing the density of the mixed resin before foaming by the apparent density of the foamed resin after foaming.

The cover material S and the foamed portions 21q to 23q conform to the cover the material S and the foaming bodies 21f to 23f of the first aspect.

2. Assembly Method of Interior Material 2q

A method of assembling the interior material 2q will be described with reference to FIGS. 50A and 50B.

FIGS. 50A and 50B are views for explaining a method of forming the interior material 2q of the embodiment by a plurality of foamed portions and shows the method of connecting the foamed portion 21q and the foamed portion 22q as an example.

In order to assemble the interior material 2q of the present embodiment, the foamed portions 21q and 23q of low expansion ratio and the foamed portion 22q of high expansion ratio are first separately formed.

As shown in FIG. 50A, an end of the boundary between the foamed portion 21q and the foamed portion 22q has a U-shaped groove and a U-shaped protrusion formed therein. After molding the foamed portions 21q to 23q, as shown in FIG. 50B, by engaging the U-shaped groove with the U-shaped protrusion at the ends of the foamed portion 21q and the foamed portion 22q, the foamed portion 21q and the foamed portion 22q are connected.

Although not shown, by engaging the U-shaped groove with the U-shaped protrusion at the ends of the foamed portion 22q and the foamed portion 23q, the foamed portion 22q and the foamed portion 23q are also connected.

In FIG. 50B, a connecting region H shows a region in which the foamed portion with the low expansion ratio and the foamed portion with the high expansion ratio coexist. The foamed portions 21q to 23q are molded by, for example, the bead type internal foam molding method. Molded examples by the bead type internal foam molding method are disclosed in, for example, Japanese Unexamined Patent Application Publication No. 2014-128938.

3. Method of Molding Resin Panel 1

Next, with reference to FIG. 51 and FIG. 52, the method of molding the resin panel 1 of the embodiment using a mold will be described.

FIGS. 51 and 52 are a view for explaining the step of molding the cover material S of the resin panel 1 according to the embodiment.

The molding method of the resin panel 1 in the fourth aspect conforms to the molding method of the resin panel 1 in the first aspect, so a detailed explanation will be omitted and only the differences will be explained. The interior material 2q in the third aspect corresponds to the interior material 10f in the first aspect.

In the first and fourth aspects differ in the shape of surface 72A. In the first aspect (FIGS. 14 and 15), the surface 72A has the shape corresponding to the front surface and the back surface of the molded body 2f, but in the fourth aspect (FIGS. 51 and 52), the surface 72A has a shape corresponding to the front surface and the back surface of the interior material 2q.

As described above, in the resin panel 1 of the present embodiment, the interior material 2q is formed by combining the foamed portion with the low expansion ratio and the foamed portion with the high expansion ratio. Hence, the present embodiment can enhance the local rigidity by the foamed portion with the low expansion ratio while suppress the overall weight.

FIG. 53 shows an application example of the resin panel 1 of the present embodiment. In FIG. 53, in order to show the connection state of a plurality of foamed portions, it is indicated by the state that the cover material S is removed from the resin panel 1 (that is, interior material 2q). In FIG. 53, the resin panel 1 is mounted on the base ST and it is assumed that an area where the resin panel 1 and the base ST contacting with one another is narrow. In this example, even if the reinforcement is assembled along the second side wall surface 2d of the interior material, the resin panel can not be effectively reinforced. The reason is that if the end of the reinforcement is too close to the cover material S, the cover material S will be damaged, thus it is difficult to place both ends of the reinforcement up to the first side wall surface 2c of the interior material.

On the other hand, the interior material 2q of the resin panel 1 of the present embodiment is formed such that the foamed portions 21q and 23q having relatively high rigidity and low expansion ratio are formed over the entire area of the second side wall surface 2d. Thus, this embodiment can locally reinforce the resin panel 1 even if the area where the resin panel 1 and the base ST contacting with one another is narrow.

4. Modified Example of Resin Panel

Next, with reference to FIGS. 54 to 59, the resin panel according to a modified example will be described.

FIGS. 54 to 59 are views each showing an interior material according to a modified example of the embodiment.

In each figure, it is indicated by the state that the cover material is removed from the resin panel (that is, interior material) to make it easy to understand the engaging state of the plurality of foamed portions

4-1. First Modified Example

FIG. 54A is a plan view of an interior material 2Aq according to a first modified example and the base ST on which the interior material 2Aq is placed.

FIGS. 54B and 54C show examples of the A-A cross section in FIG. 54A.

As shown in FIG. 54A, the interior material 2Ab according to the first modified example is formed by connecting the foamed portions 21Aq and 23Aq each having low expansion ratio and the foamed portion 22Aq having high expansion ratio, similarly to the interior material 2q. As shown in FIGS. 54B and 54C, since the cross section of the interior material 2Aq is not uniform, common reinforcement having a uniform cross-sectional shape cannot be adapted to the interior material 2Aq according to the first modified example. In FIG. 54C, since the end portion of interior material 2Aq is particularly thin, it is even more difficult to adapt such reinforcement. However, in the interior material 2Aq according to the first modified example, since the foamed portions 21Aq and 23Aq having relatively high rigidity and low expansion ratio, the rigidity of the interior material 2Aq can be locally increased without reinforcement.

Further, as shown in FIG. 54B, when the resin panel having a recessed portion in the center is used for rear parcel shelf of vehicle, it is necessary to buckle in the recess (shock absorbing effect) to protect occupant at the time of rear collision of the vehicle. Here, if common reinforcement is adapted to the interior material instead of the foamed portions 21Aq and 23Aq, this reinforcement does not break properly at the time of the rear collision, which may cause undesirable situation for occupant. On the other hand, since it is easy to buckle in the center recess, the modified example can enhance the shock absorbing effect while secure the local rigidity.

4-2. Second Modified Example

Figure 55:
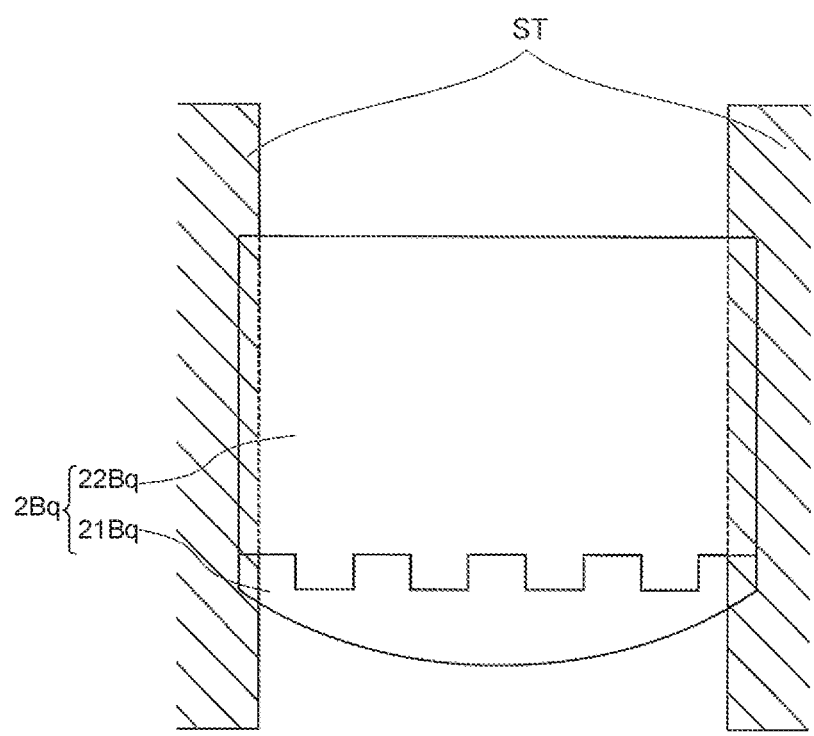

FIG. 55 is a plan view of the interior material 2Bq according to the second modified example and the base ST on which the interior material 2Bq is placed.

As shown in FIG. 55, the interior material 2Bq according to the second modified example is placed on the base ST at the left and right ends and the interior material 2Bq is formed by connecting the foamed portion 21Bq having low expansion ratio and the foamed portion 22Bq having high expansion ratio.

The foamed portion 21Bq of the interior material 2Bq, on the lower side in the drawing, has an overall curved shape across the left and right ends. In the case of such the curved shape, it is difficult to adapt common reinforcement having a uniform cross-sectional shape to the interior material 2Bq, even if the thickness of this foamed portion 21Bq is uniform.

However, in the interior material 2Bq according to the second modified example, since the expansion ratio of the foamed portion 21Bq is low, the second modified example can locally enhance the rigidity of the curved shape portion without reinforcement.

4-3. Third Modified Example

Figure 56:
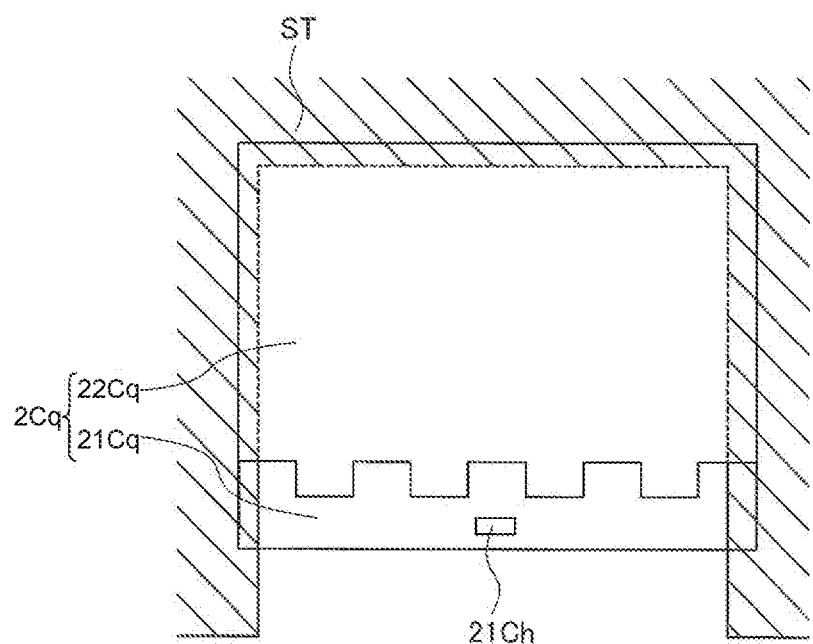

FIG. 56 is a plan view of an interior material 2Cq according to the third modified example and the base ST on which the interior material 2Cq is placed.

As shown in FIG. 56, the interior material 2Bq according to the third modified example is placed on the base ST at the left and right ends and the interior material 2Bq is formed by connecting the foamed portion 21Cq having low expansion ratio and the foamed portion 22Cq having high expansion ratio.

Since a handle 21Ch is attached to the foamed portion 21Cq of the interior material 2Cq, the cross sectional shape of the foamed portion 21Cq is not uniform, so it is difficult to adapt common reinforcement having a uniform sectional shape to the interior material 2Cq.

However, in the interior material 2Cq according to the third modified example, since the expansion ratio of the foamed portion 21Cq is low, the third modified example can locally enhance the rigidity of the interior material 2Cq even the handle 21Ch is attached to the foamed portion 21Cq.

4-4. Fourth Modified Example

Figure 57:
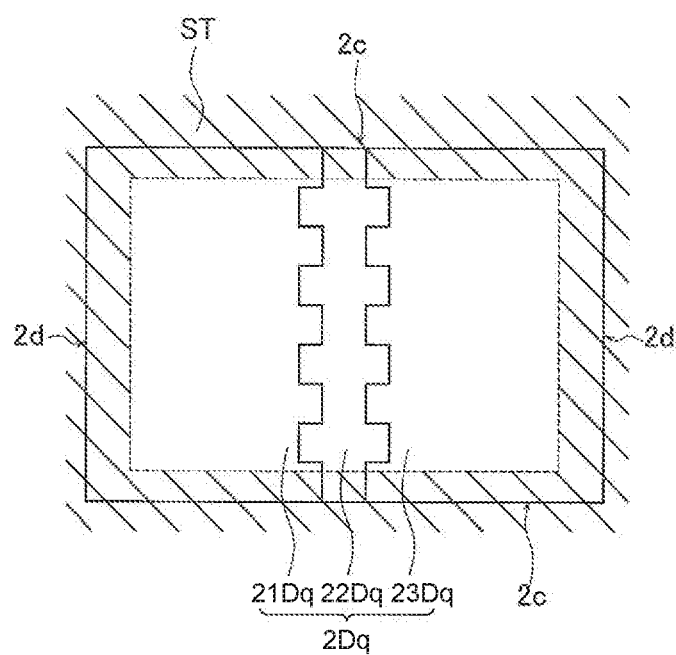

FIG. 57 is a plan view of an interior material 2Dq according to the fourth modified example and the base ST on which the interior material 2Dq is placed.

In the interior material 2q of the embodiment described above and the interior materials 2Ab to 2Cq according to the first to third modified examples, the case where the foamed portion with high expansion ratio is arranged along the periphery of the interior material has been described, it is not limited to this case. In the fourth modified example, the foamed portion of low expansion ratio is formed traversing from a portion of the periphery of the interior material to the other portion.

The interior material 2Dq, according to the fourth modified example shown in FIG. 57, is placed on the base ST over the entire periphery. And the interior material 2Dq is formed by connecting foamed portions 21Dq and 23Dq having high expansion ratio and foamed portion 22Dq having low expansion ratio. The high rigidity foamed portion 22Dq having low expansion ratio is formed between a pair of the first side wall surfaces 2c facing one another in the center portion of the interior material 2Dq.

4-5. Fifth Modified Example

Figure 58A:
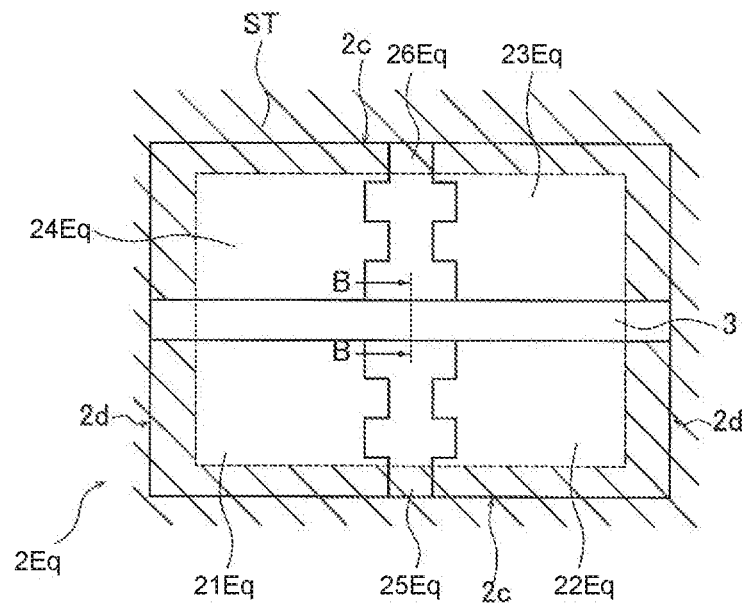
Figure 58B:
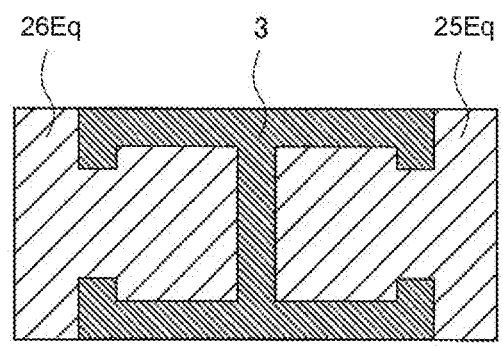

FIG. 58A is a plan view of an interior material 2Eq according to a fifth modified example and the base ST on which the interior material 2Eq is placed. FIG. 58B is an enlarged sectional view taken along B-B in FIG. 58A.

In the interior material 2q of the embodiment described above and the interior materials 2Aq to 2D according to the first to fourth modified examples, the foamed portion with low expansion ratio is adapted to the reinforcement. Then, both the foamed portion with low foaming ratio and the reinforcement may be adapted to these embodiment and modified example.

The interior material 2Eq according to the fifth modified example is different from the interior material 2Dq according to the fourth modified example in that the reinforcement 3 is disposed between a pair of second side wall surfaces 2d facing one another.

As shown in FIG. 58B, the reinforcement has an H-shaped cross section. With the placement of the reinforcement 3, the interior material 2Eq is formed by connecting foamed portions 21Eq, 22Eq, 23Eq and 24Eq with high expansion ratio and foamed portions 25E, 26E with low expansion ratio. The foamed portion 25E is fitted to one side of the reinforcement 3 and the foamed portion 26E is fitted to the other side of the reinforcement 3.

4-5. Sixth Modified Example

Figure 59:
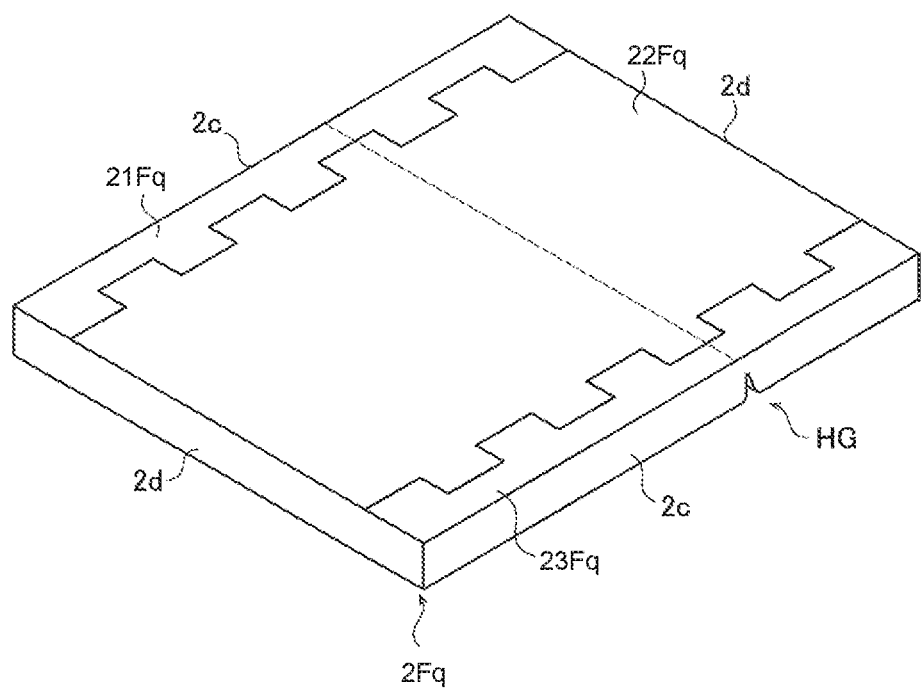

FIG. 59 is a perspective view of the interior material 2Fq according to the sixth modified example.

The interior material 2Fq shown in FIG. 59 is formed by connecting foamed portions 21Fq and 23Fq with low expansion ratio and foamed portion 22Fq with high expansion ratio. In the interior material 2Fq, a hinge HG is formed from one of the first side wall surface 2c to the first side wall surface 2c. As shown in FIG. 59, when the hinge HG is formed in at least a part of the foamed portions 21Fq and 23Fq, if the reinforcement is assembled at the position where the foamed portions 21Fq and 23Fq are provided, it is necessary to separate the end portion in the extending direction of the reinforcement from the hinge HG in order to secure the hinge function, hence it is difficult to reinforce the vicinity of the hinge HG.

On the other hand, in the present modified example, the foamed portions 21Fq and 23Fq having relatively high rigidity and with low expansion ratio are adapted to the vicinity of the hinge HG, and the present modified example can reinforce the vicinity of the hinge HG.

5. Modified Example of the Connection Method of Two Adjoining Foamed Portions In the connecting method of the above described embodiment, the U-shaped groove and the U-shaped protrusion are engaged at the ends of the foamed portion 21q and the foamed portion 22q, thereby connecting the foamed portion 21q and the foamed portion 22q. It is not limited to this connecting method.

With reference to FIGS. 60 to 65, the modified example of the connecting method of connecting two adjacent foamed portions in interior material will be described below.

FIGS. 60, 61, 63 to 65 are perspective views showing the method of connecting a first and second foamed portions J1 and J2. FIGS. 60A, 61A, and 63A to 65A show the state before connecting, and FIGS. 60B, 61B and 63B to 65B show the state after connecting.

In FIGS. 60B, 61 B, and 63 B to 65 B, the connecting region H between the foamed portions is shown.

Figure 61A:
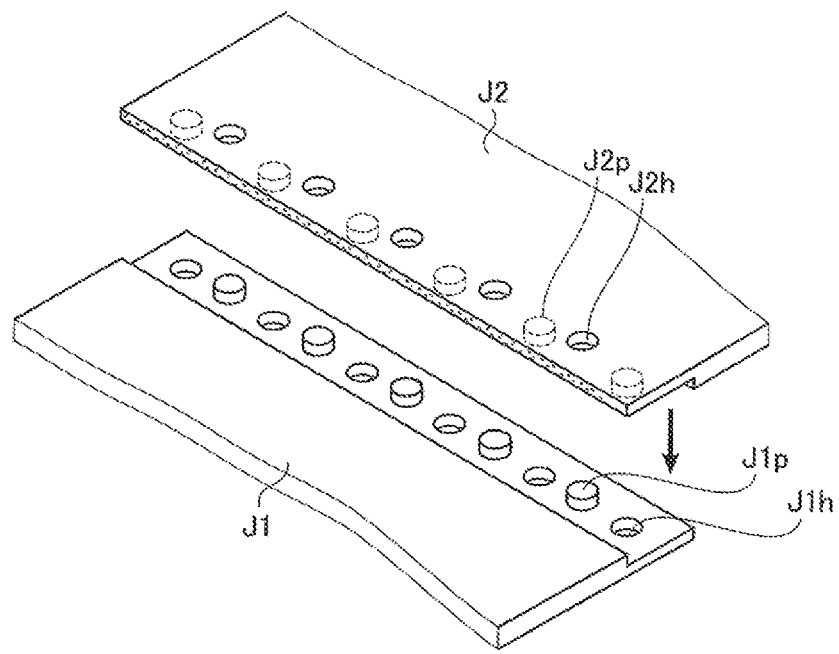
Figure 61B:
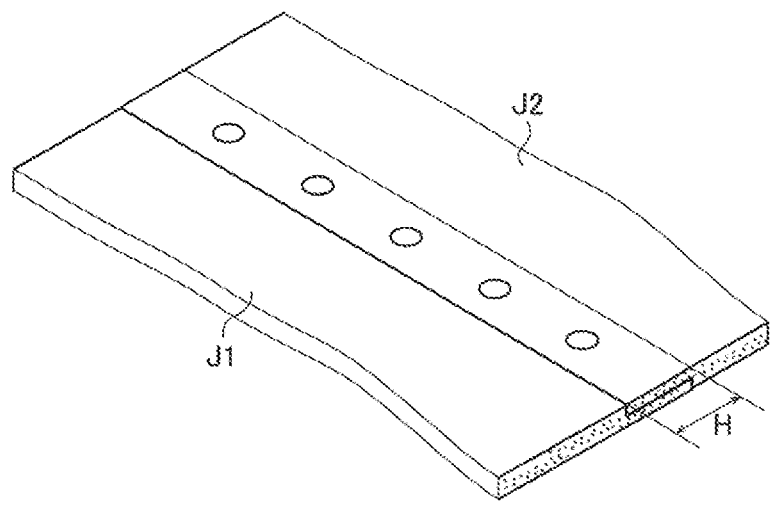
Figure 62A:
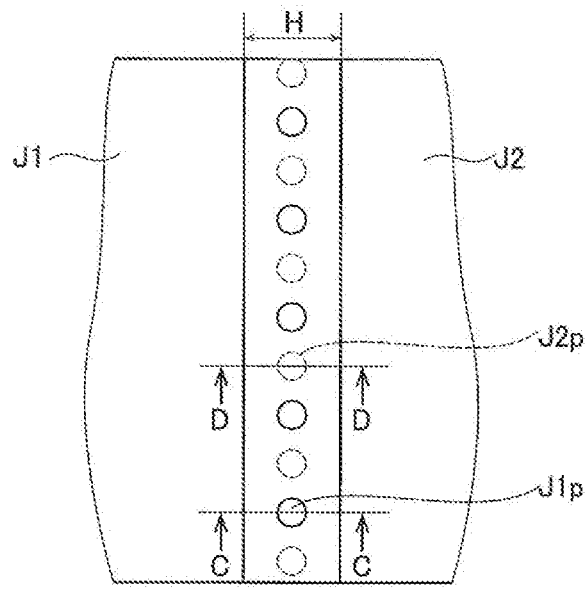

FIG. 62A is a plan view of the modified example shown in FIGS. 61A and 61B.

Figure 62B:
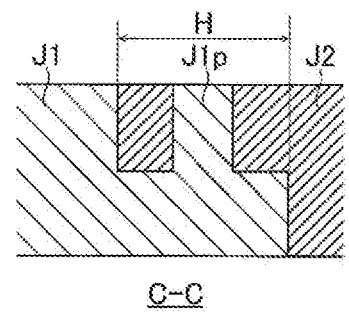
Figure 62C:
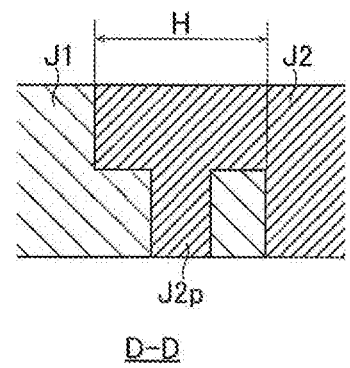
Figure 63A:
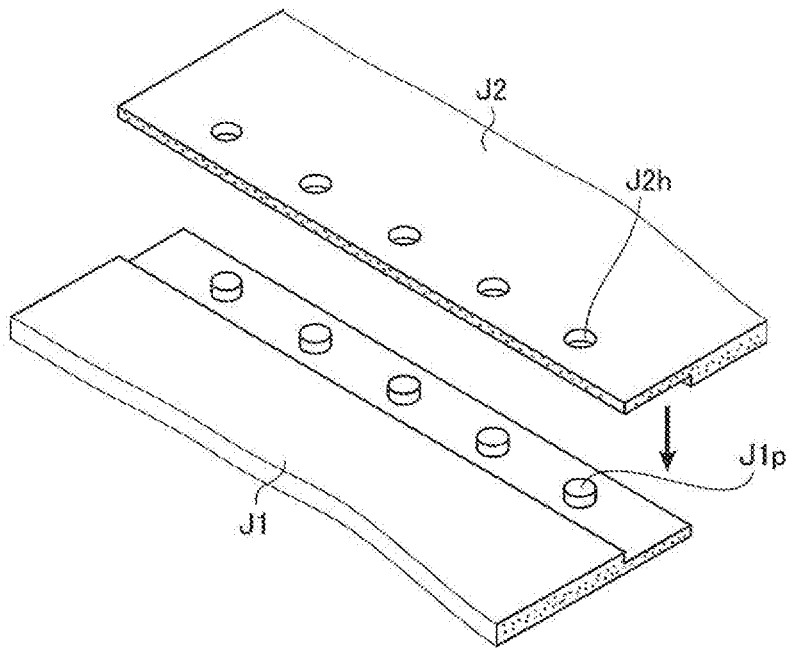
Figure 63B:
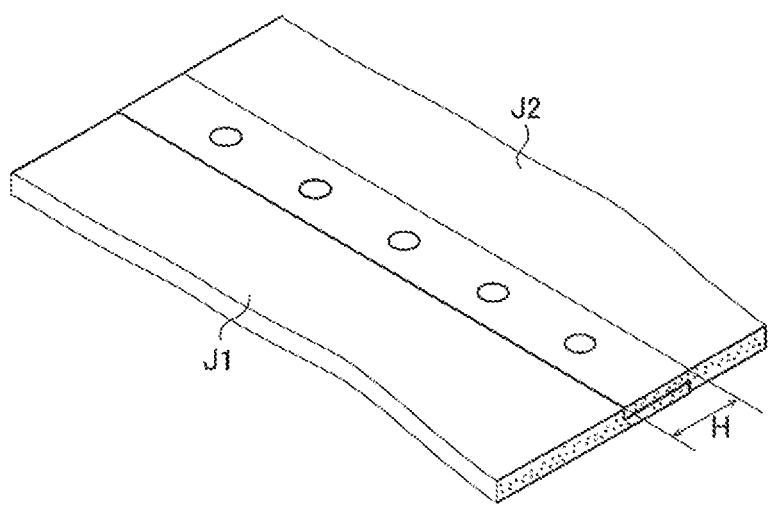

FIGS. 62B and 62C are enlarged sectional views taken along C-C and D-D in FIG. 62A.

5-1. First Modification

In the first modification shown in FIGS. 60A and 60, the connecting method is a method of connecting the first foamed portion J1 and the second foamed portion J2 by engaging a trapezoidal groove and a trapezoidal protrusion. In this connection method, the trapezoidal groove and the trapezoidal protrusion are engaged in the vertical direction, thereby connecting the first and second foamed portions J1 and J2. The connecting method of this modified example is effective in that the lateral relative movement of the first and second foamed portions J1 and J2 is regulated after engagement.

In the connecting method according to the second modification shown in FIGS. 61A and 61B, holes J1h and protrusion J1p are alternately formed in the first foamed portion J1, and holes J2h and protrusion J2p are alternately formed in the second foamed portion J2. The hole J1h of the first foamed portion J1 and the protrusion J2p of the second foamed portion J2 are engaged, and the protrusion J1p of the first foamed portion J1 and the hole J2h of the second foamed portion J2 are engaged in the vertical direction, as a result, the first foamed portion J1 and the second foamed portion J2 are connected.

Thickness of the connecting region H between the first and second foamed portions J1 and J2 is set so as to form a desired thickness in the connecting region H. The number of holes and protrusion of each foamed portion may be arbitrarily selected.

As shown in FIGS. 62B and 62C, in the connecting method according to the present modified example, both the first and second foamed portions J1 and J2, in the connecting region H, have a penetrated portion penetrating through the front surface and the back surface of the interior material with the shortest distance.

When forming the covering material on this interior material, the penetrating portion will be welded at both the front surface and the back surface of the interior material to the molten resin sheet corresponding to the covering material, hence the connection between the first and second foamed portion J1 and J2 is enhanced in the connecting region H.

And in the connection method (FIG. 50) of the above described embodiment and in the connection method (FIG. 60) according to the first modified example, both the first and second foamed portions J1 and J2, in the connecting region H, have a penetrated portion penetrating through the front surface and the back surface of the interior material with the shortest distance. Hence, the connection between the first and second foamed portion J1 and J2 is enhanced in the connecting region H.

5-3. Third Modified Example

In the connection method according to the third modified example shown in FIG. 63, the protrusion J1p is formed in the first foamed portion J1 and the hole J2h is formed in the second foamed portion J2. By engaging the protrusion J1p of the first foamed portion J1 and the hole J2h of the second foamed portion J2, the first and second foamed portions J1 and J2 are connected. Thickness of the connecting region H between the first and second foamed portions J1 and J2 is set so as to form a desired thickness in the connecting region H. The number of the protrusion J1p of the first foamed portion J1 and the number of the hole J2h of the second foamed portion J2 may be arbitrarily selected.

5-4. Fourth Modified Example

Figure 64A:
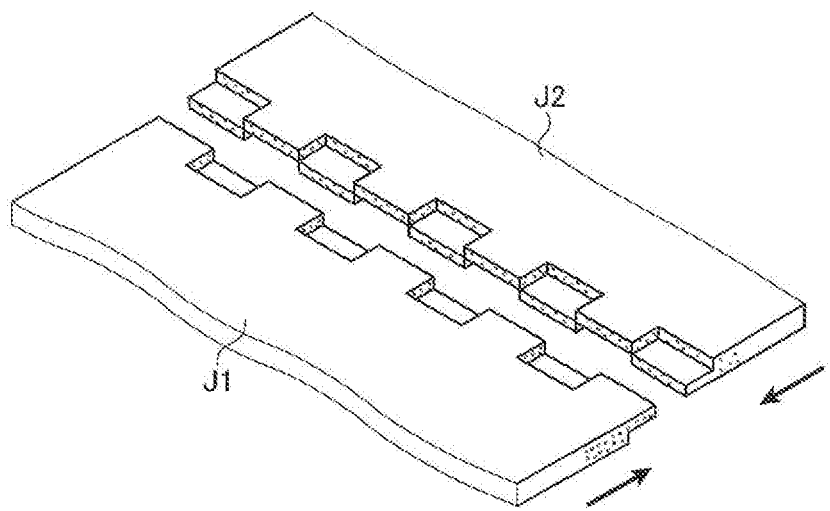
Figure 64B:
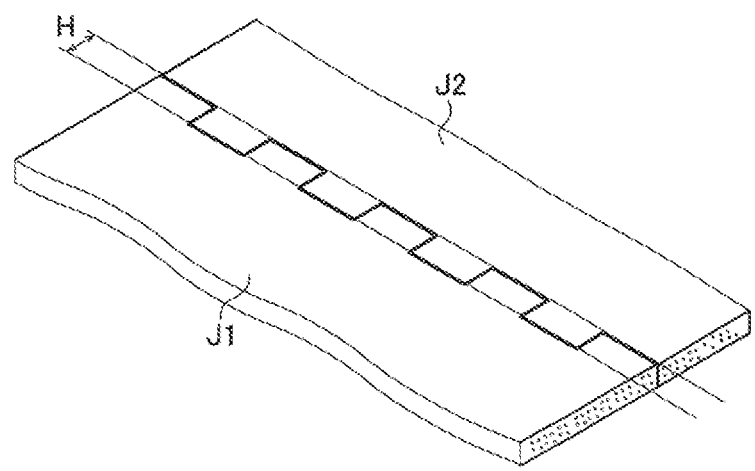

In the connection method according to the fourth modified example shown in FIG. 64, a feature that the U-shaped groove and the U-shaped protrusion are formed at the end of the first and second foamed portions J1 and J2 is the same as the example shown in FIG. 50. However, in FIG. 64, forming pattern of the U-shaped groove and the U-shaped protrusion are complementary on the front side and the back side. In this modified example as well, as in FIG. 50, the first foamed portion J1, the U-shaped groove of the first foamed portion J1 and the U-shaped protrusion of the first foamed portion J1 are engaged, thereby forming the connecting region H.

5-5. Fifth Modified Example

Figure 65A:
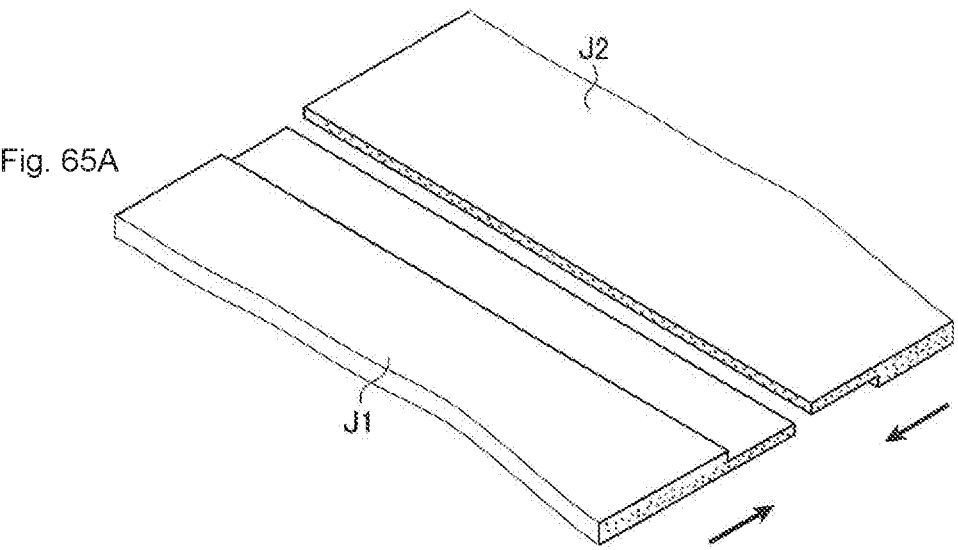
Figure 65B:
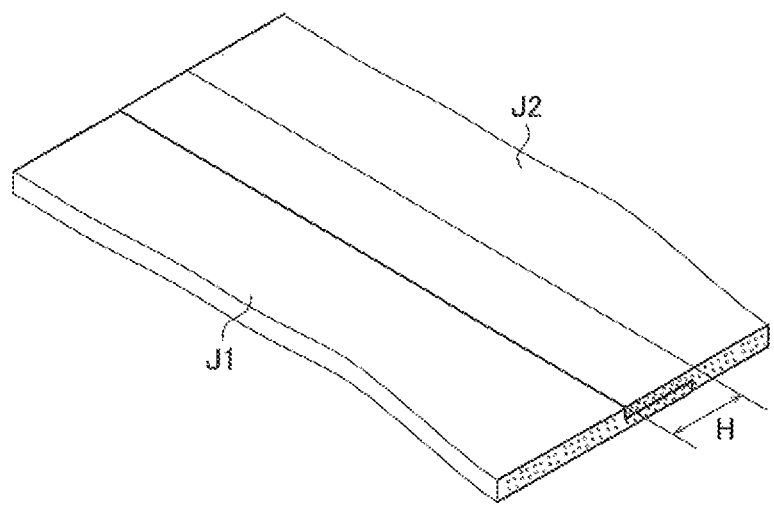

The connecting method according to the fifth modified example shown in FIGS. 65A and 65B differs from the second modified example (FIGS. 61A and 61B) and the third modified example (FIGS. 63A and 63B) in that there is no hole and no protrusion. In this modified example, since the first and second foamed portions J1 and J2 are easy to move one another, it is preferable to bond the first and second foamed portions J1 and J2 with adhesive.

Although the embodiments of the present invention have been described in detail above, the resin panel and the foamed structure of the present invention are not limited to the above embodiments. Various improvements and modifications may be made without departing from the gist of the present invention.

For example, in the above described embodiments and its modified examples, the interior material as the foamed body is formed by connecting two foamed portions, but the embodiment and its modified examples are not limited to this. The foamed portion including regions with different expansion ratios may be simultaneously formed in one foaming and molding step.

Hereinafter, the present invention will be further described with reference to examples. However, the present invention is not limited to following examples.

1. Preparation of Resin Panels According to Examples and Comparative Examples FIG. 66 shows the shape (substantially rectangular parallelepiped) of the interior material and the configuration of the interior material installed in the resin panel according to the example.

As shown in FIG. 66, the foamed portions J1 to J3 are molded separately and then the foamed portions J1 to J3 are connected, thereby preparing the interior material according to the example. The hinge is formed on the foamed portion J2 as shown in FIG. 66. The U-shaped groove and the U-shaped protrusion are formed in the connecting portion of the foamed portions J1 and J2 and the connecting portion of the foamed portions J2 and J3.

FIG. 67 shows the shape and configuration of the interior material installed in the resin panel according to the comparative example.

As shown in FIG. 67, the overall shape and size of the interior material of the comparative example is the same as the interior material of the example, but it differs from the example in that it is formed from a single foam material.

In the interior materials according to the examples and comparative example, a molded foaming material including polystyrene (PS) and polyethylene (PE) are used. This molded foaming material is PIOCERAN (registered trademark) of Sekisui Plastics Co., Ltd.

In the interior material according to the example, the expansion ratio of the foamed portions J1 and J3 is set to 15 times, and the expansion ratio of the foamed portion J2 is set to 30 times.

In the interior material of comparative example 1, the expansion ratio is set to 30 times.

In the interior material of comparative example 2, the expansion ratio is set to 20 times.

In the interior material of comparative example 3, the expansion ratio is set to 15 times.

In the interior material of comparative example 4, the expansion ratio is set to 30 times.

The thickness of the interior material of each of examples and comparative examples 1 to 4 is set to 19 mm.

In the interior material of comparative example 4, the reinforcement is fitted to the foamed material at four positions indicated by broken lines in FIG. 67. This reinforcement, made of aluminum, has I-shaped cross section and second moment of area of this reinforcement is 3400 mm$^4$.

Next, as described with reference to FIGS. 51 and 52, a pair of molten resin sheets serving as the cover material is hanged down between molds, the molten resin sheets are molded along the molding surface, and the interior material is welded to the molten resin sheets. Then molds were clamped and parting line is formed around the periphery of the molten resin sheets. Further, the molds are moved to the open position, separated from the surface of the molded resin panel molds, and the burr is cut off with cutter, thereby preparing the resin panel.

Here, as the molten resin corresponding to the cover material, a mixture of polypropylene (PP) and linear polyethylene (LLDPE) is used, and the thickness of the sheet was 1.0 mm.

The thickness of each of the resin panels according to examples and comparative examples is 21 mm.

2. Evaluation of Samples of Examples and Comparative Examples

The rigidity of the resin panel according to examples and comparative examples 1 to 4 is evaluated.

First, as shown in FIGS. 66 and 67, a pair of long side ends of the substantially rectangular resin panel 1 according to the example and the comparative examples are placed on tables. Here, the distance L between the tables is 500 mm or 600 mm.

Next, loads of 20 kg, 40 kg, 60 kg, and 80 kg are applied to the range of diameter 60 mm around points A and B in FIGS. 66 and 67, and each displacement is measured. The point A is the center position of the area on the right side of the hinge in FIGS. 66 and 67.

The point B is the center of a pair of long side ends facing one another in FIG. 66 and FIG. 67 and is located at the position 40 mm to left side from a right short side end.

Measurement results are shown in Table 1 with the distance L between the tables being 500 mm, and measurement results with the distance L being 600 mm are shown in Table 2. When the distance L is set to 600 mm, there is a possibility that the resin panel is damaged, so the load is limited to 40 kg.

TABLE 1

| | The Number of reinfocement | Weight (g/m$^2$) | Load position | Displacement (mm) | | | |
|---|---|---|---|---|---|---|---|
| | | | | 20 kg | 40 kg | 60 kg | 80 kg |
| Comparative Example 1 (30×) | 0 | 2790 | A | 4.5 | 8.0 | 12.0 | 15.5 |
| | | | B | 7.0 | 13.5 | 21.0 | 29.0 |
| | | | (Difference) | 2.5 | 5.5 | 9.0 | 13.5 |
| Comparative Example2 (20×) | 0 | 3270 | A | 4.5 | 7.5 | 9.5 | 12.5 |
| | | | B | 6.0 | 11.5 | 17.0 | 22.0 |
| | | | (Difference) | 1.5 | 4.0 | 7.5 | 9.5 |
| Comparative Example3 (15×) | 0 | 3610 | A | 3.0 | 5.5 | 8.0 | 10.5 |
| | | | B | 5.5 | 10.5 | 16.0 | 21.0 |
| | | | (Difference) | 2.5 | 5.0 | 8.0 | 10.5 |
| Comparative Example4 (30×) | 4 | 3750 | A | 3.5 | 7.5 | 10.5 | 13.5 |
| | | | B | 4.0 | 7.0 | 9.5 | 12.0 |
| | | | (Difference) | 0.5 | −0.5 | −1.0 | −1.5 |
| Example (30× and 15×) | 0 | 3000 | A | 5.0 | 8.0 | 11.5 | 15.0 |
| | | | B | 6.0 | 11.5 | 17.0 | 21.5 |
| | | | (Difference) | 1.0 | 3.5 | 5.5 | 6.5 |

Numbers in parentheses indicate expansion ratio.
"Difference" stands for "Displacement difference".

TABLE 2

| | The Number of reinfocement | Weight (g/m$^2$) | Load position | Displacement (mm) | |
|---|---|---|---|---|---|
| | | | | 20 kg | 40 kg |
| Comparative Example 1 (30x) | 0 | 2790 | A | 6.0 | 11.0 |
| | | | B | 9.5 | 18.5 |
| | | | (Difference) | 3.5 | 7.5 |

TABLE 2-continued

| | The Number of reinfocement | Weight (g/m²) | Load position | Displacement (mm) 20 kg | Displacement (mm) 40 kg |
|---|---|---|---|---|---|
| Comparative Example 2 (20x) | 0 | 3270 | A | 5.5 | 9.0 |
| | | | B | 8.5 | 16.5 |
| | | | (Difference) | 3.0 | 7.5 |
| Comparative Example 3 (15x) | 0 | 3610 | A | 4.5 | 8.0 |
| | | | B | 8.0 | 15.0 |
| | | | (Difference) | 3.5 | 7.0 |
| Comparative Example 4 (30x) | 4 | 3750 | A | 5.0 | 9.0 |
| | | | B | 5.0 | 9.0 |
| | | | (Difference) | 0.0 | 0.0 |
| Example (30x and 15x) | 0 | 3000 | A | 6.0 | 10.5 |
| | | | B | 8.5 | 16.5 |
| | | | (Difference) | 2.5 | 6.0 |

Numbers in parentheses indicate expansion ratio.
"Difference" stands for "Displacement difference".

As shown in Table 1, when the distance L between the bases is 500 mm, the displacement of point A at the center of the resin panel of the example is close to that of comparative example 1 (expansion ratio: 30 times). The displacement of point B in the vicinity of the end is close to that of comparative example 2 (expansion ratio: 20 times). Then, as shown in FIGS. 66 and 67, when the resin panel is placed on the table, the vicinity area of the short side end (that is, the area including the B point) of the resin panel has the lowest rigidity. Thus, in the resin panel of the example, the resin panel of the embodiment is lighter than the resin panel having expansion ratio of 20 times as a whole, and the rigidity of the area with the lowest rigidity of the resin panel of the example is equal to the rigidity of the resin panel having the whole expansion ratio of 20 times.

And, when comparing the displacement difference between point A and point B, it can be seen that the displacement differences of the resin panel of the example are as a whole smaller than that of the displacement difference of comparative examples 1 to 3 excluding comparative example 4 including the reinforcement. Thus, it can be seen that the example can selectively reinforce the end portion of the resin panel.

As shown in Table 2, the same result is obtained when the distance L between the bases is set to 600 mm. That is, it can be seen that the displacement of point A at the center of the resin panel of the example is close to the displacement of comparative example 4 (expansion ratio: 30 times). And, it can be seen that the displacement of the point B near the end is close to the displacement of the comparative example (expansion ratio: 20 times). Further, when comparing the displacement difference between the points A and B, it can be seen that the displacement differences of the resin panel of the example are as a whole smaller than those of the comparative examples 1 to 3 excluding the comparative example 4 including the reinforcement.

DESCRIPTION OF REFERENCE SIGNS

First Aspect
1: resin panel
11f,12f: raised portion
S: cover material
1a: front surface
1b: back surface
1c: side wall surface
10f: interior material (example of foamed structure)
2f,2Af: molded body
21f-23f: foamed body
Q1: portion of foamed body 21f
Q2: portion of foamed body 22f
201,201A,202,202A: groove portion
250,270: boundary
3A,3B: reinforcement
31f: first plate portion
32f: second plate portion
33f: connecting portion
21af-23af: front surface
21bf-23bf: back surface
210a,220a,224a,230a: front side stepped portion
211a,221a,225a,231a: front side wall surface
212a,222a,226a,232a: front side engaging surface
210b,220b,224b,230b: back side stepped portion
211b,221b,225b,231b: back side wall surface
212b,222b,226b,232b: back side engaging surface
217a,227a: contacting wall surface, 218a,228a: mounting surface
250,250A,270,270A: boundary
260,280: thin portion
70: clamping apparatus
71A,71B: mold
72A,72B: surface
74A,74B: pinch off part
75A,75B: sliding portion
P: molten resin sheet
Second Aspect
1s: molding machine
2s: resin supplying device
11s: raw resin
11a: molten resin
12s: hopper
13s: extrusion machine
13a: cylinder
17: accumulator
17a: cylinder
17b: piston
18s: T-DIE
21s: first mold
21bs: cavity
21c: recess
21d: pinch off part
22s: second mold
22bs: cavity
22c: protrusion
22d: pinch off part
23as: first resin sheet
23bs: second resin sheet
25: connecting pipe
26: burr
27: connecting pipe
30: spacing member
30f: first spacing member
30fs: side protrusion
30s: second spacing member
30ss: side protrusion
30a: base surface
32s: facing portion
32a: upper surface
33s: recess
34: protrusion
34a: protruding surface
34i: sloping surface
34s: rising surface
40: reinforcing member
41: plate member 42: connecting member
40a: upper surface
45: nonwoven fabric
50: resin molded body
60: structure
70s: resin panel
SP: resin reservoir
EF: end surface
Third Aspect
1: resin panel (example of resin laminated body)
1a: front surface
1b: back surface
1c: side wall surface
S: cover material
2t,2At,2Bt: foamed body
2g,2Ag,2Bg: part of foamed body
2Ah: recess
10t: hook housing portion
10s: contacting surface
12t: first housing portion
13t: fitting recess
130: bottom surface
131,132: side wall surface
133,134: corner
14: second housing portion
16t,18t: protrusion
20: hook
22t: hook body
22at: fitting portion
24: connecting member
70: clamping apparatus
71A,71B,71Aa,71Ba: mold
72A,72B: surface
73: mold protrusion
730: top surface
731,732: side wall surface
733,734: corner portion
74A,74B: pinch off part
75A,75B: sliding portion
83: mold recess
830: bottom surface
831,832: side wall surface
833,834: corner portion
P: molten resin sheet
PL,PH: surface
PA: volume
Fourth Aspect
1: resin panel
S: cover material
1a: front surface
1b: back surface
1cq: first side wall surface
1d: second side wall surface
2q,2Aq,2Bq,2Cq,2Dq,2Eq: interior material (example of foamed body),
2c: first side wall surface
2d: second side wall surface,
21q,21Aq,21Bq,21Cq,21Dq,21Eq,22q,22Aq,22Bq,22Cq, 22Dq,22Eq,23q,23Aq, 23Dq,23Eq,24Eq,25Eq,26Eq: foamed portion
21Ch: handle
3: reinforcement
70: clamping apparatus
71A,71B: mold
72A,72B: surface
74A,74B: pinch off part
75A,75B: sliding portion
P: molten resin sheet
ST: table
H: connecting region
J1: first foamed portion
J2: second foamed portion
J1p,J2p: protrusion
J1h,J2h: opening

The invention claimed is:

1. A foamed structure, comprising:
a first foamed body extending in a first direction;
a second foamed body extending in the first direction and facing the first foamed body with a gap interposed therebetween; and
a reinforcement disposed in the gap between the first foamed body and the second foamed body, the reinforcement having an elongated shape, wherein
the first foamed body has a portion overlapping with the second foamed body in the first direction view.

2. The foamed structure of claim 1, wherein,
the portion of the first foamed body has a wall surface orthogonal to the first direction.

3. The foamed structure of claim 1, wherein,
the first and second foamed bodies are defined by a first and second boundaries,
the first boundary is provided in a side of one end of the reinforcement,
the second boundary is provided in a side of the other end of the reinforcement,
the first and second foaming bodies are defined by the first and second boundaries, and
the first and second boundaries are colinear.

4. The foamed structure of claim 1, wherein,
the first and second foamed bodies are defined by a first and second boundaries,
the first boundary is provided in a side of one end of the reinforcement,
the second boundary is provided in a side of the other end of the reinforcement,
the first and second foamed body are defined by the first and second boundaries, and
a direction of at least one of the first and second boundaries is different from the first direction.

5. A resin panel, comprising:
the foamed structure of claim 1; and
a cover material covering the foamed structure.

* * * * *